United States Patent
Ayyagari et al.

(10) Patent No.: US 9,215,244 B2
(45) Date of Patent: Dec. 15, 2015

(54) CONTEXT AWARE NETWORK SECURITY MONITORING FOR THREAT DETECTION

(71) Applicant: THE BOEING COMPANY, Chicago, IL (US)

(72) Inventors: Arun Ayyagari, Seattle, WA (US); Timothy M. Aldrich, Federal Way, WA (US); David E. Corman, Creve Coeur, MO (US); Gregory M. Gutt, Asburn, VA (US); David A. Whelan, Newport Coast, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/707,498

(22) Filed: Dec. 6, 2012

(65) Prior Publication Data

US 2013/0305357 A1    Nov. 14, 2013

Related U.S. Application Data

(63) Continuation-in-part of application No. 13/239,183, filed on Sep. 21, 2011, which is a continuation-in-part of application No. 12/949,404, filed on Nov. 18, 2010, now Pat. No. 9,009,796.

(51) Int. Cl.
*H04L 29/06* (2006.01)
*G06F 21/00* (2013.01)
(Continued)

(52) U.S. Cl.
CPC .............. *H04L 63/1425* (2013.01); *G06F 9/00* (2013.01); *G06F 21/552* (2013.01);
(Continued)

(58) Field of Classification Search
CPC ... H04L 63/14; H04L 43/0876; H04L 9/0872; H04L 63/1425; H04L 41/069; H04L 41/046; H04L 63/166; H04L 67/306; H04L 63/1408; H04W 12/12
USPC ................................................ 726/22, 23, 24
See application file for complete search history.

(56) References Cited

U.S. PATENT DOCUMENTS 6,271,788 B1 *   8/2001   Longaker et al. ........ 342/357.31
7,042,392 B2     5/2006   Whelan et al.
(Continued)

FOREIGN PATENT DOCUMENTS

CA        2531410 A1    6/2007

OTHER PUBLICATIONS

PCT International Search Report, International Application No. PCT/US2013/072388, Mar. 5, 2014.
(Continued)

*Primary Examiner* — Jung Kim
*Assistant Examiner* — Ayoub Alata
(74) *Attorney, Agent, or Firm* — Vista IP Law Group LLP; Cynthia A. Dixon

(57) ABSTRACT

The disclosed method involves monitoring behavior of at least one node, associated with at least one user, in a network to generate a behavior profile for the user(s). The method further involves comparing the behavior profile for at least one user with a baseline behavior profile for the user(s). Also, the method involves determining when there is a difference between the behavior profile for at least one user and the baseline behavior profile for the user(s). Further, the method involves flagging an event associated with the difference: when the difference exceeds a baseline threshold level, does not exceed a baseline threshold level, meets at least one criterion, and/or does not meet at least one criterion. Additionally, the method involves classifying the event to an event classification. Further, the method involves transmitting the event to at least one other node in the network and/or a network operations center.

37 Claims, 25 Drawing Sheets

(51) Int. Cl.

| | | |
|---|---|---|
| *H04L 12/26* | (2006.01) | |
| *H04B 7/185* | (2006.01) | |
| *H04L 9/08* | (2006.01) | |
| *H04L 9/32* | (2006.01) | |
| *H04W 12/06* | (2009.01) | |
| *H04W 12/12* | (2009.01) | |
| *G06F 21/55* | (2013.01) | |
| *G06F 9/00* | (2006.01) | |
| *H04L 12/24* | (2006.01) | |
| *H04L 29/08* | (2006.01) | |

(52) U.S. Cl.
CPC ......... *H04B 7/18593* (2013.01); *H04L 9/0872* (2013.01); *H04L 9/3236* (2013.01); *H04L 41/069* (2013.01); *H04L 43/04* (2013.01); *H04L 43/0817* (2013.01); *H04L 43/0876* (2013.01); *H04L 63/14* (2013.01); *H04W 12/06* (2013.01); *H04W 12/12* (2013.01); *H04L 41/046* (2013.01); *H04L 43/12* (2013.01); *H04L 63/1408* (2013.01); *H04L 63/166* (2013.01); *H04L 67/22* (2013.01); *H04L 67/306* (2013.01)

(56) References Cited

U.S. PATENT DOCUMENTS

| | | | |
|---|---|---|---|
| 7,058,968 B2 * | 6/2006 | Rowland et al. | 726/1 |
| 7,114,183 B1 * | 9/2006 | Joiner | 726/23 |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 2005/0159891 A1 | 7/2005 | Cohen et al. | |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2009/0174597 A1 | 7/2009 | DiLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2010/0171652 A1 | 7/2010 | Gutt et al. | |
| 2011/0238484 A1 * | 9/2011 | Toumayan et al. | 705/14.39 |

OTHER PUBLICATIONS

Garcia-Teodoro, P. et al., "Anomaly-based network intrusion detection: Techniques, systems and challenges", Computers and Security, Elsevier Science Publishers, Amsterdam, NL, vol. 28, No. 1-2, Feb. 1, 2009, pp. 18-28, XP025839371, ISSN: 0167-4048, DOI: 10.1016/J. COSE.2008.08.003; p. 18, col. 2, lines 13-19; col. 1, line 5; p. 19, col. 1, lines 21-32; p. 19, col. 2, lines 29-39; p. 20, col. 1, lines 8-11; p. 20, col. 1, line 17-col. 2, line 2; Section 2.3 Machine learning-based A-NIDS schemes.

* cited by examiner

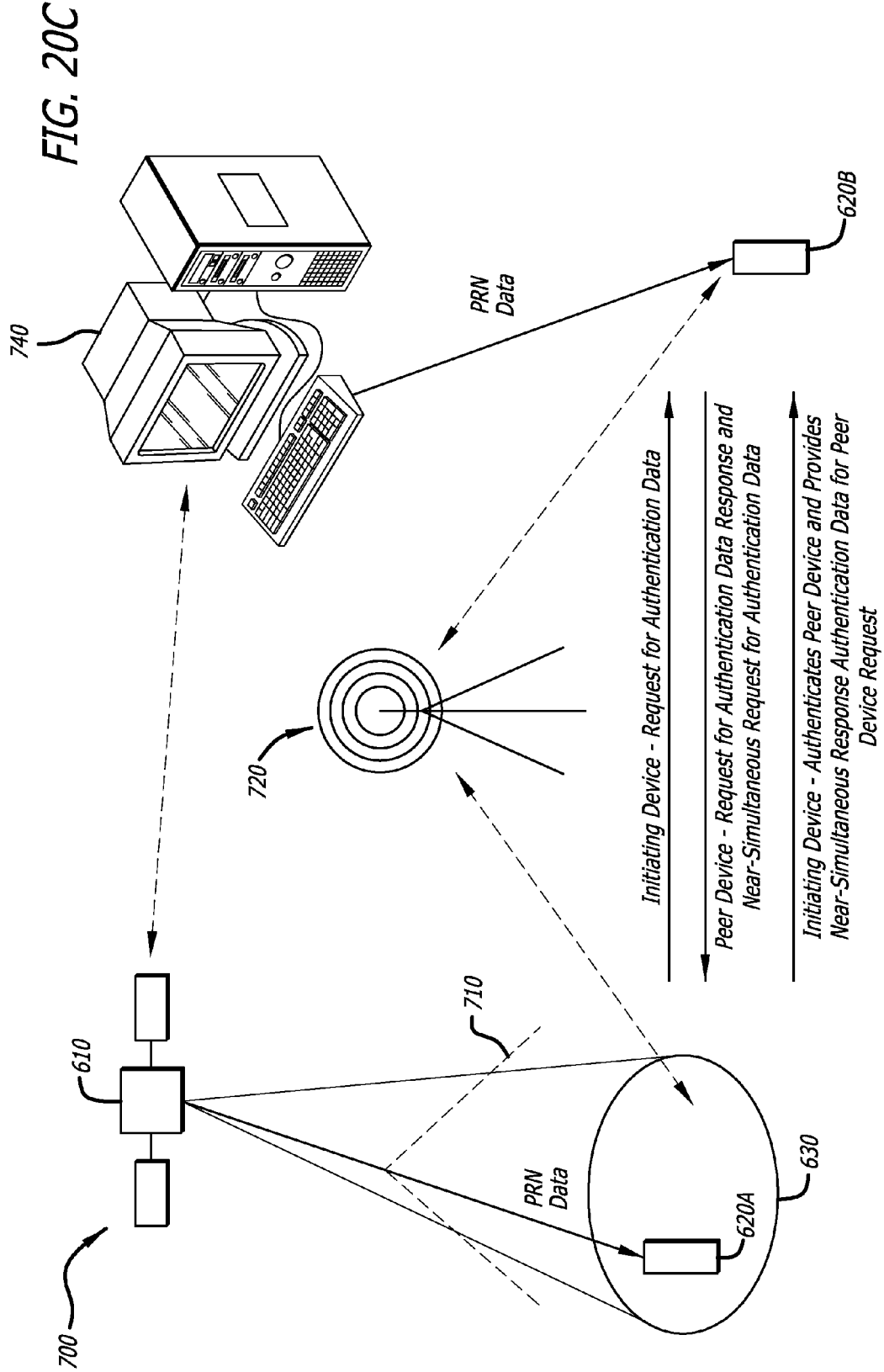

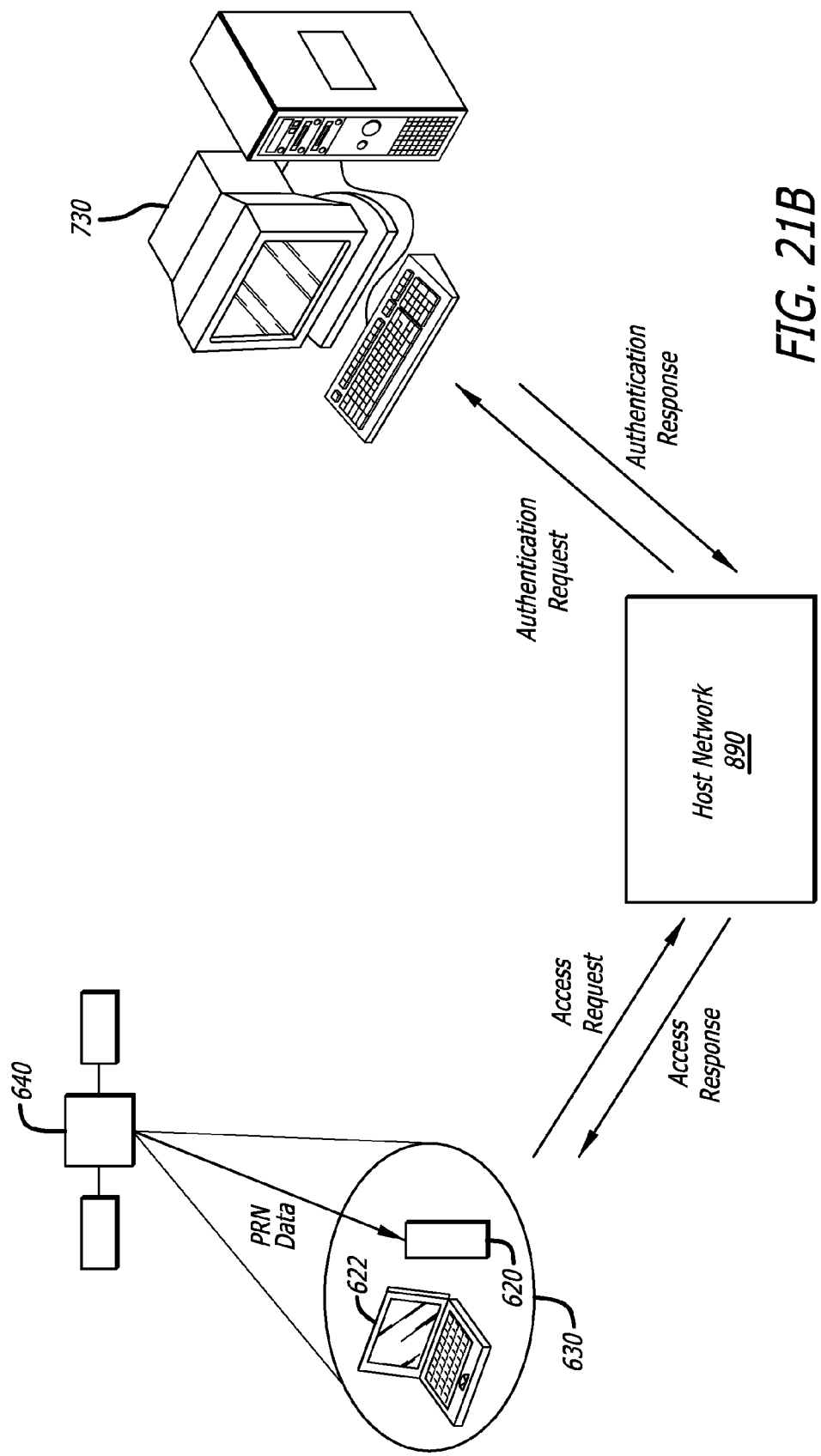

CONTEXT AWARE NETWORK SECURITY MONITORING FOR THREAT DETECTION

CROSS-REFERENCE TO RELATED APPLICATIONS

This application is a Continuation-In-Part application of, and claims the benefit of, U.S. patent application Ser. No. 13/239,183, filed Sep. 21, 2011, titled "Network Topology Aided by Smart Agent Download"; which is a Continuation-In-Part application of, and claims the benefit of, U.S. patent application Ser. No. 12/949,404, filed Nov. 18, 2010, titled "Spot Beam Based Authentication". The contents of both patent applications are hereby incorporated by reference in their entirety.

This application is related to U.S. Pat. No. 7,903,566, issued to Knapp, et al., on Mar. 8, 2011, titled "Methods and Systems for Anomaly Detection Using Internet Protocol (IP) Traffic Conversation Data"; and to U.S. Pat. No. 7,995,496, issued to Knapp, et al., on Aug. 9, 2011, titled "Methods and Systems for Internet Protocol (IP) Traffic Conversation Detection and Storage". The contents of both patents are hereby incorporated by reference in their entirety.

BACKGROUND

In addition, the present disclosure relates to network security monitoring. Specifically, it relates to context aware network security monitoring for threat detection.

SUMMARY

In one or more embodiments, the present disclosure relates to a method, system, and apparatus for context aware network security monitoring for threat detection. In particular, the present disclosure teaches a method involving monitoring, by at least one processor, the behavior of at least one node, associated with at least one user, in a network to generate a behavior profile for the user(s). The method further involves comparing, by at least one processor, the behavior profile for at least one user with a baseline behavior profile for the user(s). Also, the method involves determining, by at least one processor, when there is a difference between the behavior profile for at least one user and the baseline behavior profile for the user(s). In addition, the method involves flagging an event associated with the difference, by at least one processor, when the difference: exceeds a baseline threshold level, does not exceed a baseline threshold level, meets at least one criterion, and/or does not meet at least one criterion. Also, the method involves classifying the event, by at least one processor, to an event classification. Additionally, the method involves transmitting, by at least one transmitter associated with at least one node associated with at least one user, the event to at least one other node in the network and/or a network operations center.

In at least one embodiment, at least one node (associated with at least one user or not associated with at least one user) is a cell phone, a personal digital assistant (PDA), a personal computer, computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, the method further involves initially monitoring, by at least one processor, the behavior of at least one node, associated with at least one user, in the network to generate the baseline behavior profile for the user(s). In at least one embodiment, the method further involves transmitting, by at least one transmission source, the baseline behavior profile for at least one user to the node(s) associated with at least one user; and receiving, by at least one receiver associated with the node(s) associated with at least one user, the baseline behavior profile for the user(s). In one or more embodiments, at least one transmission source is associated with at least one other node in the network and/or the network operations center. In at least one embodiment, at least one processor is associated with at least one node associated with at least one the user, at least one other node in the network, and/or the network operations center.

In at least one embodiment, at least one transmission source is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite. In one or more embodiments, the disclosed method employs an Iridium LEO satellite constellation, where each of the satellites in the constellation has an antenna geometry that transmits forty-eight (48) spot beams with a distinctive spot beam pattern. In at least one embodiment, at least one baseline behavior profile and/or a smart agent download may be transmitted from at least one of the Iridium satellites in the constellation. The forty-eight (48) spot beams of an Iridium satellite may be used to transmit localized authentication signals and/or signals containing at least one baseline behavior profile and/or at least one smart agent download to receiving sources (associated with at least one node associated with at least one user) located on or near the Earth's surface. The broadcasted message burst content associated with these signals includes random data and/or pseudorandom noise (PRN) data. Since a given message burst may occur within a specific satellite spot beam at a specific time, the message burst content including PRN and unique beam parameters (e.g., time, satellite identification (ID), beam identification (ID), time bias, orbit data, etc.) may be used to authenticate the location of the receiving sources. It should be noted that when employing one of the above-described Iridium LEO satellites, the transmission signal power is sufficiently strong enough to allow for the signal to penetrate into an indoor environment reliably, and may employ signal encoding methods in order to do so. This allows for the disclosed method to be used for many indoor applications.

In at least one embodiment, the method further involves transmitting, by at least one transmission source, an event update to at least one network node associated with at least one user; and updating, by at least one processor, the baseline behavior profile for the user(s) by using the event update. In one or more embodiments, the monitoring of the behavior of at least one node associated with at least one user includes: monitoring the usage of at least one node associated with at least one user, monitoring the location of at least one node associated with at least one user, monitoring the data (e.g., data packets including data and packet headers) passing through at least one node associated with at least one user, monitoring the quantity of the data passing through at least one node associated with at least one user, monitoring the time of the data passing through at least one node associated with at least one user, monitoring the date of the data passing through at least one node associated with at least one user, monitoring the origination source the data is being transmitted from originally, and/or monitoring the final destination the data is being transmitted.

In at least one embodiment, the method further involves authenticating, with at least one authenticator device, a location of at least one node associated with at least one user. In at least one embodiment, at least one authenticator device authenticates the location of at least one node associated with at least one user by evaluating at least one authentication signal. In some embodiments, at least one authentication signal is transmitted by at least one transmission source, and is received by at least one receiving source associated with at least one node associated with at least one user. In one or more embodiments, at least one criterion is related to: the location of at least one network node associated with at least one user, the type of data passing through at least one network node associated with at least one user, the time at least one network node associated with at least one user receives the data, the day at least one network node associated with at least one user receives the data, the time at least one network node associated with at least one user transmits the data, the day at least one network node associated with at least one user transmits the data, the location of the origination source the data is transmitted from originally, and/or the location of the final destination source the data is being transmitted.

In one or more embodiments, a system is disclosed for context aware network security monitoring for threat detection. The system comprises at least one processor to: monitor behavior of at least one node, associated with at least one user, in a network to generate a behavior profile for the user(s); compare the behavior profile for at least one user with a baseline behavior profile for the user(s); determine when there is a difference between the behavior profile for at least one user and the baseline behavior profile for the user(s); flag an event associated with the difference, when the difference exceeds a baseline threshold level, does not exceed a baseline threshold level, meets at least one criterion, and/or does not meet at least one criterion; and classify the event to an event classification. The system further comprises at least one transmitter, associated with at least one node associated with at least one user, to transmit the event to at least one other node in the network and/or a network operations center.

In at least one embodiment, the processor is also to initially monitor the behavior of at least one node, associated with at least one user, in the network to generate the baseline behavior profile for the user(s). In some embodiments, the system further comprises at least one transmission source to transmit the baseline behavior profile for at least one user to at least one node associated with the user(s); and at least one receiver, associated with at least one node associated with at least one user, to receive the baseline behavior profile for the user(s).

In one or more embodiments, the system further comprises at least one transmission source to transmit an event update to at least one network node associated with at least one user; and at least one processor is to update the baseline behavior profile for the user(s) by using the event update. In at least one embodiment, the system further comprises at least one authenticator device to authenticate a location of at least one node associated with at least one user. In one or more embodiments, at least one authenticator device authenticates the location of at least one node, associated with at least one user, by evaluating at least one authentication signal. In some embodiments, at least one authentication signal is transmitted by at least one transmission source, and is received by at least one receiving source associated with at least one node associated with at least one user.

In accordance with one embodiment of the present disclosure, a system is disclosed that involves geolocating network nodes to geothenticate a node (i.e. authenticate the location of the node) prior to transmitting a smart agent download.

In accordance with one embodiment of the present disclosure, a method is disclosed involving the dynamic development of an individual user (associated with a particular node (e.g., a router, a computing device, a smart phone, a server, etc.)) profile utilizing at least one smart agent download.

In accordance with one embodiment of the present disclosure, a method is disclosed involving the dynamic development of an individual user (associated with a particular node (e.g., a router, a computing device, a smart phone, a server, etc.)) profile utilizing at least one smart agent download, where the profile is personalized for a specific user that is associated with the node.

In accordance with one embodiment of the present disclosure, a method is disclosed involving the personalization of at least one user profile for a node based on the node user's nominal computing, storage, and/or communication operations.

In accordance with one embodiment of the present disclosure, a method is disclosed involving breaking out at least one user baseline profile into multiple baselines that can be used to better detect threats. In at least one embodiment, at least one of the baselines is temporal. In at least one embodiment, at least one of the baselines is geospatial.

In accordance with one embodiment of the present disclosure, a method is disclosed involving the dynamic development of geo-spatial based user profiles utilizing smart agents on nodes (i.e. smart agent downloads "smart agents" are downloaded onto the nodes), such as on routers.

In accordance with one embodiment of the present disclosure, a method is disclosed involving the dynamic development of geo-spatial based user profiles utilizing smart agents on nodes (i.e. smart agent downloads "smart agents" are downloaded onto the nodes), such as on routers, and using them in conjunction with enabled IP network packet structures that contain a geolocation signature within the data packet header.

In accordance with one embodiment of the present disclosure, a method is disclosed involving the dynamic development of temporal based user profiles utilizing smart agents on nodes (such as on routers).

In accordance with one embodiment of the present disclosure, established user baselines (i.e. user baseline profiles) and user profiles are used to monitor a network's internal user (i.e. a valid user of the network) that is operating within the existing normal behavioral bounds.

In accordance with one embodiment of the present disclosure, established user baselines (i.e. user baseline profiles) and user profiles are used to monitor and to send alerts/notifications of a network's internal user (i.e. a valid user of the network) that is operating outside the existing normal behavioral bounds. In some embodiments, thresholds and/or criteria identifying the existing normal behavioral bounds may be defined by a network management entity and/or a dissemination point such as a policy server.

In accordance with one embodiment of the present disclosure, established user baselines (i.e. user baseline profiles) and user profiles are used to identify a hacker (i.e. not a valid user of the network) in the network.

In accordance with one embodiment of the present disclosure, established user baselines (i.e. user baseline profiles) and user profiles are used to monitor a hacker (i.e. not a valid user of the network) in the network.

In accordance with one embodiment of the present disclosure, established user baselines (i.e. user baseline profiles) and user profiles are used to reroute a hacker in the network to a honeypot. A honeypot is a trap set to detect, deflect, or in some manner, counteract attempts at unauthorized use of information systems. Generally, it consists of computer data, or a network site that appears to be part of a network, but is actually isolated and monitored, and which seems to contain information or a resource of value to attackers.

In accordance with one embodiment of the present disclosure, established user baselines (i.e. user baseline profiles) and user profiles are used to monitor an advanced persistent threat (APT).

In accordance with one embodiment of the present disclosure, established user baselines (i.e. user baseline profiles) and user profiles are used to monitor a network's internal rogue user (i.e. a valid user of the network that is not behaving appropriately and, thus, has gone rogue).

In accordance with one embodiment of the present disclosure, a method is disclosed involving the dynamic development of a "clustered/boot strapped" system (i.e. a system that is self-sustaining that proceeds without external help) view by downstream network nodes utilizing information learnt and disseminated by upstream network nodes.

In accordance with one embodiment of the present disclosure, a method is disclosed involving the dynamic development of geo-spatial and temporal user context/profiles of network configuration for routers, and other similar devices, using known geothenticated nodes and end-to-end traffic flow (i.e. the path data travel through the network starting from the source node and ending at the destination node) information.

In accordance with one embodiment of the present disclosure, a method is disclosed involving supporting the monitoring and detection of mitigation of anomalous user behavior at the node, at the embedded node, and at the system/network levels.

In accordance with one embodiment of the present disclosure, a system is disclosed that employs a Security Monitoring Infrastructure System (SMIS) tool.

In one or more embodiments, the present disclosure relates to a method, system, and apparatus for a network topology aided by a smart agent download. In particular, the present disclosure teaches a method involving authenticating, with at least one authenticator device, and at least one claimant. The method further involves transmitting, by at least one transmission source, the smart agent download to at least one receiving source associated with at least one claimant. In addition, the method involves receiving, by at least one receiving source, the smart agent download. Additionally, the method involves executing, by at least one processor, the smart agent download. Further, the method involves monitoring, by the smart agent download, network behavior.

In one or more embodiments, at least one authenticator device authenticates at least one claimant. In at least one embodiment, the authentication is performed by evaluating at least one authentication signal. In at least one embodiment, at least one authentication signal is transmitted by at least one transmission source, and is received by at least one receiving source. In some embodiments, at least one authentication signal and the smart agent download are transmitted from the same transmission source. In one or more embodiments, at least one authentication signal and the smart agent download are transmitted from different transmission sources. In at least one embodiment, at least one authentication signal and the smart agent download are transmitted on the same frequency. In some embodiments, at least one authentication signal and the smart agent download are transmitted on different frequencies.

In at least one embodiment, at least one claimant is an entity and/or a user. In one or more embodiments, at least one transmission source is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite.

In one or more embodiments, the disclosed method employs an Iridium LEO satellite constellation, where each of the satellites in the constellation has an antenna geometry that transmits forty-eight (48) spot beams with a distinctive spot beam pattern. In at least one embodiment, at least one authentication signal and/or the smart agent download may be transmitted from at least one of the Iridium satellites in the constellation. The forty-eight (48) spot beams of an Iridium satellite may be used to transmit localized authentication signals and/or signals containing the smart agent download to receiving sources located on or near the Earth's surface. The broadcasted message burst content associated with these signals includes pseudorandom noise (PRN) data. Since a given message burst may occur within a specific satellite spot beam at a specific time, the message burst content including PRN and unique beam parameters (e.g., time, satellite identification (ID), beam identification (ID), time bias, orbit data, etc.) may be used to authenticate the location of the receiving sources. It should be noted that when employing one of the above-described Iridium LEO satellites, the transmission signal power is sufficiently strong enough to allow for the signal to penetrate into an indoor environment reliably, and may employ signal encoding methods in order to do so. This allows for the disclosed method to be used for many indoor applications.

In at least one embodiment, at least one receiving source is employed in a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node. In one or more embodiments, the claimant is stationary and/or mobile. In some embodiments, the disclosed method further involves storing the smart agent download in memory. In at least one embodiments, at least one processor and/or the memory is employed in a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, the monitoring network behavior includes monitoring usage of at least one device associated with at least one claimant, where at least one device is a cell phone, a personal digital assistant (PDA), a personal computer, a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node; monitoring the location of at least one device associated with at least one claimant; monitoring users on the network; monitoring data (e.g., data packets including data and packet headers) passing through the network; and/or monitoring the quantity of the data passing through the network. In at least one embodiment, the disclosed method further involves evaluating, by at least one processor, the network behavior; and triggering, by the smart agent download, a specific task to be executed when the processor determines an anomaly in the network behavior has occurred. In at least one embodiment, the disclosed method further involves transmitting, by a transmission device associated with at least one claimant, the network behavior to a network operations center; evaluating, by at least one processor at the network operations center, the network behavior; and triggering, by the smart agent download, a specific task to be executed when at least one processor at the network operations center determines an anomaly in the network behavior has occurred.

In one or more embodiments, a system for a network topology aided by a smart agent download involves at least one authenticator device, at least one transmission source, at least one receiving source, and at least one processor. In at least one embodiment, at least one authenticator device is used for authenticating at least one claimant. In some embodiments, at least one transmission source is used for transmitting the smart agent download to at least one receiving source associated with at least one claimant. In one or more embodiments, at least one receiving source is used for receiving the smart agent download. In one or more embodiments, at least one processor is used for executing the smart agent download, where the smart agent download, when executed, is used for monitoring network behavior.

In at least one embodiment, the disclosed system further involves memory that is used for storing the smart agent download. In some embodiments, the disclosed system further involves a transmission device associated with at least one claimant that is used for transmitting the network behavior indicators to a network operations center, and at least one processor at the network operations center that is used for evaluating the network behavior. For these embodiments, the smart agent download triggers a specific task to be executed when at least one processor at the network operations center determines an anomaly in the network behavior has occurred.

In one or more embodiments, an apparatus for a network topology aided by a smart agent download involves at least one authenticator device that is used for authenticating at least one claimant associated with the apparatus. The apparatus further involves at least one receiving source that is used for receiving the smart agent download. In addition, the apparatus involves memory that is used for storing the smart agent download. Further, the apparatus involves at least one processor that is used for executing the smart agent download, where the smart agent download, when executed, monitors network behavior. In some embodiments, the apparatus further involves a transmission source that is used for transmitting the network behavior.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 1 is a schematic diagram of the disclosed system for context aware network security monitoring for threat detection, in accordance with at least one embodiment of the present disclosure.

FIG. 2 is a flow diagram of the disclosed method for context aware network security monitoring for threat detection, in accordance with at least one embodiment of the present disclosure.

FIG. 3 is a schematic diagram of a Security Monitoring Infrastructure System (SMIS) that may be employed by the disclosed system and method for context aware network security monitoring for threat detection, in accordance with at least one embodiment of the present disclosure.

FIG. 4 is block diagram of the functionality of the SMIS of FIG. 3, in accordance with at least one embodiment of the present disclosure.

FIG. 5 is a schematic diagram of the disclosed system for context aware network security monitoring for threat detection aided by a smart agent download (i.e. a software update), in accordance with at least one embodiment of the present disclosure.

FIG. 6 is a flow diagram of a general overview of the disclosed method for context aware network security monitoring for threat detection, in accordance with at least one embodiment of the present disclosure.

FIG. 7 is a topological diagram of the disclosed system for context aware network security monitoring for threat detection where the system is employing geothentication enabled routers, in accordance with at least one embodiment of the present disclosure.

FIG. 8 is a schematic diagram of the disclosed system for context aware network security monitoring for threat detection where the system is employing a Network Policy Server (NPS), in accordance with at least one embodiment of the present disclosure.

FIG. 9 is a schematic diagram of the disclosed system for context aware network security monitoring for threat detection illustrating the feature of monitoring user/node behavior, in accordance with at least one embodiment of the present disclosure.

FIG. 10 is another block diagram of the functionality of the SMIS of FIG. 3, in accordance with at least one embodiment of the present disclosure.

FIG. 11 is a block diagram of the functionality of the SMIS of FIG. 3 illustrating the feature of retraining at least one node of at least one detected anomaly behavior, in accordance with at least one embodiment of the present disclosure.

FIG. 12 is a block diagram of the functionality of the SMIS of FIG. 3 illustrating the feature of retraining at least one node of at least one detected anomaly behavior via a network management entity, in accordance with at least one embodiment of the present disclosure.

FIG. 14 is a schematic diagram of the disclosed system for a network topology aided by a smart agent download, in accordance with at least one embodiment of the present disclosure.

FIG. 15 is a flow diagram of the disclosed method for a network topology aided by a smart agent download, in accordance with at least one embodiment of the present disclosure.

FIG. 16 is a schematic diagram showing a network operations center (NOC) monitoring network behavior, in accordance with at least one embodiment of the present disclosure.

FIG. 17 is a graph illustrating the detection of an anomaly in network behavior, in accordance with at least one embodiment of the present disclosure.

FIG. 18 is schematic diagram showing an example meshed physical framework that correlates a logical topology to a physical topology of a network, in accordance with at least one embodiment of the present disclosure.

FIG. 19 is a schematic diagram of a satellite-based communication system that may be employed by the disclosed spot beam based authentication system, in accordance with at least one embodiment of the present disclosure.

Figure 20A:
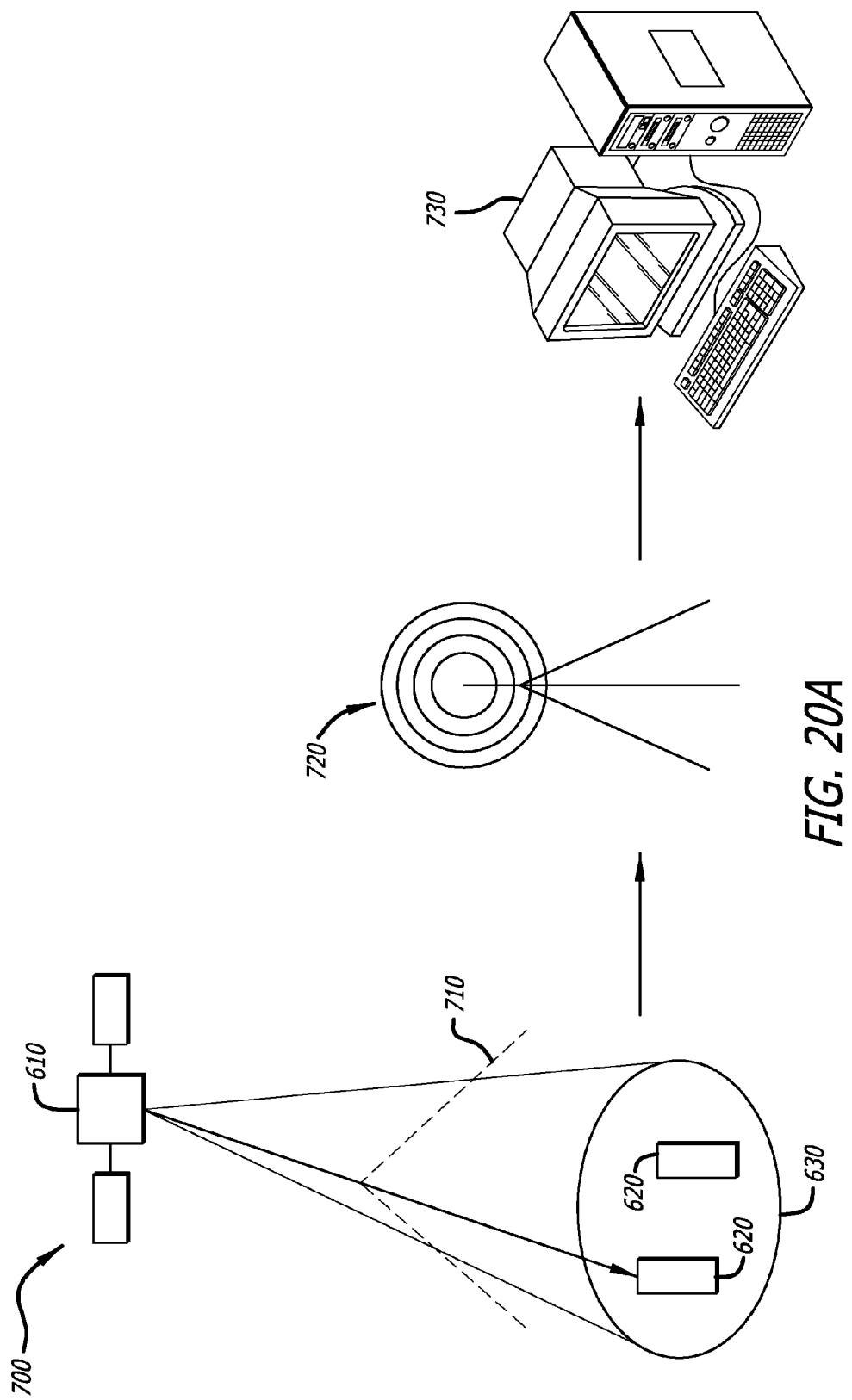
Figure 20B:
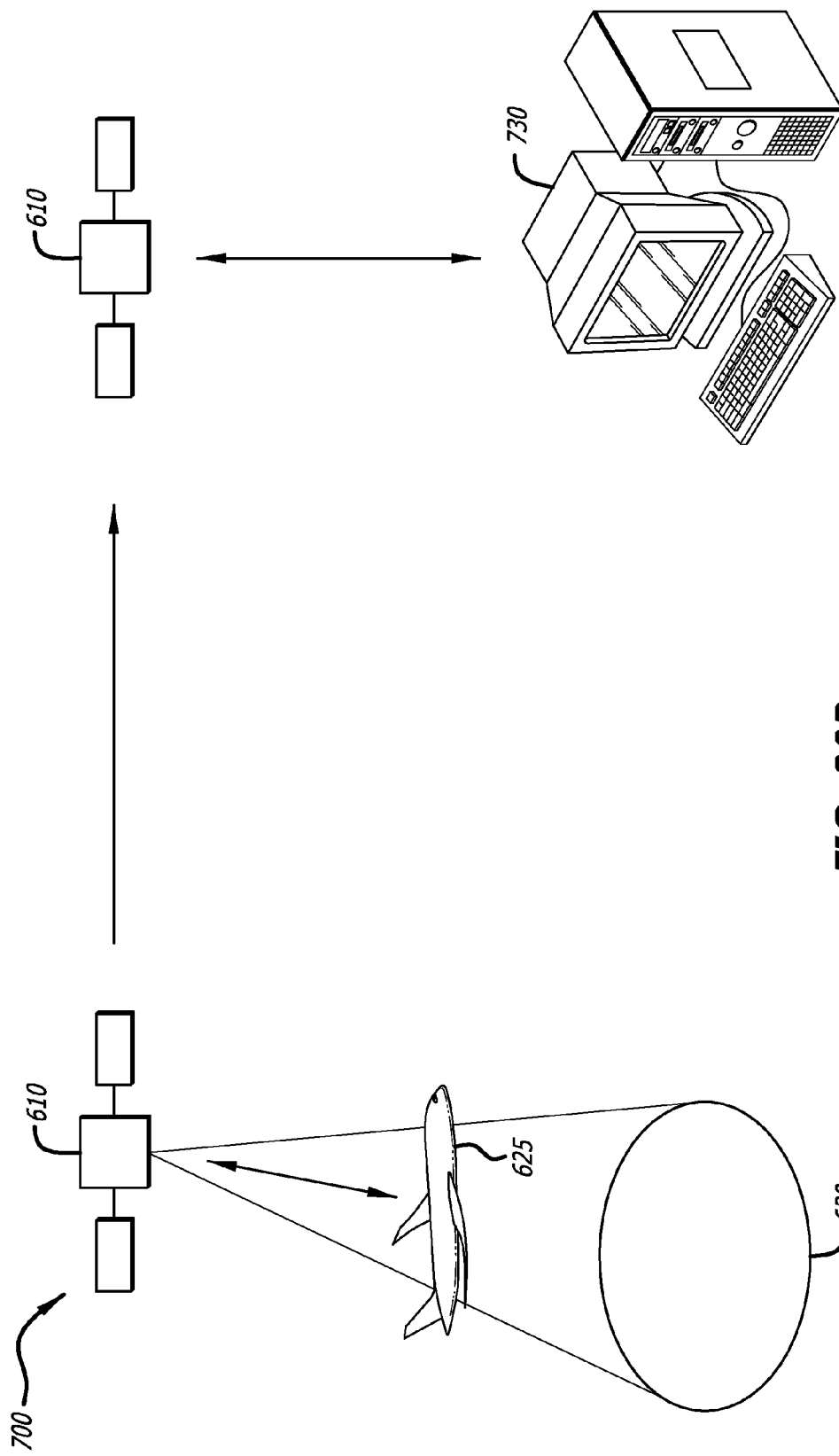

FIGS. 20A, 20B, and 20C are schematic diagrams illustrating satellite-based authentications systems, in accordance with at least one embodiment of the present disclosure.

Figure 21A:
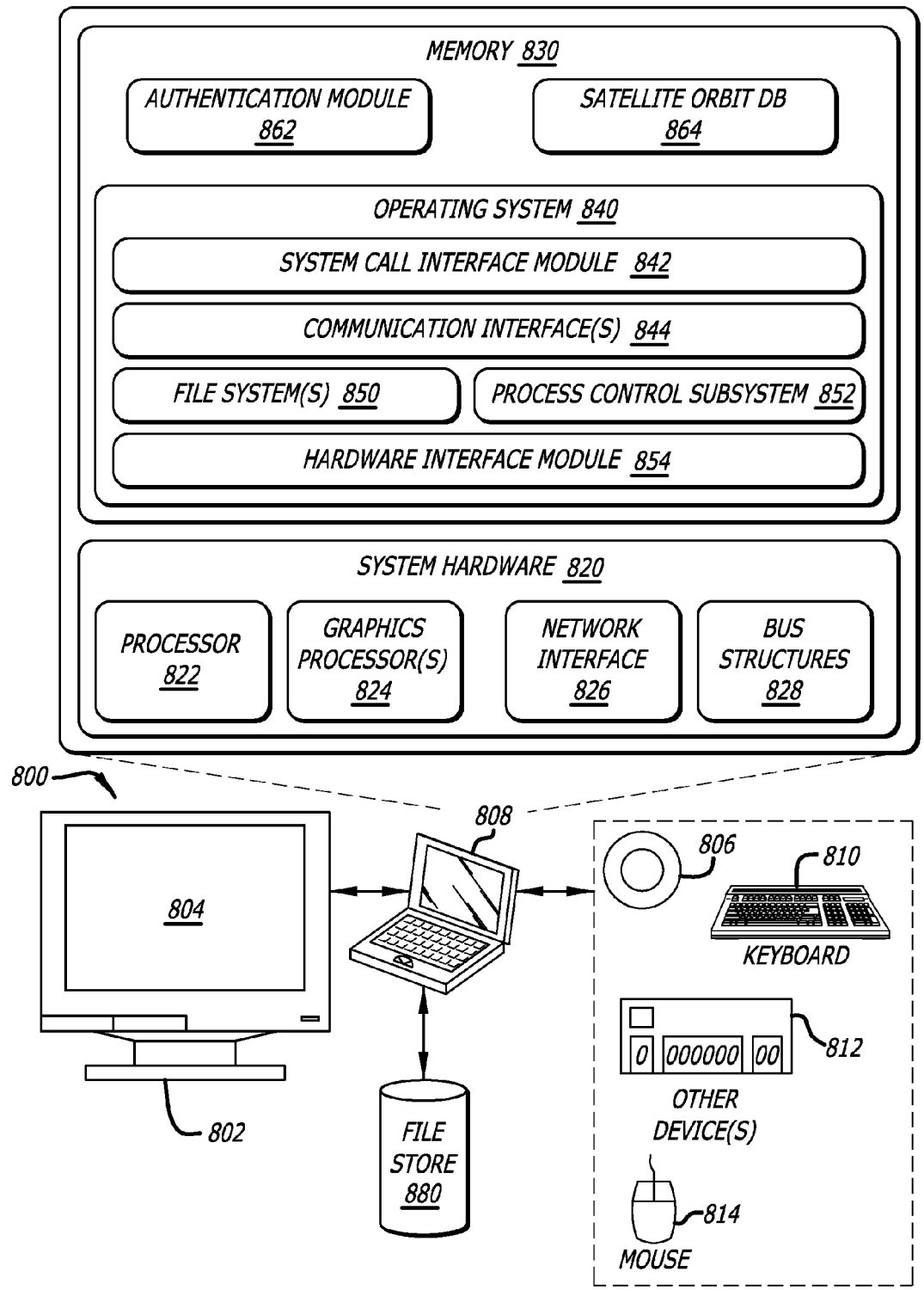

FIG. 21A is a schematic diagram of a computing device which may be adapted to implement the disclosed satellite-based authentication system, in accordance with at least one embodiment of the present disclosure.

FIG. 21B is a schematic diagram of a satellite-based communication system that may be employed by the disclosed spot beam based authentication system, in accordance with at least one embodiment of the present disclosure.

Figure 22:
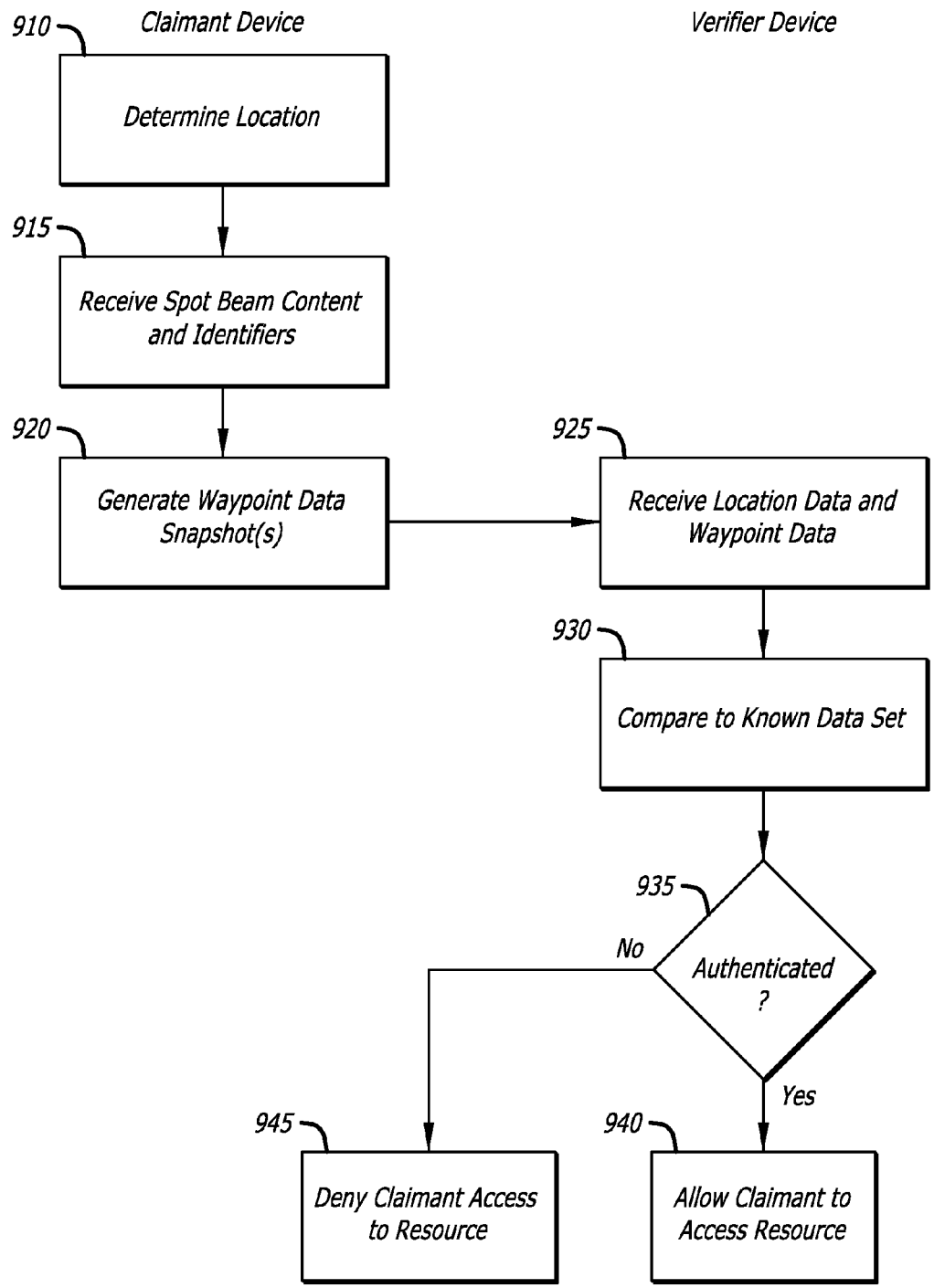

FIG. 22 is a flow diagram showing the disclosed spot beam based authentication method to authenticate a claimant, in accordance with at least one embodiment of the present disclosure.

DESCRIPTION

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

I. Context Aware Network Security Monitoring for Threat Detection

The methods and systems disclosed herein provide an operative system for dynamic contextual node profiles. Specifically, this system relates to a context aware security monitoring system for cyber and network security threat detection applications. In particular, the present disclosure teaches enabled (e.g., smart agent capable) network nodes, or other junctions in the network chain, that develop dynamic user behavioral profiles. Deviations from these user profiles can be used to improve anomalous behavior detection, monitoring, and anomaly mitigation algorithms throughout the network. By first detecting and learning about new threats in some areas of the network, the rest of the network can benefit and respond appropriately to prevent further negative impacts of the cyber threat elsewhere in the network.

Currently, cyber-security is becoming increasingly important as electronic systems become more engrained into everyday business and social tasks. Many previously managed business processes have expanded into electronic data processing online, which has made on-going information and computing security advancement techniques a necessary requirement in order to protect these everyday-used systems. Critical documents and other data using information from social security numbers to national infrastructure related information are stored in networked systems that if accessed by an unauthorized party would have varying degrees of societal impact from nuisances to catastrophic societal infrastructure breakdown. In parallel with increased reliance on electronic systems, the nation has also seen a dramatic increase in terrorism and computer hacking; thus requiring society to work towards improving methods to protect our networked computer systems.

Cyber attacks and network penetrations are becoming all too common. These frequent occurrences have brought discussions of dangers of network penetrations by external threats in both commercial and military environments to the forefront. Current access control approaches are principally based on either static passwords, or are authentication based using passwords and smart badge credentials based on Public Key Infrastructure (PKI). As system attacks are often conducted by impersonating the end user, there has been a tendency for organizations to focus on user authentication methods to curtail network data interception network vulnerabilities. These approaches continue to be vulnerable to sophisticated attacks and, thus, a need has developed for a new paradigm of access control leveraging additional dimension/information beyond the normal three dimensions (what you know, what you have, and who you are) of authentication by adding the geospatial location/context, such as user location, to provide an additional and orthogonal layer of protection, which provides an enhanced correlation between location and context awareness from integrated physical geolocation mapping to logical network and information management views.

Furthermore, the fact that existing cyber attacks are often shrouded in anonymity has created additional concerning problems. Larger attacks are often precluded by attempts of the originator to make small intrusions/attacks to better understand the system's vulnerabilities for future exploitation and laying the groundwork for a later, more destructive attack. To date, many large scale cyber attacks have not only left the recipients of the attacks still recovering from the damage left behind, but the recipients are also unable to deter any further damage through retaliation, or otherwise, as without having a clear traceability to the attack's originator and, thus, often lack the authority to respond. If attack motives are unclear, it is further unlikely that the recipient could tell if the attack was a mere act of vandalism, a purposeful theft, or a more sinister approach to threaten national security. As such, any system that would aid in denying network access to rogue users and/or provide traceable data to aid in identifying the originator would have great utility to reduce and mitigate denial of service (DoS) and network data interception attacks.

The present disclosure focuses on network management and specifically improves anomaly behavior monitoring, detection, and mitigation that may be used in conjunction with pre-existing systems, methods, and devices or as alternative approaches to those. Such existing methods may include: Intrusion Detection System (IDS) and Advance Persistent Threat (APT) management. The system and method of the present disclosure leverage functionality associated with a Security Monitoring Infrastructure System (SMIS), which aggregates cyber security and network monitoring data to provide a complete situational awareness picture which will be described in further detail below.

Existing systems rely on signatures and policies that are static in nature in between signature and policy updates and furthermore are not tailored for the specific computing device and/or system's communication, and storage usage user profiles. Preloaded signatures and policies to identify anomalous behavior allow for quick event correlation for known cyber threats and their mitigation and additionally are a good defense against the large number of already classified and known cyber threats. However, they do not react to new and evolving cyber threats in a dynamic and timely manner and some APT threats lack a known pattern and need to correlate over a long historical memory, and so these methods could be improved by the reduction or all out mitigation of these issues.

The present disclosure relates generally network management and security by means of threat detection. In particular, it relates to dynamic contextual user profiles associated with a particular node for a context aware security monitoring system for cyber and network security threat detection applications and may be used separate or in conjunction with a Security Monitoring Infrastructure System (SMIS) tool, which will be discussed later in further detail below.

Methods and systems for developing a dynamic contextual profile to enable tailored anomaly behavior monitoring, detection, and mitigation for cyber and network security applications are disclosed herein. In one or more embodiments, the disclosed method involves authenticating, with at least one authenticator device, at least one node associated with at least one user; transmitting, by at least one transmission source, a smart agent download to at least one receiving source associated with the node(s); receiving, by at least one receiving source, the smart agent download; storing, in memory associated with the receiving source, the smart agent download; executing, by at least one processor associated with the memory, the smart agent download; baselining (i.e. monitoring user behavior on the node to create a baseline profile), by the smart agent download, user behavior; monitoring, by the smart agent download, the user's behavior on the node; detecting, by the smart agent download, deviations of the user's behavior from the user baseline (i.e. the user baseline profile) for the node; and flagging the event as appropriate, by the smart agent download, when the deviation is at least one of the following: meets an acceptable threshold, does not meet an acceptable threshold, meets an acceptable criterion, does not meet an acceptable criterion, and/or a combination thereof.

The present disclosure relates to methods and systems according to various embodiments to improve network management and security through dynamic threat monitoring and detection. More specifically, the present disclosure teaches methods to develop dynamic contextual user profiles for a particular node to enable tailored anomaly behavior monitoring, detection, and mitigation for cyber and network security threat detection applications.

In one or more embodiments, the present disclosure may employ smart agents to download smart agent software to enabled network nodes as needed to enable the disclosed system and method to support technology advancements and to disseminate information regarding evolving security threats. (Refer to the Network Topology Aided by a Smart Agent Download Section of the present disclosure for a detailed discussion of smart agent downloads).

In some embodiments, the present disclosure utilizes smart agents to develop dynamic context aware user profiles for a particular node to enable tailored anomalous behavior monitoring, detection, and mitigation at the individual device level. These profiles may be compiled to review extracted information over a plurality of nodes or network level. Operational profiles of enabled embedded devices and user profiles (i.e. the baseline profile for a node associated with a user) within enabled devices are baselined (i.e. monitored to create a baseline profile) utilizing smart agent downloads, and are developed in terms of computing, storage, and/or communication operations. The profiles are further developed on a contextual basis, where user profiles are developed relative to the specific embedded device and/or the specific device the user is operating, and the profile may also be relative to the location the device should be operating within. In at least some embodiments, the profiles are personalized based on the end user and their usage characteristics. In some embodiments, one baseline profile may be broken out into multiple baselines that can be used to better detect threats. In at least one embodiment, at least one of these baselines is temporal. In at least one embodiment, at least one of these baselines is geospatial. The system and method of the present disclosure may then enable the dissemination of learnt anomalous behavior patterns to other nodes within the system, which these nodes can use to better mitigate threats, including to bootstrap their own detection algorithms.

Furthermore, the system and method of the present disclosure may similarly be used to dynamically develop geo-spatial and/or temporal context aware profiles of network traffic flow, as well as be used for configuration management of enabled nodes in the system.

In one or more embodiments, the disclosed system is able to download smart agent software to enabled devices (i.e. enabled nodes) that are located in attenuated environments, such as an indoor environment. The disclosed system can further be used along with various different geolocating methods to physically map the devices against a typical internet protocol (IP) framework. This allows for the identification of where a specific device is accessing a given network from in terms of its physical location, thereby lending itself to enhance situational awareness within the network, and also to aid to provide a dynamic understanding of the network's configuration.

The preferred method for geolocation utilizes signals from low earth orbiting (LEO) satellites (i.e., Iridium satellites) to provide network nodes with a means to both authenticate the network nodes based on their location (referred to as "geothentication") and to provide a means for them to receive smart agent software. Geothentication of the node is important to the architecture as it ensures that unintended users do not receive the software download. In some embodiments, it may be preferred that software is pre-loaded onto enabled devices prior to their deployment or via a terrestrial network, and that only software updates are sent through the LEO satellites to minimize the signal requirements. The smart agent software can then be used to aid monitoring of node behavior in order to identify anomalous network activity.

The system and method of the present disclosure may leverage a Security Monitoring Infrastructure System (SMIS) tool suite, which essentially acts as a port sniffer, to enhance geothentication capabilities for enhanced correlation between authenticated location and temporally relevant nominal operational profiles that may span across computing, communication, and storage usage profiles yielding device context awareness that includes authenticated geo-spatial location in addition to temporal attributes. By dynamically establishing and updating the nominal baseline operational profile for the total device behavior, including computing, communication, and storage functions, across both temporal and authenticated geo-spatial location; a unique and statistically significant context may be established that is specific to the particular device in operation. This is akin to a finger printing of the device in operation, while tracking the updates to the operational profile relating to mutations, that once determined with statistical significance, can be classified into either approved or anomalous behaviors based on either an automated or a network manager driven decision support system.

In at least one embodiment, the network may include the equivalent of the SMIS's Forensic Data Collectors (FDCs) and the Security Utility Server (SUS) elements known collectively here as the Security Monitoring System (SMS). Within the SMIS tool's applications, the FDC acts as a network sensor that is located near a node, which requires monitoring, and is similar to a commercial-off-the-shelf (COTS) intrusion detection system (IDS). FDCs can aid the system by collecting data based on triggered events. Such collected data may include IP headers or entire IP packets that are being routed through a particular node within the network. The Security Utility Server (SUS) allows a network management entity to set thresholds and/or other criteria to develop alerts that when triggered, result in a particular action, such as sending a notification to a Network Management System (NMS). Note that within the present disclosure, such an instantiation differs from the existing SMIS representation (disclosed in U.S. Pat. No. 7,903,566) in that it is not infrastructure based, but rather is algorithmically based and co-locates the overall SMIS functionality, which includes FDC and SUS as single entity, called SMS, which primarily monitors, detects, and mitigates anomalous behaviors at the local device level. This is enabled by the Smart Agent Download application which teaches a means for at least a portion of the SMS software to be downloaded onto the device and/or the software on the device that can receive necessary updates or alerts as appropriate.

In addition, SMS operations within a node (e.g., a device, a router, and an embedded system) is distributed as it may be maintained on each enabled node and, thus, is more applicable to both wireless nomadic computing and self-managed internet devices such as routers and embedded systems.

The SMS algorithm will develop a nominal baseline profile including the computing, communication, and storage usage behaviors of the node, thereby providing a complete context of the node. This is important since indication of anomalous behavior is not limited to communication activities only, but also includes computing and storage activities. The SMS functionality shall be integrated into each end user device, router, and embedded system and thereby enhances the functionality of the previously described geothentication authentication and authorization methods, while also providing additional cyber threat monitoring, detection, and mitigation capabilities during an operational phase between the authentication/authorization processes. In addition, the disclosed SMS functionality is especially of great use for the ubiquitous and fast expanding use of mobile end user devices, such as mobile phones and wireless personal devices, by providing customized and targeted end user profiles and operational context and, thereby, allowing for IDS/APT management for identification, notification, and mitigation of the dynamic and evolving cyber threats.

The present disclosure has several key features. One key feature is that the present disclosure provides enhancements to the previously described geothentication system by applying principles of SMS to dynamically develop the context for a particular device, router, and embedded system's computing, communication, and storage usage profile, without the need for static or periodically refreshed signatures or policies. Another key feature is that the present disclosure provides algorithmically-based, dynamically created, context profiles for nominal operations, which then form the basis for the detection and management of anomalous behaviors that arise due to cyber threats. In addition, another key feature is that the present disclosure provides algorithmically driven SMS enhancements to the previously described geothentication system authentication and authorization methods to include targeted geo-spatial and temporal computing, communication, and storage usage profiles, and further monitors the usage per established and learnt nominal baseline to detect, notify, and mitigate anomalous behavior. Additionally, another key feature is that the present disclosure provides the tools to allow for the exchange of detected anomalous behavior states with peer and adjacent cooperating geothentication enabled devices, routers, and embedded systems for dynamic situational awareness to enable the invocation of proactive prevention measures to collectively quarantine and mitigate the cyber threat.

A. Node Profiles: Particular User, Specific Node

Node profiles are baselined (i.e. a baseline profile is created) by utilizing smart agent downloads, and are tailored for specific network nodes. In one embodiment, profiles are developed for end-user nodes, and are developed in terms of computing, storage, and/or communication operations that are conducted by a specific user. Profiles are further developed on a contextual basis. This may include profiles developed based on at least one of, but not limited to, the following: temporal and geo-spatial context. In other words, user profiles (i.e. profiles for a node associated with a user) are developed relative to the device the user is operating, and may also be relative to a geographic area in which the device should be operated within, and how the user nominally operates the device over time. For example, a given user at a company may have access to multiple end-user devices that they utilize to perform their job duties. These may include a personal digital assistant (PDA), a laptop computer, a desktop computer, a loaner device, etc. The location of the desktop computer may always remain the same for that user, while a laptop may be used in multiple different locations, such as the user's home, office, and lab locations and, as such, a loaner laptop may see more atypical location usage. Thresholds and/or criteria can be developed for each of these situations and others where, for instance, a particular user device may only be able to operate within a previously defined permissible geographic area and when the device is located outside this defined threshold, the algorithm would recognize the anomaly event and flag it.

Furthermore, user profiles are built up at an application level, and will consider application usage, internet website usage, and other node usage based on computing, storage, and/or communication applications. For example, session profiles may be monitored based on how an application is used, such as how a user accesses their email or other applications, like Facebook or Google+.

Drastic changes in the user's profile are immediately flagged as an event. Events may be assessed and classified as good or bad, and subsequent response actions may be identified for the event accordingly. In at least one embodiment, such results may be provided to a fusion center (and/or dissemination point), which can analyze temporally and geographically. In this way, the system can help other devices bootstrap so that they can detect and respond more quickly to threats. Depending on a given scenario, a variety of actions are possible for a specific event. For example, some of the actions may include, but are not limited to, the following: the event may be logged, data related to the event may be logged, the node may be shut down, the node may be quarantined, any learnt behavior may be disseminated to other nodes for mitigation of a future event, a user associated with the event may be diverted to a honeypot, and/or a user associated with the event may have their access privileges revoked.

Accessibility to data and/or available system functions may be further defined based on elements of the personalized node profile. For example, a user who is on travel may have limited access to data or capability based on being in a potentially less secure area to further mitigate unwanted events from occurring. However, more importantly, personalized node profiles are on a per person profile basis. Existing systems that may have multiple users do not realize that different users have different styles of using the same machine. The same machine would not realize if a user (User 1) is logged on to an account that belongs to another user (User 2) and, as such, the system would not recognize that this was not the correct behavior for User 1.

Node profiles that are developed are dependent on the type of node. In at least one embodiment, the node profile may be based on how a particular user utilizes a specific node. For example, a node profile will recognize that for a particular node, a user may be use one of the following devices: a PDA, a laptop, a desktop a computer, a loaner device, and/or a navigation device.

In some embodiments, behavior profiles for end user enabled networked devices may be developed based on a user's computing, communication, and/or storage usage. In at least one embodiment, user profiles are developed utilizing smart agent downloads. Profile baselines may be developed in terms of computing, storage, and/or communication. In some embodiments, profiles may be further developed on a contextual basis, such as where user profiles are developed relative to the device the user is operating and usage of applications associated with the device. In some embodiments, the profiles may also be relative to a location in which the device should be operated. In more generic terms, a node profile may be based generically on the following, but not limited to only these: (1) Who is performing the actions? (user specific—i.e., static passwords, biometrics, etc.); (2) Which device is performing the actions? (device dependent—i.e., PDA, laptop, desktop, loaner device, navigation device, etc.); (3) What type of actions they are performing (and/or not performing)? (i.e., computing/communication/storage related tasks/application usage); (4) When are they performing the actions? (temporal patterns such as diurnal patterns); (5) How are they performing the actions? (potentially a combination of several profile factors listed here); and (6) Where are they performing the actions from? (geospatial/geolocation/geothentication).

For example, user A is working on their work-related laptop computer (node 1), which is acceptably used from their work office, work lab, and/or their home. A profile may be baselined for user A on node 1 which will dynamically develop a baseline profile (which may include information, such as what applications user A uses on node 1, what websites user A visits on node 1, and how user A uses each application) to essentially build a user fingerprint associated with their use of node 1 in terms of computing, storage, and/or communications. User A may likely use different applications at each of the acceptable locations (work office, work lab, and their home) which may be allocated in the profile as such.

In another example, the location of the desktop computer may remain the same all of the time. In another example, a laptop may be used in multiple locations (home, office, lab, etc.), and a loaner laptop may see more atypical location usage even with the same user. The profile may consider such things, as application and internet website usage.

In at least one embodiment, the user may need to prove that they are located within an acceptable geographic location before being able to access the device, conduct computing, communication, and/or storage operations. A user and/or their device may be authenticated by means of geolocation/geothentication methods as described, for example, in the Spot Beam Based Authentication section of the present disclosure.

B. Node Profiles: Traffic Flow Characterization

In another embodiment, the node profile may be based on the traffic passed through an internet protocol (IP) network. For example, the node may be a network router passing a plurality of IP data packets across the network. In one embodiment, a router node has traffic (i.e., IP data packets) routed through it. The traffic may be characterized geospatially and/or temporally. A baseline model (i.e. a baseline profile for the node) may be developed, similar to that of the end-user node profiles discussed previously, and traffic may be monitored against the baseline.

In one embodiment, a system of at least two communicatively coupled nodes (for example, enabled cell phones) are configured to communicate via an internet protocol (IP) across a network. A baseline model may be developed for nominal IP network traffic for at least two coupled nodes by observing IP-to-IP packet traffic over a period of time, and developing thresholds and/or other criteria that can be monitored to flag potential cyber threats or otherwise anomalous behavior. In some embodiments, at least one instance of a unique IP packet header that may be associated with a plurality of IP-to-IP packets may be analyzed for anomalous behavior. In some embodiments, the IP packet header may comprise a security signature portion. In at least one embodiment the security signature portion may include geolocation information for at least one network node that the IP packet has passed or routed. In at least one embodiment, the geolocation information is in the form of at least one geotag or geocertificate. In other or complimenting embodiments, an event may be identified by at least one of the following: the activities uniqueness onto itself, a time of week uniqueness, a time of day uniqueness, a day of week uniqueness, a data quantity uniqueness, a geolocation information uniqueness. As previously noted, events may be flagged, and then various actions may take place, such as providing an alert corresponding to detected anomalous behavior. An alert, for example, may be sent from a dissemination point, such as a network policy server. In at least one embodiment, this alert is sent to a network management system. In another embodiment, this alert may be sent to neighboring devices, peer or otherwise.

In some embodiments, the data that is being monitored is logged in memory of a capable device. In another aspect, a system includes at least one processor that is assigned to analyze the packet headers that are logged in memory. In at least one embodiment, these functions are performed by the same device. In other embodiments, these functions are maintained in different devices that are coupled together, either by wire or wirelessly.

In some embodiments, the analyzing of the packet headers is based on: a determination, based on an IP-to-IP-on-Port operation tuple, of whether a particular operation has been conducted on the IP network over a historical and statistically relevant period; a determination of whether a particular operation has been conducted on the IP network within a specific hour of the week over a historical and statistically relevant period; and/or a determination whether a particular operation conducted on the IP network has used a statistically different amount of bandwidth in a given hour of the week over a historical and statistically relevant period.

Additional capabilities of the disclosed system and method include, but are not limited to: dynamic development of a geo-spatial and temporal context/profile of network traffic flow and configuration management for routers to enable tailored anomaly behavior monitoring, detection, and mitigation without the need for signature based IDS/APT management; enabling dissemination of algorithmically learnt anomalous behavior patterns observed to peer/adjacent satellite location/positioning systems to initiate cooperative monitoring and mitigation of the potential cyber threat; and enabling the determination of an anomalous behavior pattern within a given device/router/embedded system, or a cluster of them, as a look-ahead situational awareness for an event correlation engines across the other devices/routers/embedded systems in a managed environment to bootstrap their dynamic anomalous behavior detection algorithm.

C. Node Profiles: Configuration Management

In at least one embodiment, a plurality of geothentication enabled routers have IP data packet traffic being routed through them. Since these are cooperating geothentication enabled routers, location of the router is known. Additionally, traffic flow (end-to-end, i.e. from the source node to the destination node) time it takes the data packet to transcend through the network, and the paths in which the IP packets are passed are also known. Through this information, the configuration management of the system of routers is known.

In typical systems, data packets are inspected and signatures of known viruses and malware are reviewed against the inspected packets. However, while this works well for known threats, signatures for unknown threats are not known, and it is for these cases that the disclosed system and method is helpful.

Part of uncovering unknown threats may include monitoring the network for advanced persistent threats (APTs). These are often difficult to track down because their low and slow approaches often allow them to become part of the noise and, thus, go undetected. This system and method may work to identify new traffic flows, which may be used to identify whether an event should be classified as good and may be used to retrain the baseline, or whether the event should be classified as bad and the appropriate actions (e.g., flagging the event and/or sending an alert) can then occur. For example, a system may have a means to identify new traffic flow of data packets that comes into the system in a relatively short amount of time, but may not be able to recognize two pings (e.g., two data packets) a week. The system may not catch this because it is below the predefined thresholds, but in fact they may still attribute to a later, more catastrophic event occurring within the network. The disclosed system and method work to identify these sorts of typically-undetectable anomalous behavior.

APT applies all across the network fabric, and intrusion detection applies more so at the network's boundaries. An example of this may be a corporate email system that reviews data packets at the inflows at the boundaries, and that strips suspect attachments, such as zip files, from the emails. Boundaries of the network may include end-user devices and/or routers located at the boundary of the network. Monitoring network traffic at these boundaries is critical because the boundaries are often the first to encounter a new threat. Again, by establishing a nominal baseline, the disclosed system and method can be used to algorithmically learn and, thus, retrain the baseline for approved deviations in behavior and/or react appropriately to an identified threat.

D. Dissemination of Anomalous Behavior and Situational Awareness

In some embodiments, for example, a node within the network detects an anomaly with an anomaly detection mechanism. As the node is part of a network of nodes and has peer nodes, or otherwise nodes in its relative vicinity that it interacts with, it can be assumed that other nodes may also be affected. In this way, a forward node can learn and disseminate observed anomalous behavior to trailing nodes. In at least one embodiment, a fusion center may take information from at least two nodes, which may be peer nodes, to aid in assessing whether an attack is occurring such that the peer nodes must no longer classify the event themselves, as other nodes can aid in the classification. If similar patterns are recognized over more than one node, attribution confidence is increased, thereby allowing for the threat to be better responded to. In at least one embodiment, a dissemination point is used to disseminate information about the anomalous behavior or anomalous behavior patterns to mitigate the impact to nodes that have not yet been attacked. In at least one embodiment, the dissemination point takes the form of a network policy server, which may develop new policies based on these new attacks and disseminate them to at least a portion of the nodes within the network. Through this means, the network can have supervised, reinforced machine learning mechanisms.

Learning anomalous behavior takes time, but subsequently, other nodes within the network can use this information to bootstrap their dynamic anomalous behavior detection algorithm to learning the behavior themselves. In at least one embodiment, an APT may attempt to test the boundary nodes in an attempt to find network vulnerabilities. The system may learn anomalous behavior patterns and may subsequently develop complex rules. For example, if a system finds out that a specific pattern (e.g., two pings in a week) need to be watched, the system may develop a response to this behavior pattern that will cause a specific trigger to occur when it observes the behavior pattern. This information (i.e. the response to the observed specific behavior pattern) can then be disseminated to other nodes within the network. In this way, the downstream nodes are able to prevent an attack, rather than just detect a behavior pattern and subsequently respond to it. However, in either instance, the system is able to protect itself because it is aware of a learnt anomalous behavior pattern.

The present disclosure provides enhancements to a Security Monitoring Infrastructure System (SMIS) tool through enabling technologies that include the ability to robustly download software to a network node, in an indoor environment, that can be used to support the network in a variety of ways, such as acting as node behavioral monitoring sensors. The smart agent download allows for network nodes to be able to determine their location, thereby providing additional geospatial context and furthermore allows the nodes to be geothenticated as required.

The present disclosure has five main features. The first feature relates to context aware personalized profiles. This feature involves dynamic development of context aware personalized profiles for an end user/embedded device based on computing, communication, and storage usage to enable tailored anomaly behavior monitoring, detection, and mitigation without the need for signature based Intrusion Detection System (IDS)/Advance Persistent Threat (APT) management. The second feature relates to network traffic flow profiles. This feature involves dynamic development of geo-spatial and temporal context/profiles of network traffic flow for routers to enable tailored anomaly behavior monitoring, detection, and mitigation without the need for signature based IDS/APT management. The third feature involves configuration management. This feature involves dynamic development of geo-spatial and temporal context/profiles of network configuration for routers, and other similar devices, to enable tailored anomaly behavior monitoring, detection, and mitigation without the need for signature based IDS/APT management. The fourth feature relates to dissemination of anomalous behavior. This feature involves dissemination of algorithmically learnt anomalous behavior patterns observed to peer/adjacent enabled cyber locate systems to initiate cooperative monitoring and mitigation of the potential cyber threat. The fifth feature relates to situational awareness. This feature involves the determination of anomalous behavior patterns within a given device/router/embedded system, or a cluster of them, as a look-ahead situational awareness for event correlation engines across other devices/routers/embedded systems in a managed environment to bootstrap their dynamic anomalous behavior detection algorithm.

Figure 1:
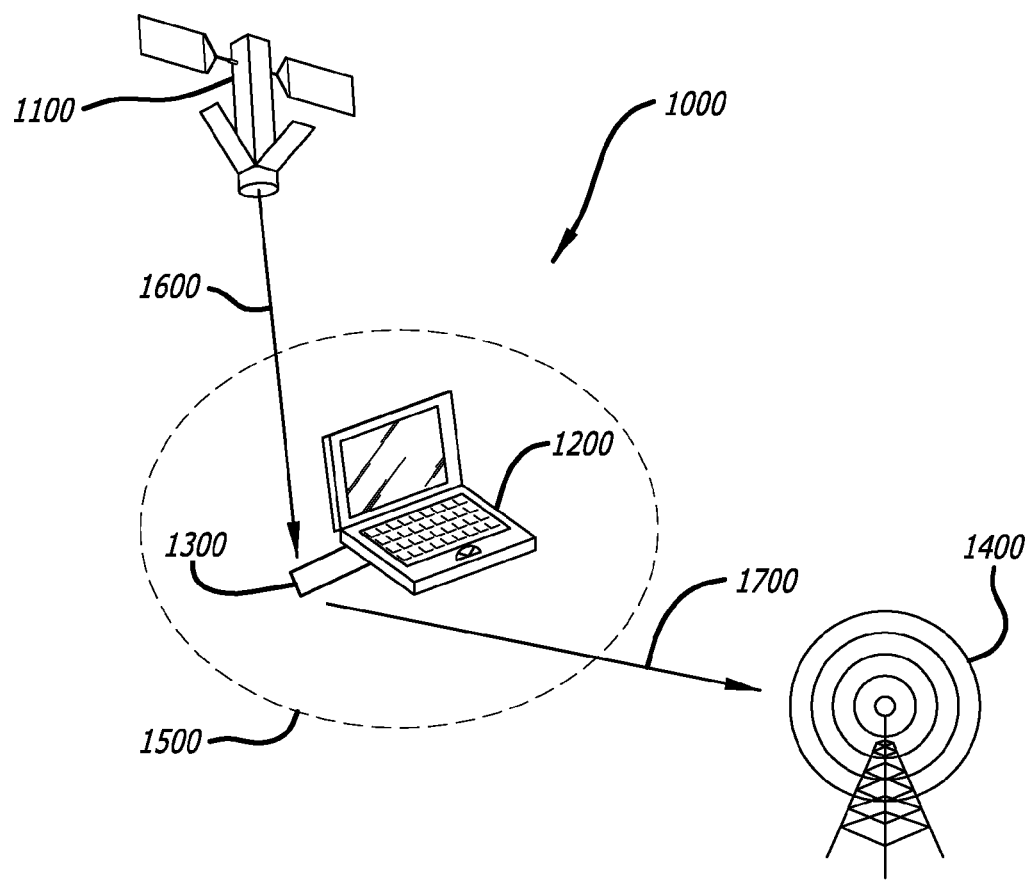
FIGS. 1 through 12 are directed towards the disclosed system and method for context aware network security monitoring for threat detection, in accordance with at least one embodiment of the present disclosure.

FIG. 1 is a schematic diagram of the disclosed system 1000 for context aware network security monitoring for threat detection, in accordance with at least one embodiment of the present disclosure. In this figure, a satellite 1100 is shown to be transmitting a signal 1600 in a satellite spot beam 1500 to geolocation hardware 1300, which includes a receiver (not shown) to receive the signal 1600 and has geolocation functionality as well as authentication functionality. It should be noted that, in some embodiments, the geolocation hardware 1300 and the receiver (not shown) are housed together in a single unit; and in other embodiments, they are housed in two separate units that are connected together, either by wire or wirelessly.

The spot beam 1500 may have a circular footprint as is shown in this figure, or in other embodiments may be a shaped spot beam that has a footprint of an irregular shape. Various types of satellites and/or pseudo-satellites may be employed for the satellite 1100 of the system 1000. Types of satellites that may be employed for the satellite 1100 include, but are not limited to, lower Earth orbiting (LEO) satellites, medium Earth orbiting (MEO), and geosynchronous Earth orbiting (GEO) satellites. In one or more embodiments, a LEO Iridium satellite is employed by the system 1000 for the satellite 1100. Employing this type of satellite is advantageous because its transmission signal is strong enough to propagate through attenuated environments, including being propagated indoors.

The geolocation hardware 1300 may be employed in a device 1200 (e.g., a cell phone, a personal digital assistant (PDA), and/or a personal computer) associated with a user; may be implemented in an authenticator device (not shown) associated with one or more users; and/or may be employed in a network component (e.g., a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node) associated with a user. The geolocation hardware 1300 contains an enabled chipset, and has processing, receiving, transmitting (in some embodiments), and/or memory functions so that, in some embodiments, it is able to receive a smart agent download (also referred to as a "smart agent"), and store it into memory. The geolocation hardware 1300 is connected to a network 1700, which may be wired and/or wireless. In this figure, the geolocation hardware 1300 is shown to be connected to a wireless network 1700 that employs a cell tower 1400 as a relay. It should be noted that the device 1200, authenticator device, and/or network component associated with a user may be stationary and/or mobile.

Prior to the satellite 1100 transmitting a smart agent download to the geolocation hardware 1300, the user is authenticated by the system 1000 by authenticating the location of the device 1200, authenticator device, and/or network component (e.g., a node) associated with the user. Various different types of authentication systems and methods may be used by the system 1000 to authenticate the user. In one or more embodiments, a spot beam based authentication system and method is used by the system 1000 to authenticate the user. For these embodiments, a LEO Iridium satellite is employed for the satellite 1100 to transmit at least one authentication signal that is used to authenticate the user. A detailed discussion regarding the spot beam based authentication system and method is presented below in the Spot Beam Based Authentication Section of the present disclosure. In addition, it should be noted that an authenticator device (not shown) may be employed by the disclosed system 1000 for authenticating the user by evaluating at least one authentication signal transmitted from the satellite 1100.

After the user has been authenticated, the satellite 1100 transmits 1600 a smart agent download to the geolocation hardware 1300 (or in some embodiments to the receiver (not shown)). In one or more embodiments, the smart agent download and at least one authentication signal are both transmitted from the satellite 1100. In alternative embodiments, the smart agent download and at least one authentication signal are transmitted from different satellites 1100 or transmission sources. In addition, in one or more embodiments, the smart agent download and at least one authentication signal are transmitted on the same frequency. In other embodiments, the smart agent download and at least one authentication signal are transmitted on different frequencies.

After the geolocation hardware 1300 (or the receiver) receives the smart agent download, the geolocation hardware 1300 stores the smart agent download into its memory. The smart agent download contains an initial baseline behavior profile (also referred to as a "baseline") for at least one user associated with the device 1200, authenticator device, or network component (e.g., a node); an updated behavior profile (i.e. an event update) for at least one user associated with the device 1200, authenticator device, or network component (e.g., a node); monitoring software; and/or Security Monitoring Infrastructure System (SMIS) software.

After the smart agent download is stored into memory, at least one processor in the geolocation hardware 1300 executes and/or processes the smart agent download. It should be noted that in alternative embodiments, instead of a processor(s) in the geolocation hardware 1300 executing and/or processing the smart agent download, at least one different processor may be used to execute the smart agent download. This different processor(s) may be implemented in various devices or components associated with at least one user (or not associated with at least one user) including, but not limited to, a cell phone, a personal digital assistant (PDA), a personal computer, a computer node, an IP node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, a fourth generation (4G) wireless node, and a network operations center (NOC).

In addition, it should also be noted that in order for the processor(s) to execute and/or process the smart agent download, in one or more embodiments, the processor(s) may need to utilize a specific key, code, and/or other security means to unlock the smart agent download software and to execute it. The use of specific keys, codes, and/or other security means allows nearby "listeners" of the signal containing the smart agent download to not be able to receive and decipher the smart agent download that is being supplied to the targeted device 1200, authenticator device, or network component (e.g., a node) associated with at least one user.

If the smart agent download contains monitoring software and/or SMIS software, upon execution of the smart agent download, at least one processor will use the smart agent download software to monitor various types of activity of at least one user (associated with the device 1200, authenticator device, or network component (e.g., a node)) for any possible anomalies in the activity. Types of activity monitored by the processor(s) may include, but is not limited to, monitoring the usage of the device 1200, authenticator device, or network component (e.g., a node) associated with a user (e.g., monitoring the usage of a particular node by a user); monitoring the location of the device 1200, authenticator device, or network component (e.g., a node) associated with a user (e.g., the location of the device 1200, authenticator device, or network component may be determined via Spot Beam Based Authentication as described in the description of FIGS. 19-22); monitoring the actual data passing through the device 1200, authenticator device, or network component (e.g., a node) associated with a user (e.g., monitoring the actual data passing through a particular node associated with a user); monitoring the quantity of the data passing through the device 1200, authenticator device, or network component (e.g., a node) associated with a user; monitoring the time of the data passing through the device 1200, authenticator device, or network component (e.g., a node) associated with a user; monitoring the date of the data passing through the device 1200, authenticator device, or network component (e.g., a node) associated with a user; monitoring the origination source the data is being transmitted from originally; and monitoring a final destination the data is being transmitted. After the processor(s) uses the smart agent download software to monitor various types of activity by a user, at least one processor uses the monitoring data to create a behavior profile for the user, which relates to the device 1200, authenticator device, or network component (e.g., a node) associated with the user.

At least one processor uses the smart agent download software to evaluate the monitored network behavior of the user in order to determine whether an anomaly behavior has occurred. In one or more embodiments, at least one processor uses the smart agent download software to compare the behavior profile for the user to the baseline profile (i.e. the baseline behavior profile) for the user. It should be noted that the processor(s) obtains the baseline profile for the user by: (1) obtaining the baseline profile for the user from the smart agent download, (2) by using the smart agent download software to initially monitor the network behavior of the user and subsequently using the monitoring data to create a baseline profile for the user, (3) receiving the baseline profile for the user from another node in the network, and/or (4) receiving the baseline profile for the user from a network operations center (NOC). It should also be noted that the baseline profile and/or the behavior profile (i.e. the updated behavior profile) may contain one or more behaviors. Then, at least one processor determines if there is a difference between the behavior profile for the user and the baseline profile for the user. At least one processor will flag an event associated with the difference when the difference exceeds a baseline threshold level (e.g., a certain predefined and/or programmable activity threshold), does not exceed a baseline threshold level, meets at least one criterion, and/or does not meet at least one criterion. In one or more embodiments, at least one criterion is related to: the location of the device 1200, authenticator device, or network component (e.g., a node) associated with the user (e.g., the location of the device 1200, authenticator device, or network component may be determined via Spot Beam Based Authentication as described in the description of FIGS. 19-22); the type of data passing through the device 1200, authenticator device, or network component (e.g., a node) associated with the user; the time the device 1200, authenticator device, or network component (e.g., a node) associated with the user receives the data; the day the device 1200, authenticator device, or network component (e.g., a node) associated with the user receives the data; the time the device 1200, authenticator device, or network component (e.g., a node) associated with the user transmits the data; the day the device 1200, authenticator device, or network component (e.g., a node) associated with the user transmits the data; the location of the origination source the data is transmitted from originally, and/or the location of the final destination source the data is being transmitted.

After the processor(s) has flagged an event, the processor(s) will classify the event to an event classification. The device 1200, authenticator device, or network component (e.g., a node) associated with the user may then use the event to update the behavior profile associated with the user and/or to selectively update one or more or all of the behavior profiles for other users that are located on itself (i.e. on the device 1200, authenticator device, or network component (e.g., a node) associated with the user). Additionally, the event may be used to selectively update one or more or all of the behavior profiles for other users that are located on other devices, authenticator devices, or network components (e.g. other nodes) in the network. It should be noted that the device 1200, the other devices, the authenticator devices, and/or the network components (e.g., nodes) may have one or more behavior profiles stored on them. Each of the behavior profiles is associated with a user (which may be a person, a group of people, or an entity), or is associated with an administrator (which may be a person, a group of people, or an entity). Alternatively, a behavior profile associated with an administrator may simply be a template behavior profile that is not associated with a person, a group of people, or an entity.

Then, at least one transmitter, associated with the device 1200, authenticator device, or network component (e.g., a node) associated with the user, will transmit the event to at least one other node in the network, which may contain behavior profiles for other users; and/or a network operations center (NOC). An event update will then be transmitted to the device 1200, authenticator device, or network component (e.g., a node) associated with the user. After the device 1200, authenticator device, or network component (e.g., a node) associated with the user receives the event update, at least one processor will use the event update to update the baseline profile for the user associated with the device 1200, authenticator device, or network component (e.g., a node). The device 1200, authenticator device, or network component (e.g., a node) associated with the user receives the event update from the smart agent download, at least one other node in the network, and/or the network operations center (NOC).

In one or more embodiments, once the NOC receives the event update (i.e. indicating that an anomaly in the activity of the user has occurred), the NOC sends a message to the smart agent download alerting the smart agent download software of the anomaly. After the smart agent download receives the message, the smart agent download triggers a specific task to be executed, where the specific task may be to shut down the geolocation hardware 1300 and/or the component or device 1200 associated with the user from operating completely or from operating on the network 1700. In other embodiments, after the NOC receives the event update, the NOC does not send an alert message to the smart agent download, but rather the NOC triggers a specific task to be executed, where the specific task may be to shut down the geolocation hardware 1300 and/or the component or device 1200 associated with the user from operating completely or from operating on the network 1700.

In other embodiments, instead of the NOC sending a message to the smart agent download notifying the smart agent download software of the anomaly, the NOC triggers a specific task to be executed. The specific task may be to log the anomaly in an anomaly listing stored in memory, to send a message to an operator of the NOC to remove the component or device 1200 associated with the user from the network 1700, and/or to shut down the geolocation hardware 1300 and/or the component or device 1200 associated with the user from operating completely or from operating on the network 1700.

Figure 2:
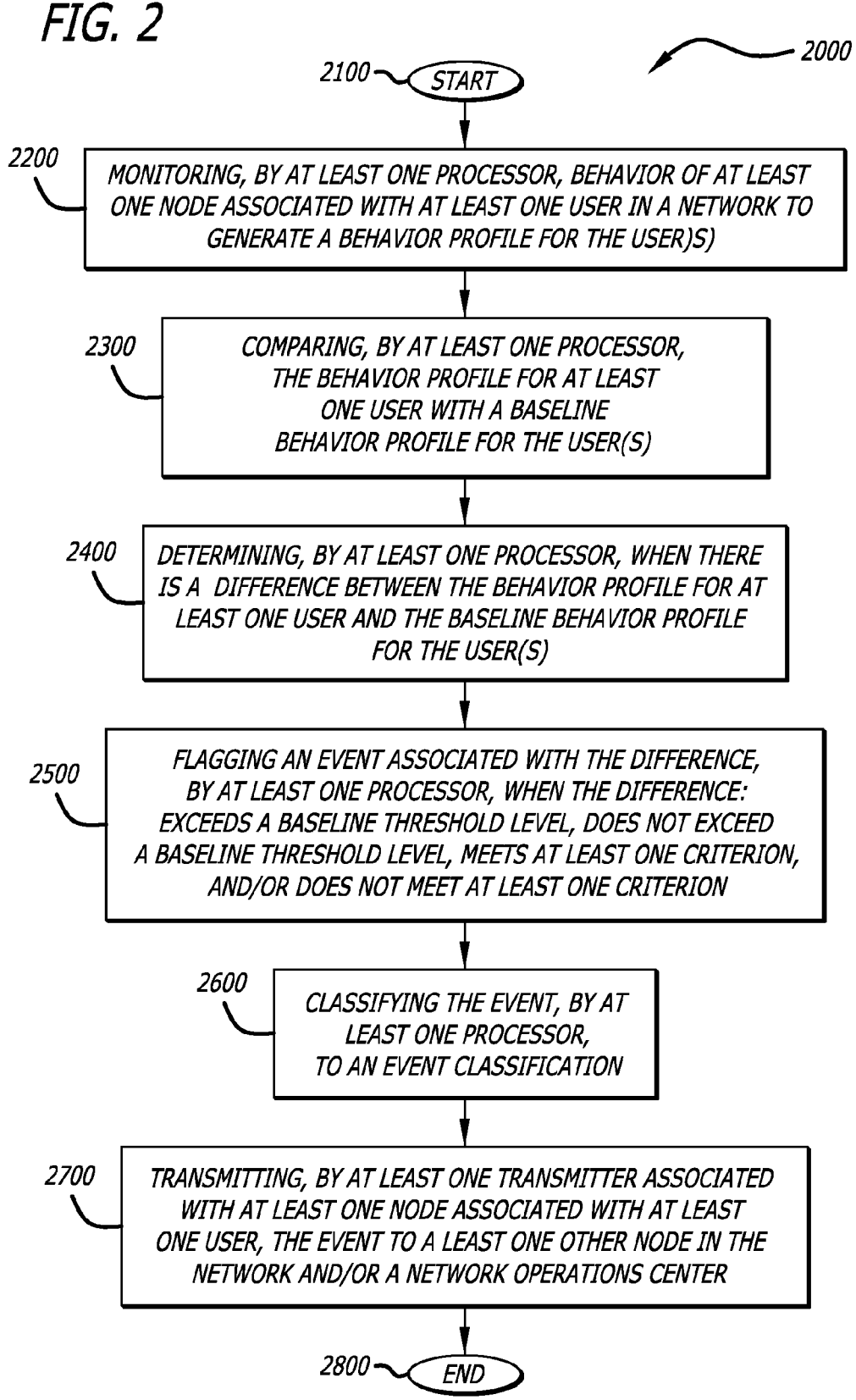

FIG. 2 is a flow diagram of the disclosed method 2000 for context aware network security monitoring for threat detection, in accordance with at least one embodiment of the present disclosure. At the start 2100 of the method 2000, at least one processor monitors the behavior of at least one node, associated with at least one user, in a network to generate a behavior profile for the user(s) 2200. Then, at least one processor compares the behavior profile for at least one user with a baseline behavior profile for the user(s) 2300. At least one processor then determines when there is a difference between the behavior profile for at least one user and the baseline behavior profile for the user(s) 2400. Then, at least one processor flags an event associated with the difference when the difference: exceeds a baseline threshold level, does not exceed a baseline threshold level, meets at least one criterion, and/or does not meet at least one criterion 2500. At least one processor then classifies the event to an event classification 2600. Then, at least one transmitter, associated with at least one node associated with at least one user, transmits the event to at least one other node in the network and/or a network operations center 2700. After the transmitter has transmitted the event, the method 2000 ends 2800.

Figure 3:
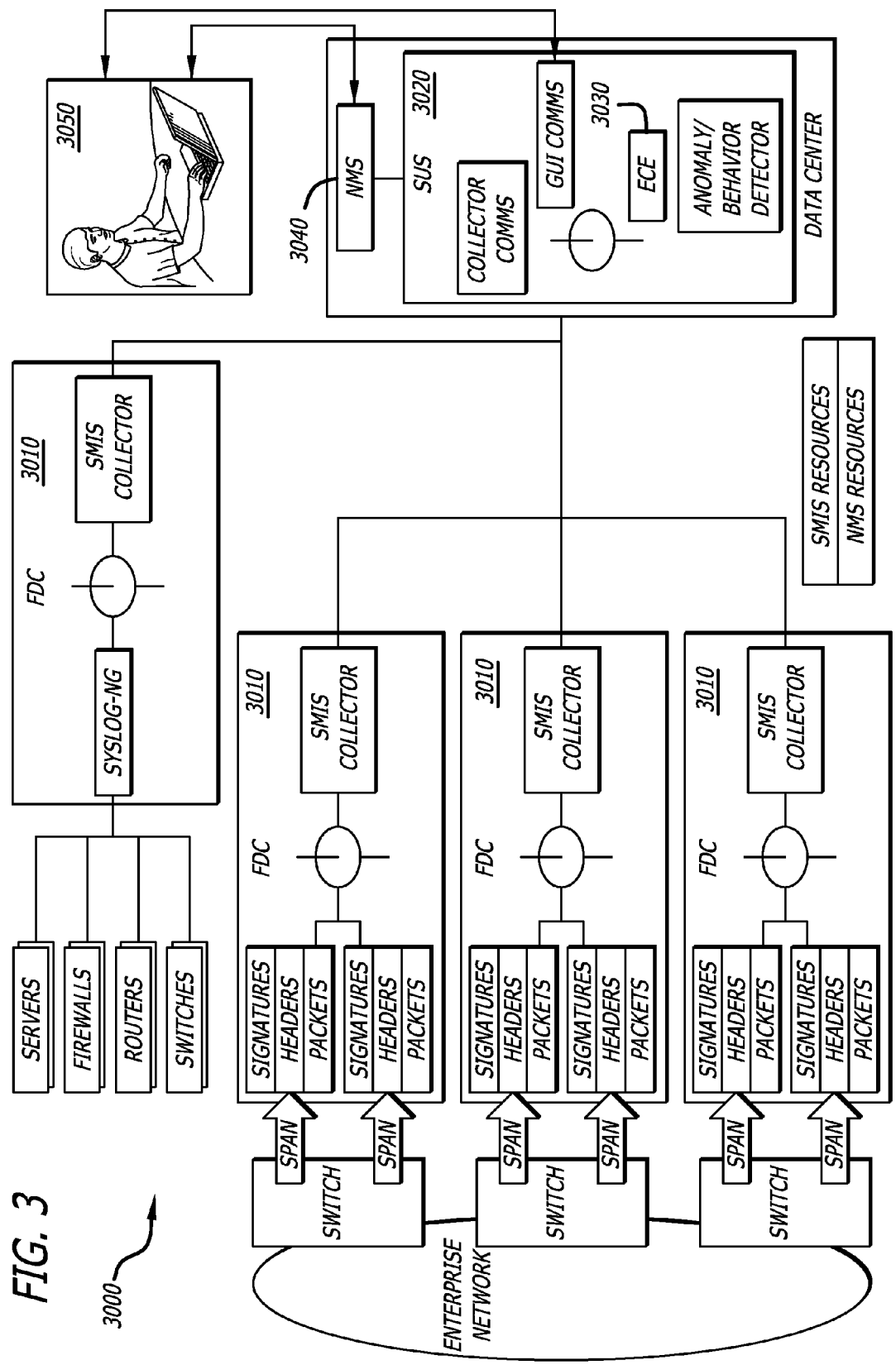

FIG. 3 is a schematic diagram 3000 of a Security Monitoring Infrastructure System (SMIS) that may be employed by the disclosed system and method for context aware network security monitoring for threat detection, in accordance with at least one embodiment of the present disclosure. The SMIS is a tool that aggregates cyber security and network monitoring data to provide a complete situational awareness picture. The SMIS provides a comprehensive, pre-integrated security monitoring solution, encompassing network sensors, data collection, data and event storage, incident handling, and report generation. The SMIS allows for information technology (IT) managers to monitor their networks in order to detect anomalies and attacks, isolate and analyze threats, and enable manual and/or automated decision support systems. The SMIS design architecture, illustrated in FIG. 3, consists of two key components, Forensic Data Collectors (FDC) 3010 and a Security Utility Server (SUS) 3020. As illustrated in FIG. 3, the SMIS deployments consist of multiple FDCs 3010, which are network sensors, located near the networking elements that need to be monitored. The FDCs 3010 are based primarily on commercial-off-the-shelf (COTS) solutions such as SNORT, an Intrusion Detection System (IDS), for signature based detection and other data collection and logging tools such as TCPDUMP and Syslog-ng. Information collected by the FDCs 3010 includes triggered events based on IDS sensor and header of IP packets, both internet protocol version 4 (IPv4) and internet protocol version 6 (IPv6), and the entire IP packets transiting across the particular networking element. Note that due to data storage constraints within a given FDC 3010, the available storage is setup as circular ring buffers with configurable limits. Hence, there are limits to the number of entire IP packets archived. It should be noted that since archival of headers is key to developing the context of transactional sessions, the headers are compressed prior to their archival to maximize the number of headers that can be stored in a given FDC 3010. Information collected by the FDCs 3010 is retrieved by the SUS 3020 and analyzed via an Event Correlation Engine (ECE) 3030 consisting of algorithmic anomaly and behavior detection routines. The SUS 3020 allows for the network manager to setup alerting criteria and thresholds when particular events of interest are detected by the FDCs 3010. When given conditions for a notification/alert to be generated are triggered, the SUS 3020 indicates them via a Network Management System (NMS) 3040 to the network manger using HTTP-based "thin-client" display at the Network Operations Center (NOC) 3050. One of the key differentiating attributes of the SMIS is its ability to determine/detect anomalous behavior, and build up the context of the normal traffic flows algorithmically that is relevant on a temporal basis over a configurable sliding window timeframe.

One of the key advantages of the SMIS is in the area of anomaly behavior detection since it is not dependent on the static signature/policy files, but it is tailored to the learnt nominal behavior for the particular device. The SUS 3020 uses the headers from the FDCs 3010 builds up a picture comprising the transactional sessions, or "conversations", as defined by the SMIS. The SMIS tracks the identified transactional sessions over a relevant period duration in accordance to the configuration settings and the state of each of the sessions. The SMIS defines a transactional session by the unique tuple space based on the source address, the destination address, the source port, and the destination port of the IP data packet's header. Once the transactional session or "conversation" is identified, its statistical behavior is established on a temporal basis. Initially this identified transactional session is also displayed, and also notified to the network manager via the HTTP-based "thin-client" for situational awareness. Once the system is operational under normal conditions over a period of time, the SUS 3020 establishes a statistically significant and temporally relevant nominal operation profile of the all the transactional sessions, or "conversations", that are expected to occur under nominal operational scenarios.

When new devices or applications are added to the operational system, these new transactional sessions are identified once they achieve statistical significance and/or conditions; then, a notification/alert is provided to the network manager for an updated situational awareness. If no exceptions are asserted by the network manager for the newly discovered transaction sessions or updates to the existing ones, they result in dynamic updates to the temporally relevant nominal baseline profile of the context. When new transactional sessions are identified that are beyond the statistical bounds of the nominal operational profile baseline, notifications and/or alerts are generated and sent to the network manager for an updated situational awareness, and the initiation of further analysis is enabled. Once a transactional session is determined to be an anomalous behavior that may lead to a cyber threat, mitigating steps are initiated.

Figure 4:
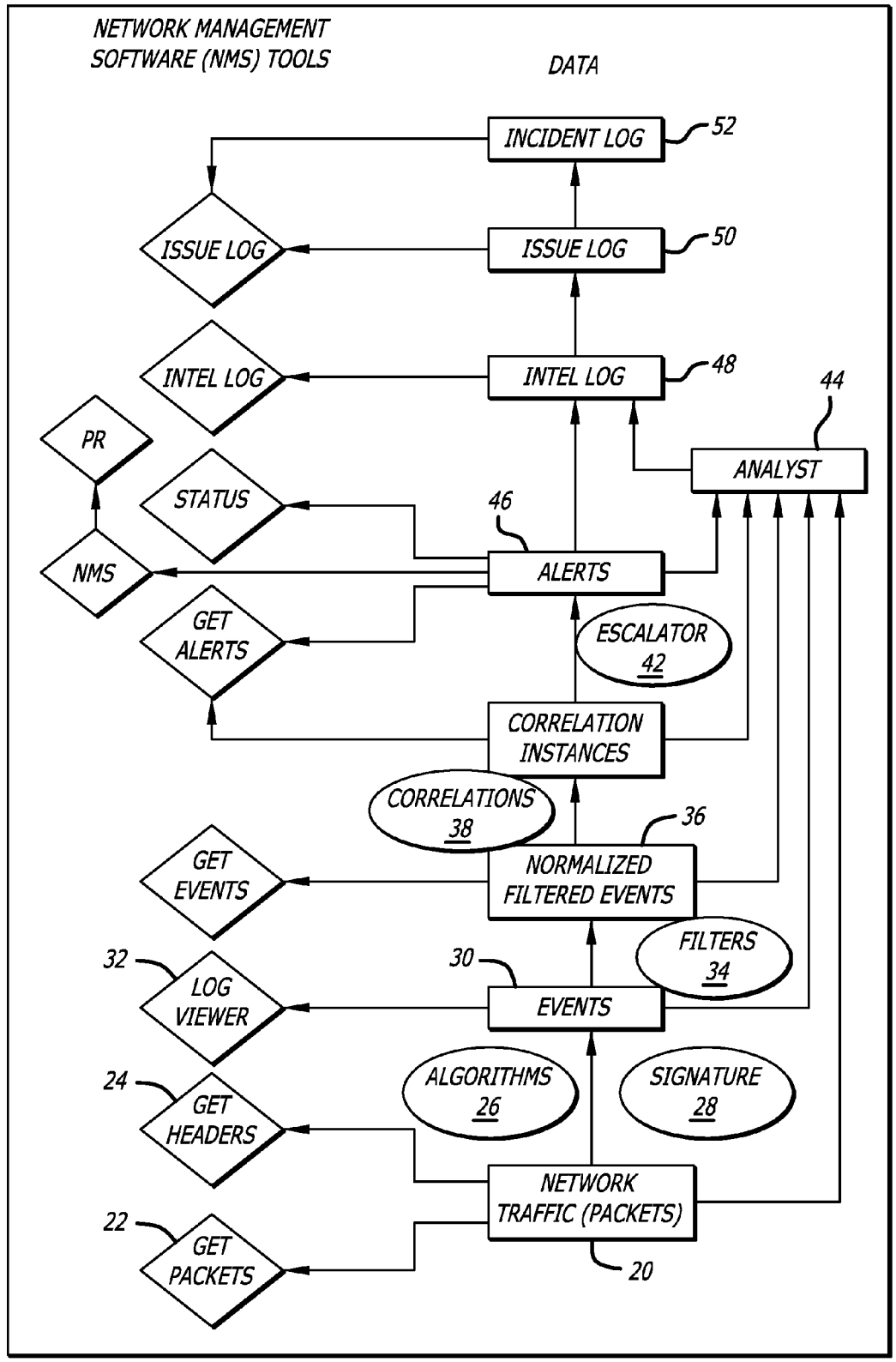

FIG. 4 is block diagram of the functionality of the SMIS of FIG. 3, in accordance with at least one embodiment of the present disclosure. As is known in the art, network security monitoring is based on the actual data packets passing through a network (e.g. Network Traffic/Packets) 20. The SMIS provides two means to view this level of data. The first of is a "GetPackets" tool 22, which allows raw access to a First-In-First-Out (FIFO) queue of all of the data packets observed by a sensor. The second tool at the Network Traffic layer 20 is a "GetHeaders" tool 24, which forms the basis for other system components throughout the SMIS system. Specifically, the SMIS collects, or captures, IP packets from a computer network, strips the packet header data from the captured IP packets, reviews the stripped packet header data for multiple occurrences of like-kind packet header data, and stores, for example in a database, a single instance of each unique packet header, for any reviewed packet headers that have been determined to have occurred multiple times.

More specifically, the SMIS captures complete header information from each packet, uses counters to represent the number of occurrences of multiple like-kind packets, and inserts specific header information into a database for display, further processing, and analysis. The SMIS allows only the complete header to be captured and stored, thereby reducing disk space requirements and eliminating the risk of packet header truncation. Also, the SMIS only stores a single copy of like-kind packets plus a counter, instead of storing every packet header separately.

Referring to FIG. 4, in the SMIS, the Network Traffic goes through both "Algorithms" 26 and "Signatures" 28 to create "Events" 30, which are the raw building blocks of the security analysis. These events may be created in the sensors based on sequential signature rule matches, e.g., traditional Intrusion Detection Systems (IDS) are based on this technology and it is quite mature, but events may also be created and placed into the event stream based on algorithms that process the packet data in non-sequential methods.

Security "Events" 30 can be viewed in the SMIS through a "LogViewer" tool 32. Security Events 30 are then passed through "Filters" 34 which are used to remove the events that are based on well known underlying conditions in the network, or which are deemed as normal activity and therefore should not be used as part of the correlation or escalation of security alerts.

After events have been filtered and normalized they are forwarded to a central repository, escalating them to "Normalized Filtered Events" 36 which can then be used to feed a correlation engine. "Correlations" 38 are general rules or algorithms used to automatically group and score "Normalized Filtered Events" 36 into "Correlation Instances" 40. These "Correlation Instances" 40 can then be scored and tracked over time via the "Escalator" 42, which is used to determine whether a given Correlation Instance 40 should be escalated to the attention of the security "Analyst" 44.

At the point of the "Alerts" 46, the human becomes part of the handling process, through, for example, one or more of status messages, indications from the network management software, and a get alerts process. A problem report (PR) indicator is utilized to indicate how an external problem report system might be connected into the SMIS system. Up to this point the entire system is built to automate the processing of the huge volume of network and security data so that only the most important data is presented to the analyst for human investigation. At this point the human analyst can gain access to every single level of the security data environment to make the necessary evaluations and analysis to determine whether a single or group of security alerts need some form of response.

The SMIS provides a complete drill down from the Alerts 46 down to the Correlation Instances 40, Normalized Filtered Events 36, Events 30, and the packet headers and raw packet data itself, all from within a simple point and click environment. The SMIS also provides additional higher levels of security data processing. Once an Analyst 44 has reviewed the Alerts 46 and all the data that fed into that escalation, he/she can insert the human intelligence into the process by putting a comment into the "Intel Log" 48 which is automatically associated with the "Alert" 46 (as appropriate). If there are a number of "Alerts" 46 that are all related to the same underlying issue, the SMIS provides a means to associate multiple Intel Log entries (and by reference the underlying Alerts 46, Correlations 38, Normalized Filtered Events 36, etc.) into a single "Issue Log" 50 entry which can then be tracked and reported on. Finally, if necessary, the SMIS provides the concept and tools of an "Incident Log" 52 based on the "Issue Log" 50 entries to escalate the issue to a formal security incident response.

The SMIS provides full access to the entire environment of security data pyramid integrated within the same environment, providing simple point-and-click access to all of the data from every other level.

It should be noted that to complement the SMIS, smart agent download's can expand on its functionality, which relies primarily on port sniffing. The addition of the downloaded smart agent algorithms allow for each node to monitor its computing, storage, and communication usage versus just the data packets flowing in and out of the node. This enhances the SMIS infrastructure as previously described by allowing the system to allow for quick event correlation for unknown cyber threats, and further disseminate the learnt anomalous behaviors for improved mitigation of these threats across the network.

Figure 5:
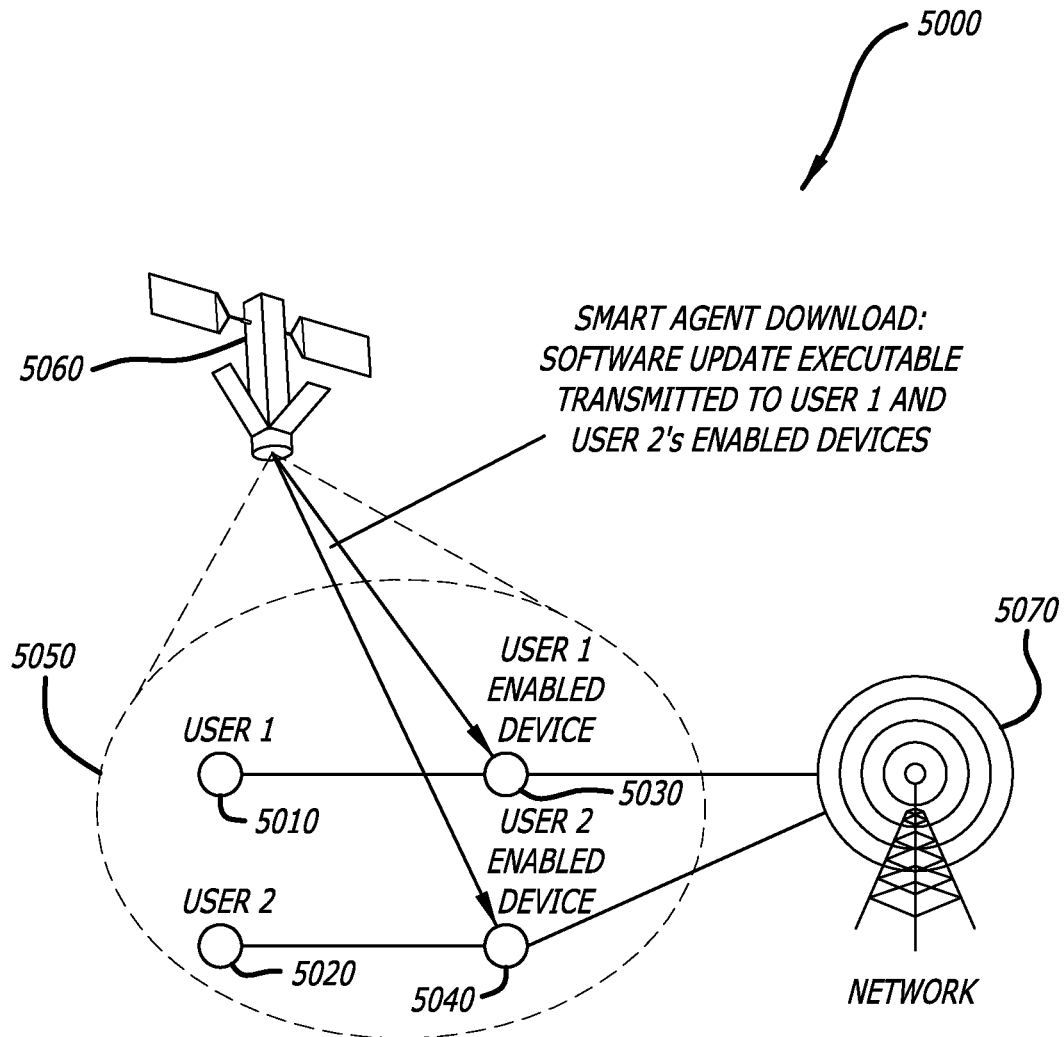

FIG. 5 is a schematic diagram of the disclosed system 5000 for context aware network security monitoring for threat detection aided by a smart agent download (i.e. a software update), in accordance with at least one embodiment of the present disclosure. In this figure, there are multiple users 5010, 5020 with enabled devices (e.g., enabled network nodes) 5030, 5040 within a given spot beam 5050 that is radiated from a satellite 5060. The user's device 5030, 5040 contains a software algorithm that is known a priori (e.g., the software may have been installed on the device 5030, 5040 when the device 5030, 5040 was activated, in the case of it being a cell phone or other similar device; or the software may have been installed on the device 5030, 5040 through an application download after activation of the device 5030, 5040). As cyber threats are constantly evolving, the device 5030, 5040 may continue to receive software updates to tailor the algorithm for both existing and emerging threats. These software updates may be received via a smart agent download that is transmitted from a transmission source on an enabled satellite 5060 to the enabled device 5030, 5040, which is capable of receiving the download, storing it into memory, and executing it. The enabled device 5030, 5040 is connected to a network, which may be wired and/or wireless. In this figure, the enabled devices 5030, 5040 are connected to a wireless network that employs a cell tower 5070 as a relay.

Figure 6:
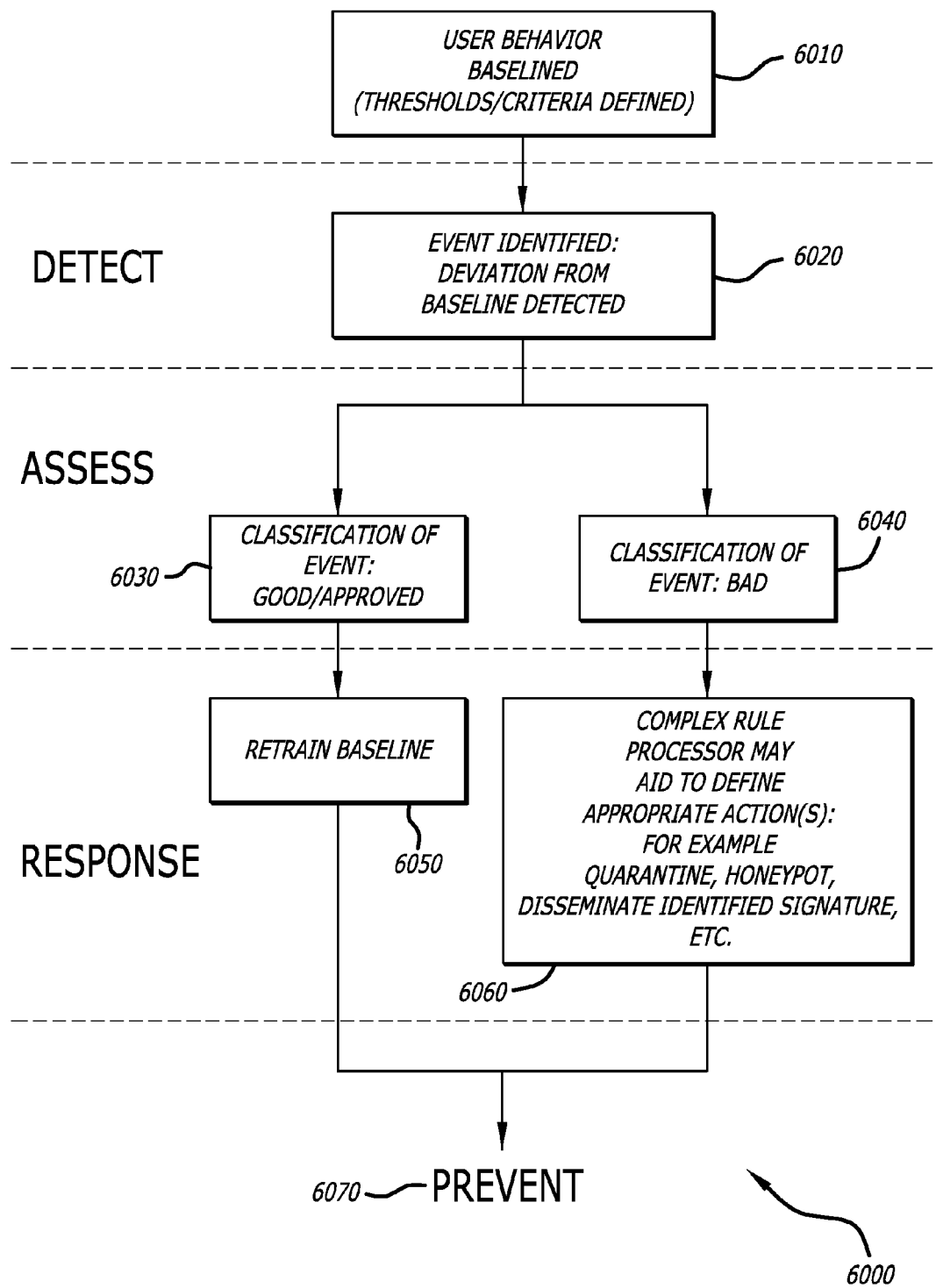

FIG. 6 is a flow diagram of a general overview of the disclosed method 6000 for context aware network security monitoring for threat detection, in accordance with at least one embodiment of the present disclosure. At the start of the method 6000, by utilizing a smart agent download, a user's behavior on a particular node (e.g., a device, such as a computer) is baselined (i.e. a baseline behavior profile is created for the user of the node) 6010. In order to monitor the user's behavior for deviations, thresholds and/or criterions are defined to aid in flagging appropriate events. In one example, a network policy server may define the thresholds and/or criterions, while in other examples the thresholds and/or criterions are managed more locally to make sure that they are also being appropriately tailored based on a specific user's nominal usage on a particular node. Deviations from the baseline are detected and are flagged as events 6020, and then classified as a good/approved event 6030 or a bad event 6040. An approved event, for example, might be an employee (i.e. the user) checking a local news website during his working hours on his desktop computer (i.e. the user's associated node), when typical usage shows the employee accessing the same website during their lunchtime. While a bad event, for example, may be an event where malware from an email has been executed, which may be identified through non-typical usage. If an event, is proven to be good/approved, the algorithm may be retrained 6050 to include this event within its baseline of one or more user behavior profiles for one or more nodes. If the event is correlated to be bad, a complex rule processor may aid in defining the network's appropriate response 6060. This may include quarantining a given node if malware is statistically likely. As the bad events are classified and understood, the network may additionally disseminate the anomalous behavior patterns to other nodes to increase the likelihood of preventing other infected nodes 6070.

Figure 7:
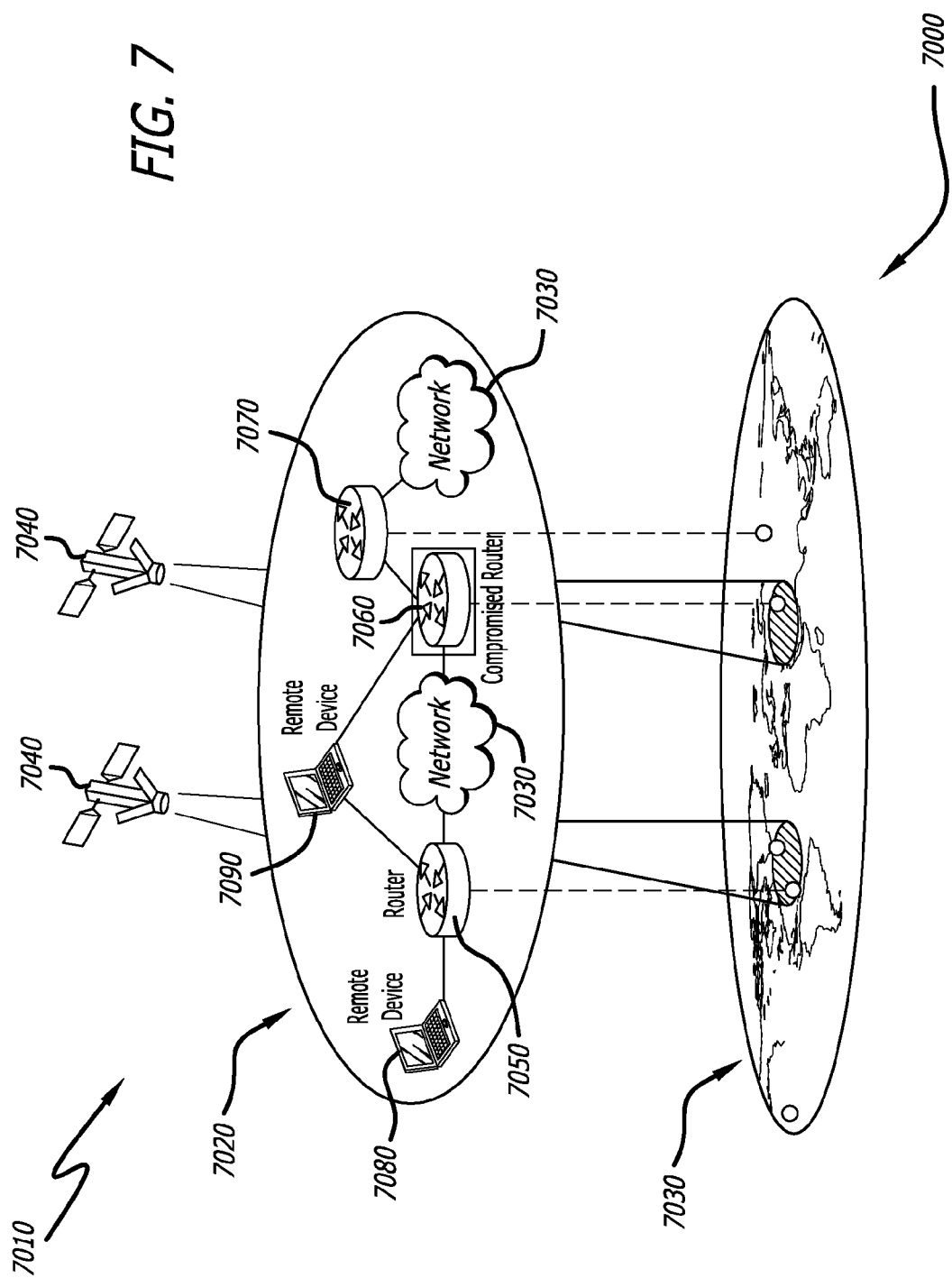

FIG. 7 is a topological diagram 7000 of the disclosed system for context aware network security monitoring for threat detection where the system is employing geothentication enabled routers 7050, 7060, 7070, in accordance with at least one embodiment of the present disclosure. This figure shows a meshed physical framework 7010 that correlates a logical topology 7020 to a physical topology 7030 of a network. In this figure, the logical topology 7020 relates to the way data is transferred within the network. In this case, data (i.e. IP data packets) is transferred throughout the network 7030 via a plurality of geothentication enabled routers 7050, 7060, 7070, and devices (i.e. laptop computers) 7080, 7090.

The physical topology 7030 relates to the physical network design, and in this application is based on the node (i.e. router) 7050, 7060, 7070 locations on or near the Earth's surface. The disclosed system uses satellites 7040 and receivers to allow the geothentication of the enabled network nodes (i.e. routers) 7050, 7060, 7070 to geolocate themselves. (Refer to the Spot Beam Based Authentication Section of the present disclosure for a detailed description of the geothentication process.) Their physical locations can then be mapped against an IP protocol logical mapping in order to help improve network security. For example, a compromised network node 7060, such as a router 7060, can be identified and blocked, for instance by the NOC by sending a notification either directly to the compromised node's chipset or to a gateway node in an affect of quarantining the area of concern.

In addition, traffic flow (end-to-end) (i.e. the time it takes a data packet to transcend through the network) and the paths in which the IP data packets are passed are also known. Through this information, the configuration management of the system of routers can be better understood. This has several potential applications including understanding whether a cyber attack is occurring, as well as, data routing selection.

Figure 8:
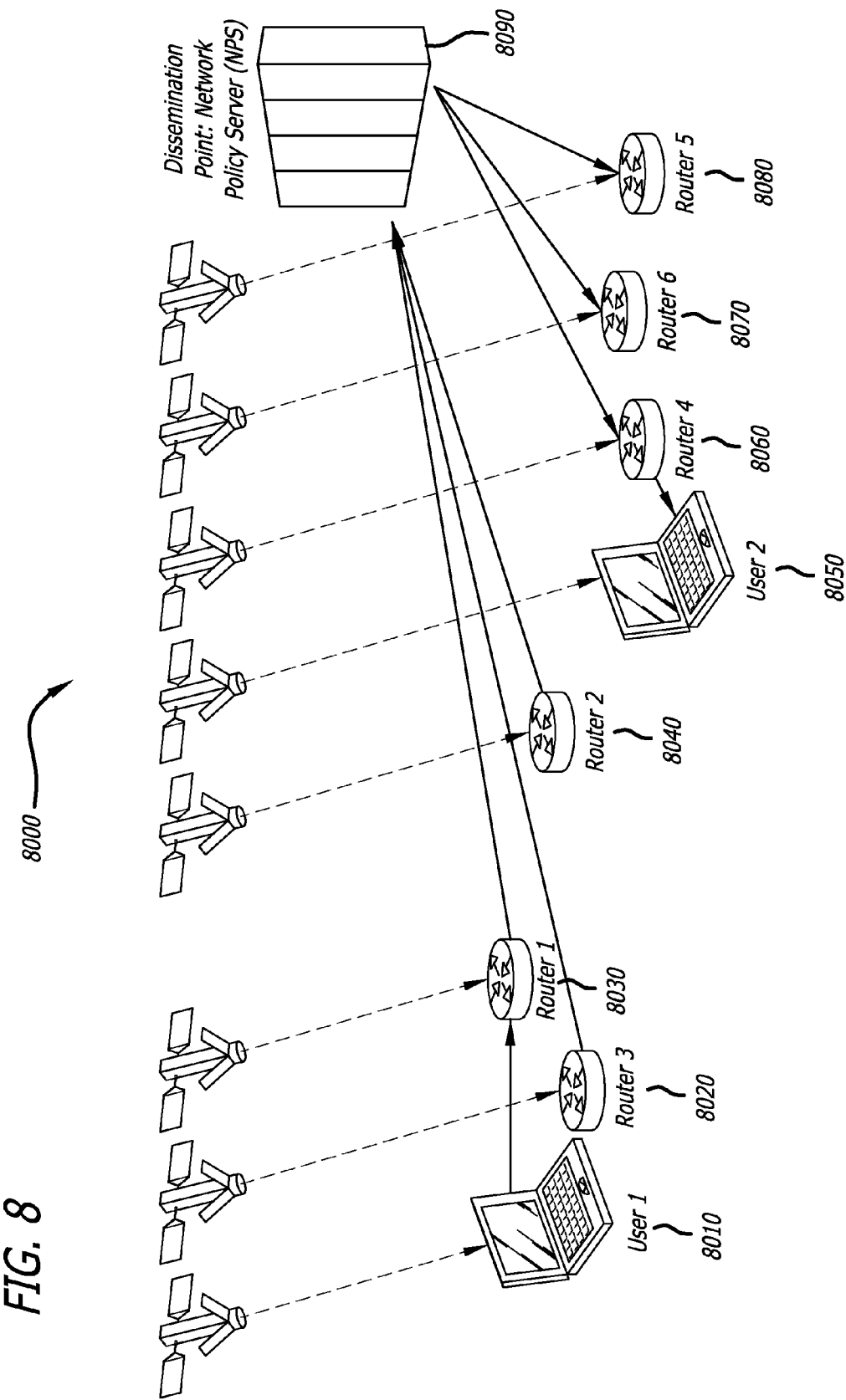

FIG. 8 is a schematic diagram 8000 of the disclosed system for context aware network security monitoring for threat detection where the system is employing a Network Policy Server (NPS) 8090, in accordance with at least one embodiment of the present disclosure. In at least one embodiment, a node associated with a user uses standard machine learning algorithms to establish a baseline profile for its user, which the node can then use to aid in identifying behavior deviations. The node then detects with an anomaly detection mechanism that some behavior is out of the norm (i.e. there is a deviation in the behavior, which is in the behavior profile, from the baseline profile). The node can then assume that other nodes within the vicinity of itself may also have been or will be affected by this same event, if it is indeed under some sort of cyber attack. The node may flag this event, and pass it along to a dissemination point, for example a policy server, which could then assess the event and provide the appropriate response. In at least one embodiment, the node itself may do its own assessment prior to providing the event to a dissemination point. Through this means, one node may be on the leading edge (e.g., a forward router sees the attack before other trailing routers), and the information can be flowed throughout the system. Thus, the forward router(s) can teach anomalous behavior to other routers via a dissemination point, such that each individual router does not have to learn the abnormal behavior on its own.

In this figure, four nodes 8010, 8020, 8030, 8040 (i.e., one user device 8010 and three routers 8020, 8030, 8040) are being bombarded by a cyber attack. They may exchange information or report that information to a fusion center (e.g., a Network Policy Server (NPS)) 8090, which takes the detected anomalies and helps to further define the events, such as coming to a more conclusive decision as to whether there is or is not an attack. Since multiple nodes 8010, 8020, 8030, 8040 are detecting similar abnormal behaviors, it has become statistically significant that an attack is likely occurring. This fusion center/dissemination point 8090 can then use this information to push out a new policy to other downstream local nodes 8050, 8060, 8070, 8080, or may chose to push the policy out to the entire network. Other actions may include a peer group being used to block it or quarantine the threat.

In this example, for example, there could be a peer group of nodes located in an immediate network vicinity. In some embodiments, this may include user nodes that join the network at one location but are located in different geographic areas (i.e., two users each on a node, where one node is located in Seattle and the other node is located in San Jose, join the same network through a virtual private network (VPN) process that is run on a server located in Southern California), but from a network overlay prospective the users/nodes are in the same group. If one of the nodes detects an anomaly, they may flag it to a dissemination point in Southern California, and then that information could be relayed to the other node in the peer group.

Figure 9:
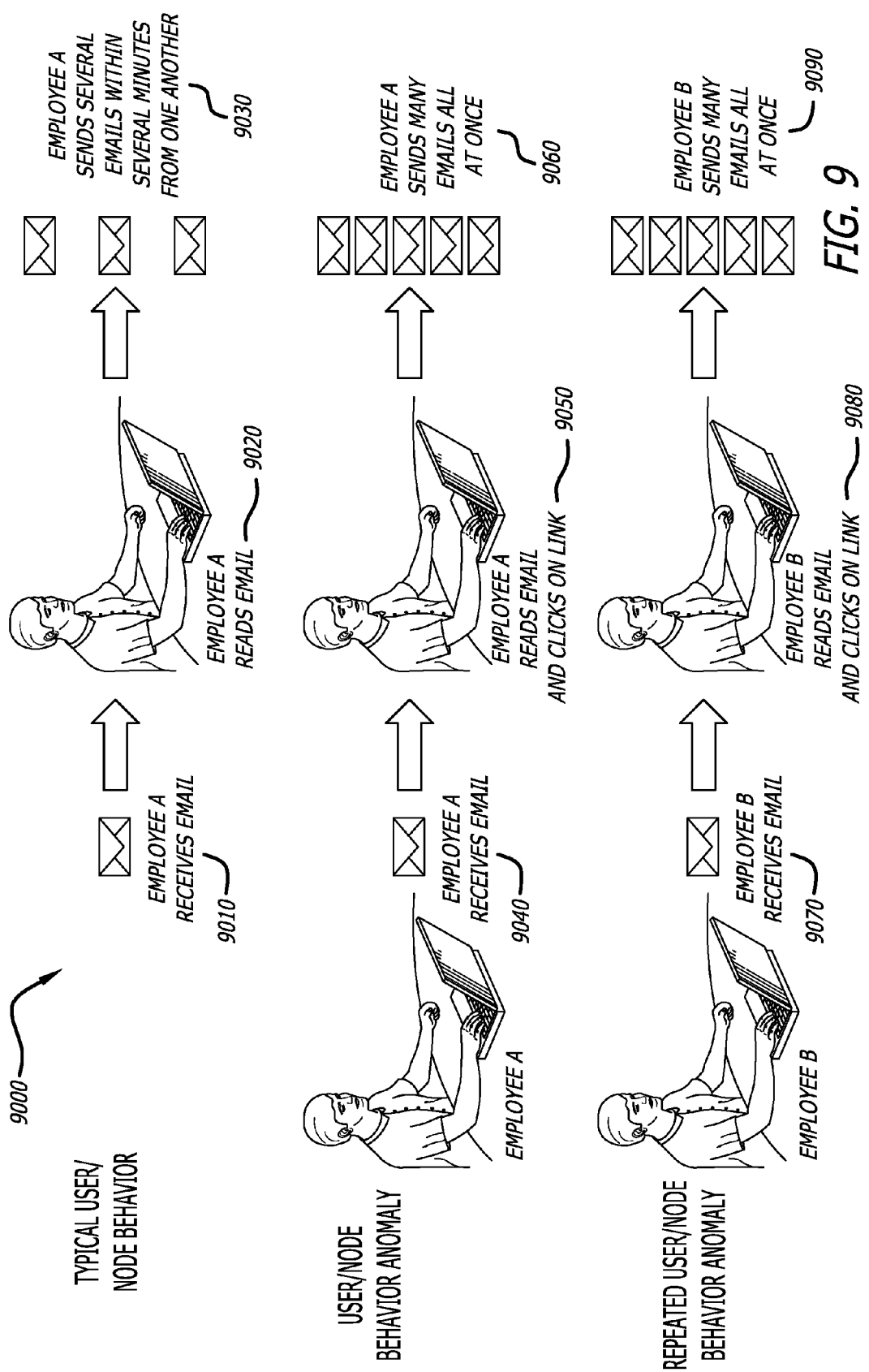

FIG. 9 is a schematic diagram 9000 of the disclosed system for context aware network security monitoring for threat detection illustrating the feature of monitoring user/node behavior, in accordance with at least one embodiment of the present disclosure. In this embodiment, a node has already established a baseline profile for a user of the node. An anomaly is detected (i.e. a deviation in the behavior from the baseline is detected). The system must determine if it is a bad or a normal shift in the behavior pattern (i.e. whether the user simply shifted their means of using something). The event is classified to aid in the determination of whether the event is a negative or neutral/good event. Such consideration may be contextual, such as in this situation, it is known that network flows are temporally dependent. For example, an employee (i.e. a user) checking a news website on their device (e.g., desktop computer) during their lunchtime may be a baseline event, which is temporally nominal. It is a valid traffic flow that is also conditional to a time of day, namely lunchtime for the user.

In this figure, typical behavior for employee A is to receive an email 9010, open the email to read the email 9020, and send several emails within several minutes from one another 9030. In this example, employee A has received an email with a virus 9040. Employee A unknowingly starts spreading the virus when they open the email and click on the attached link within the email 9050. The link may immediately send batches of emails (within several minutes from one another) that contain the virus link 9060 to individuals in employee A's address book to pass the virus forward. The node may recognize that this is an anomalous behavior because typically employee A does not send a large amount of emails all within a close timeframe, but may not recognize whether it is a bad event or whether the behavior of employee A has suddenly shifted. In the meantime, employee B receives an email containing the same virus link 9070, and a similar node behavior pattern occurs (i.e. employee B unknowingly starts spreading the virus when they open the email and click on the attached virus link, which sends batches of emails containing the virus link) 9080, 9090. As the odds of this happening on multiple machines (i.e. multiple nodes) is very low, the system may now be able to classify this behavior as a bad event. As more machines (i.e. nodes) identify these same behaviors, it quickly becomes clear that this is a cyber attack.

The system has been able to classify the behavior and attributed it to be a bad behavior. Working backwards, it can be determined that the virus was distributed by a user clicking a virus link and, thus, the delivery mechanism has been identified. In this scenario, the system may take immediate action to quarantine the virus, slow down emails, and may additionally review the individual node behavior to see whether the virus has propagated to/through them. In some embodiments, this could be an automated or partially automated (e.g., man-in-the-loop process where an individual human reviews the forensics of the activities and uses that information to help to guard other nodes). In at least one embodiment, a dissemination point may relay a new policy that has the node respond to such an attack by self-quarantining itself.

Figure 10:
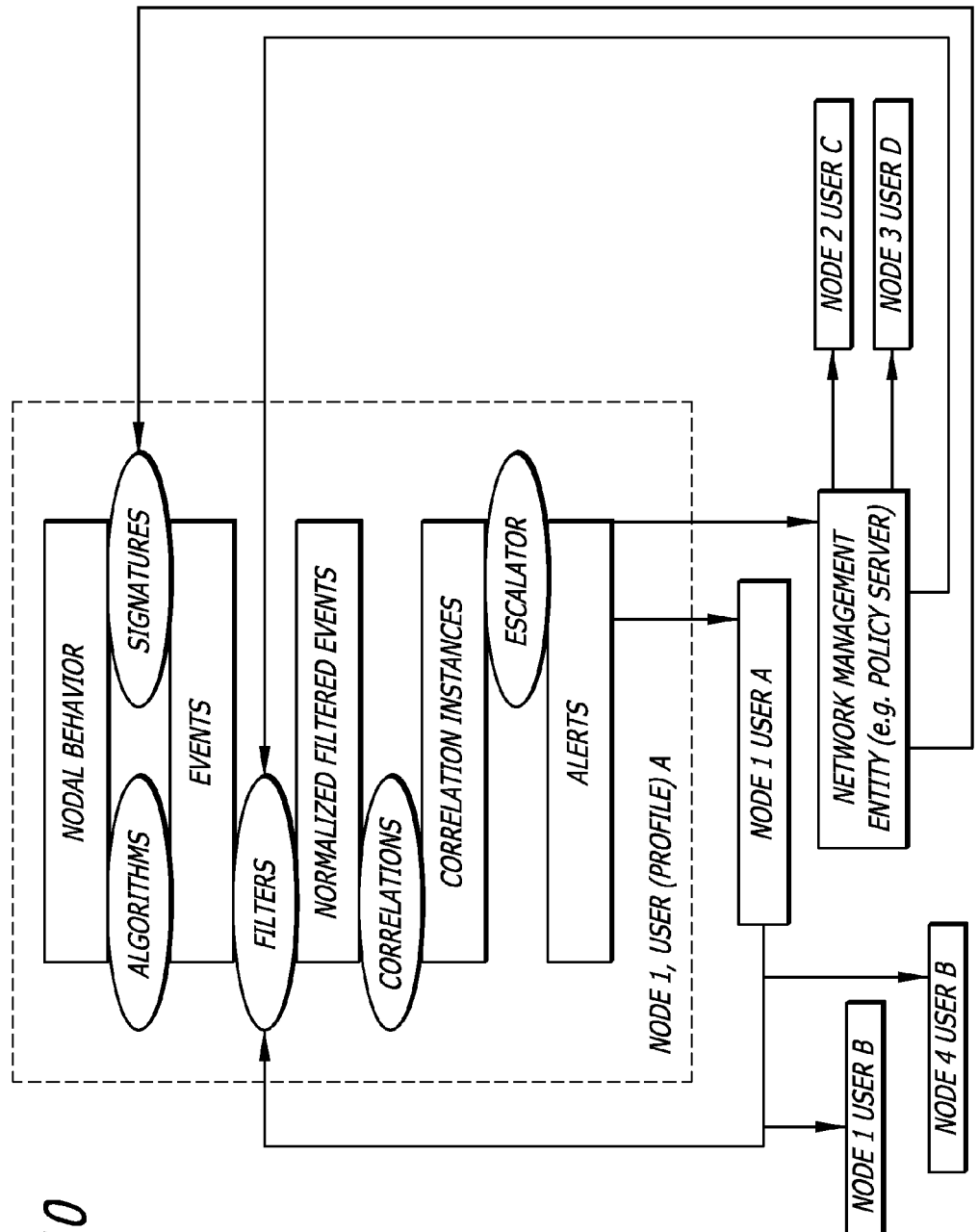
Figure 11:
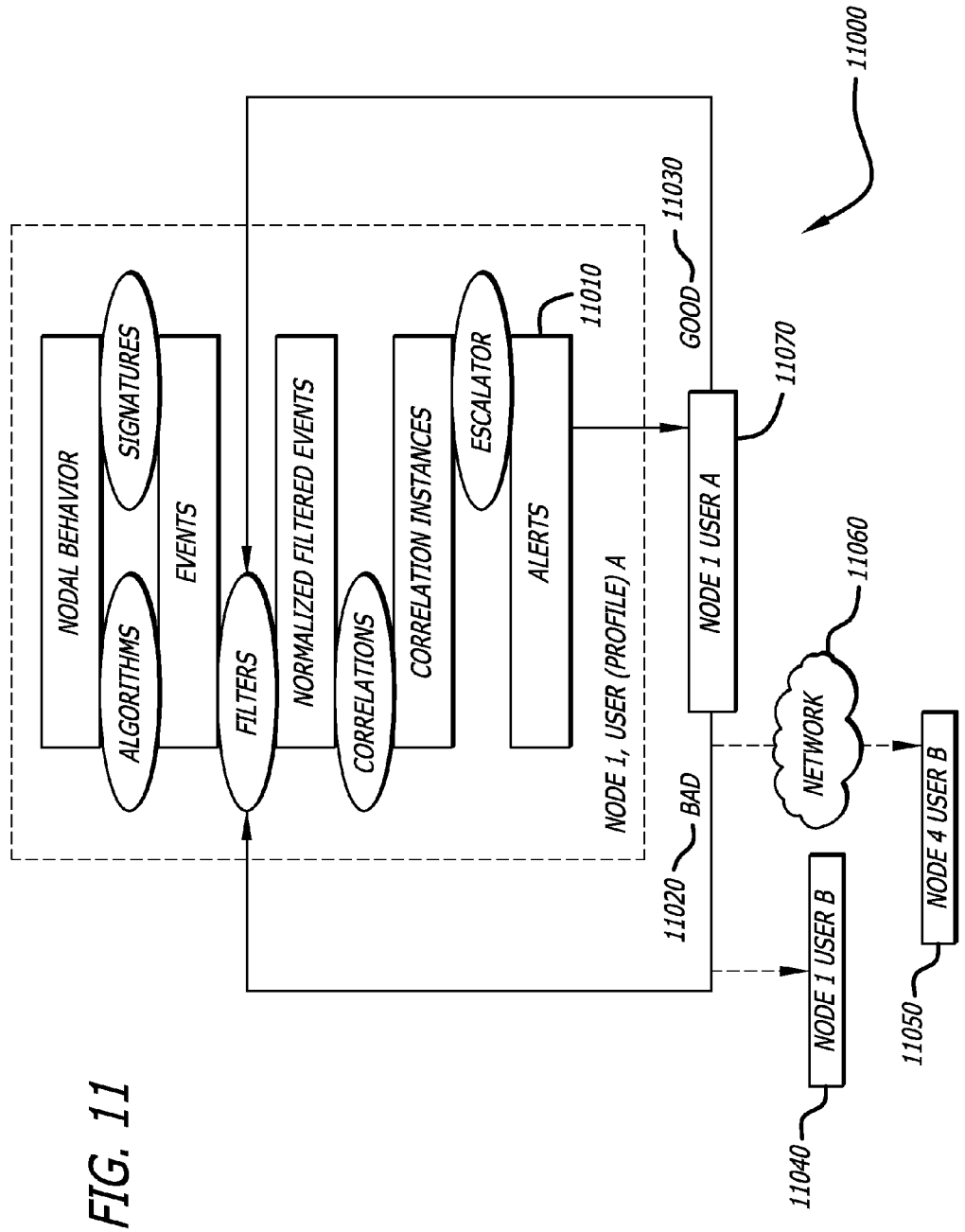
Figure 12:
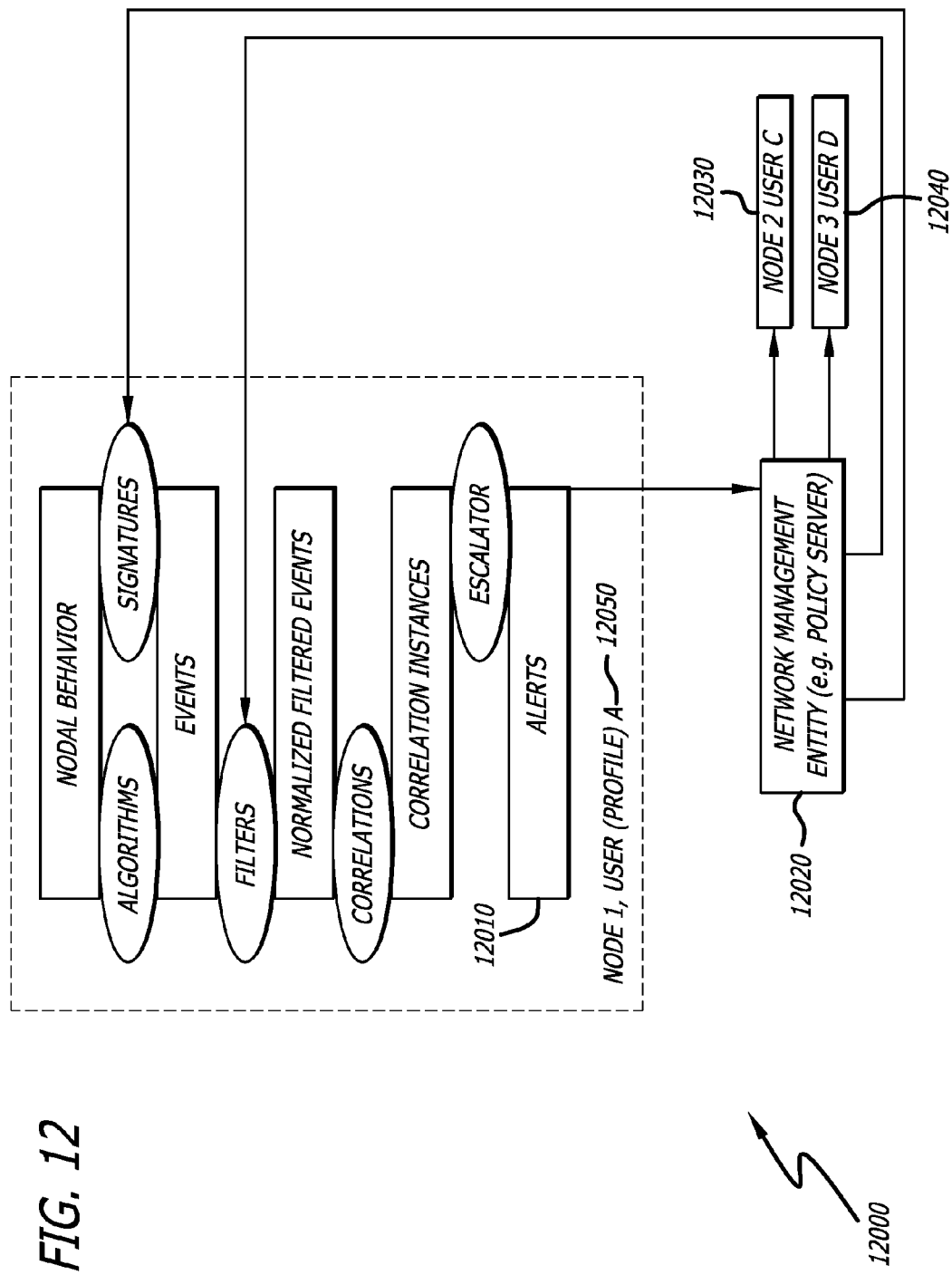

FIG. 10 is another block diagram of the functionality of the SMIS of FIG. 3, in accordance with at least one embodiment of the present disclosure. FIG. 11 is a block diagram 11000 of the functionality of the SMIS of FIG. 3 illustrating the feature of retraining at least one node of at least one detected anomaly behavior, in accordance with at least one embodiment of the present disclosure. FIG. 12 is a block diagram 12000 of the functionality of the SMIS of FIG. 3 illustrating the feature of retraining at least one node of at least one detected anomaly behavior via a network management entity, in accordance with at least one embodiment of the present disclosure. It should be noted that FIG. 10 is a combination of FIGS. 11 and 12, and as such, only FIGS. 11 and 12 will be described in detail below. The descriptions of FIGS. 11 and 12 will apply to FIG. 10.

In FIG. 11, an alert 11010 has been issued. In one example, a user (i.e. User A) may receive a prompt from the node (i.e. Node 1) that the user is using to assist in the event being classified as "good" 11030 or "bad" 11020. If the event is classified as "good" 11030 by the user (i.e. User A) at the prompt, the node (i.e. Node 1) will then retrain the node's baseline profile for the user (i.e. Profile A) so that in the future, the node will have already learnt about this behavior, and no action will be required by the user for the system to realize that it is a normal event. If the event is classified as "bad" by the user at the prompt, the node's baseline profile for the user (i.e. Profile A) will be similarly retrained.

However, in this case, the system may also update other user (e.g., User B) profiles (e.g., Profile B) for the same node (i.e. Node 1) 11040 and/or inform other local/peer nodes (e.g., Node 4) 11050 of the threat that it detected. In FIG. 3, Node 1 is associated with User A, and their associated profile (i.e. Profile A) may receive an alert, and the node may classify it as "bad". Then, Node 1 will respond by retraining the baseline profile (i.e. Profile B) for a second User (i.e. User B). Additionally, Node 1 11070 may relay this information through the local network 11060 to local/peer nodes (e.g. Node 4) 11050 the same information, so that they can retrain their baseline profiles for their users (e.g., Node 4 retrains the baseline profile (i.e. Profile B) for User B).

FIG. 12 illustrates another variation, where instead of an alert 12010 being issued and a prompt being provided to a local user (i.e. User A) 12050, the alert is being issued to a Network Management Entity (NME) 12020, for example, a policy server. At the NME 12020, an additional understanding can be gained in monitoring at least two nodes (e.g., Node 2 12030 and Node 3 12040) within a network to obtain additional information related to the way threats propagate throughout the system. As the NME 12020 learns information regarding threats, it could provide updates to the nodes it is servicing (e.g., Node 1 12050, Node 2 12030, Node 3 12040) and/or additional nodes (not shown) as well. In one example, the NME 12020 may send updated threat signatures that an upstream node (i.e. Node 1) 12050 identified to downstream nodes (e.g., Node 2 12030 and Node 3 12040) via some terrestrial network. In another example, the NME 12020 may send information to retrain a baseline profile for a specific user or multiple profiles, and/or update threat signatures. In at least one embodiment, these updates could be done by utilizing smart agent downloads (e.g., via the Iridium constellation of satellite), which are downloaded by enabled nodes as shown in FIG. 13.

Figure 13:
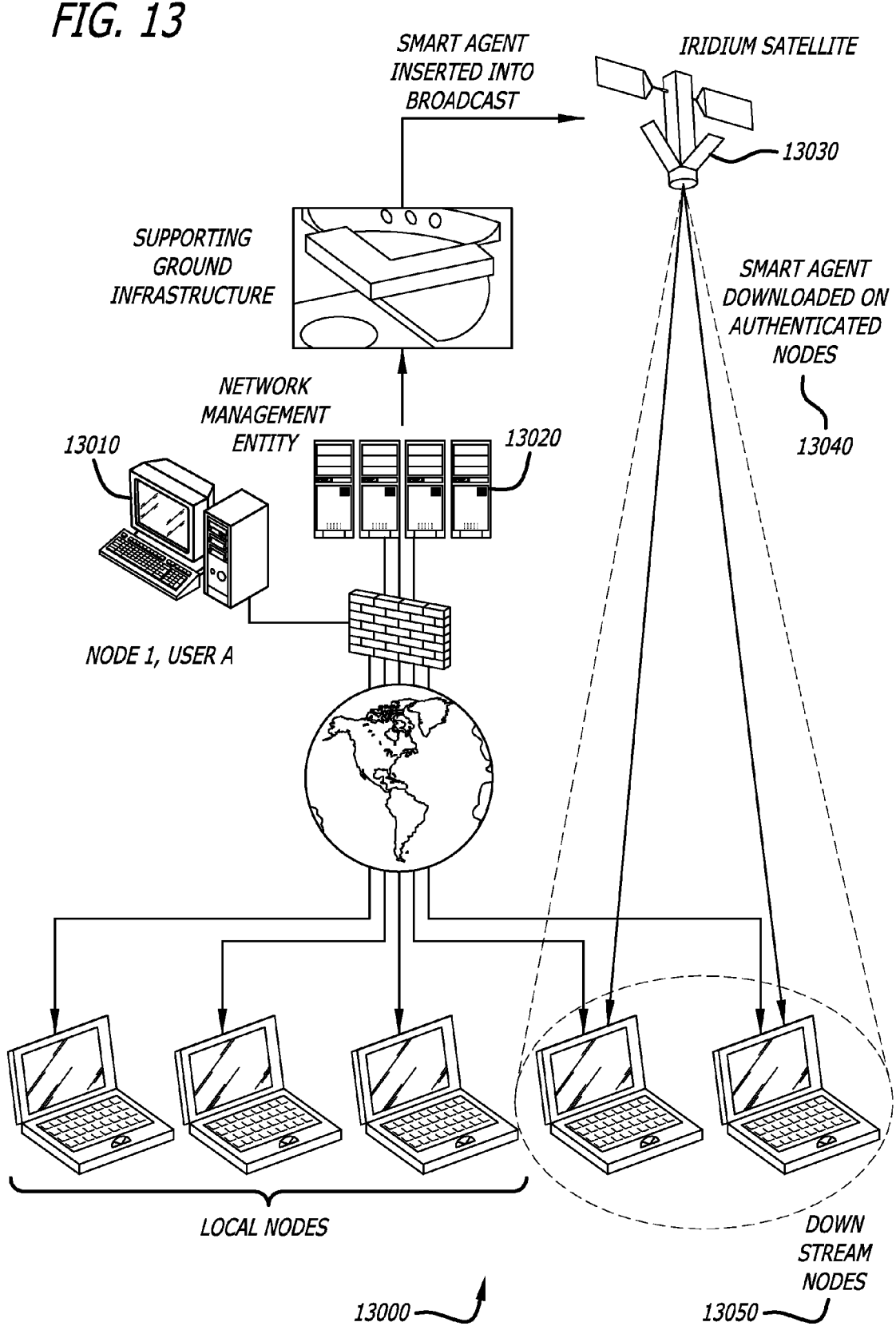
FIG. 13 is a schematic diagram of the disclosed system for context aware network security monitoring for threat detection aided by a smart agent download where the system is employing the SMIS, in accordance with at least one embodiment of the present disclosure.

FIG. 13 is a schematic diagram 13000 of the disclosed system for context aware network security monitoring for threat detection aided by a smart agent download where the system is employing the SMIS, in accordance with at least one embodiment of the present disclosure. For an example, there are three users (i.e. User A, User B, and User C) in the system, which is being monitored. User A has access (i.e. defined user profiles) to two nodes (i.e. a laptop computer 13010 and a cell phone that are both associated with User A). User B has access to three nodes (i.e. a laptop computer and a cell phone that are both associated with B, and a shared lab desktop computer). User C has access to two nodes (i.e. a cell phone and the same shared lab desktop computer as User B has access).

In one example, User A's baseline laptop profile has learned that User A typically signs onto the laptop 13010 between 8 and 8:30 AM Pacific Standard Time (PST). User A's profile also indicates that User A uses Google Chrome (i.e. a particular web browser) to view a local news website as well as to access all other websites, and that User A also checks their email at the time of logon and responds to each email typically with one response email or potential alternatively with multiple response emails that occur no sooner than a predefined time X between transmissions (i.e. sending). One morning, User A logs in at their typical time, and proceeds to check their local news website. However, on this day, in lieu of using Google Chrome, User A uses Internet Explorer. This is a deviation from User A's baseline profile and, thus, it is flagged as an event.

For the sake of simplicity, it is assumed that corresponding actions require User A to be informed via a prompt about the occurrence of this event (i.e. the threat grade for the correlation of this item exceeds its threshold as perhaps the thresholds are set in such away to allow this to become a concern, though in practice this may not be the case). Thus, User A, when prompted, may classify this event as a "good" event, for reasons known to User A, and the baseline for User A's profile may be retrained.

In an alternative example, User B has logged onto their personal email account on the node they share with User C. User B opens an email that contains a suspicious file, and opens it not realizing the potential repercussions of their actions. At this instant, a malware executable file goes to work, and is able to send a mass emailing to individuals in User B's local contact database, which includes both personal and work parties. In this example, the system is set up to monitor data packets sent to and from the node as well as how the user operates its email application. As the system is trained to know that User B cannot realistically send out separate individual emails to dozens of contacts within mere seconds, the system identifies this as an event outside the norm for User B.

In this example, the system is capable of making this distinction without prompting the user, because it is outside of any potential operable norms (i.e. there may be different thresholds for events that may trigger different actions (for example, prompt the user of the node, alert the NME 13020, quarantine the node, etc.) dependent on the context of the situation of the event(s) at hand). The node may alert the NME 13020 where details regarding the threat could be used to send an update via Smart Agents 13040 (i.e. executable file updates are sent to the nodes via Iridium satellites 13030) to downstream nodes 13050 regarding the threat so that they are protected from it. Additionally, the NME 13020 may quarantine the node, or the node itself may be capable of recognizing such issue and self-quarantine itself.

II. Network Topology Aided by a Smart Agent Download

The methods and apparatus disclosed herein provide an operative system for a network topology aided by a smart agent download. Specifically, this system relates to downloading smart agent software to enabled system and/or network components or devices as needed to support technology advancements and evolving security threats. The disclosed system is able to download the smart agent software to components or devices that are located in attenuated environments, such as indoors. In addition, the disclosed system can be used along with various different geolocating methods to physically map the devices against a typical internet protocol (IP) framework, which identifies where a specific device is accessing a given network from in terms of a physical location (e.g., the IP address of the device may be used to identify the physical location of the device. Similar to a phone number area code, the IP address of a device describes the physical location/region of the device.). The smart agent software is used to monitor various different types of network behavior so as to identify anomalous network activity, which may indicate that a non-legitimate and/or unauthorized claimant is operating on the network.

Currently, cyber-security is becoming increasingly important as electronic systems become more engrained into every-day business and social tasks. Many previously managed business processes have expanded into electronic data processing online, which has made on-going information and computing security advancement techniques a necessary requirement in order to protect these everyday-used systems. Critical documents and other data using information from social security numbers to national infrastructure related information are stored in networked systems that if accessed by an unauthorized party would have varying degrees of societal impact from nuisances to catastrophic societal infrastructure breakdown. In parallel with increased reliance on electronic systems, the nation has also seen a dramatic increase in terrorism and computer hacking; thus requiring society to work towards improving methods to protect our networked computer systems.

Cyber attacks and network penetrations are becoming all too common. These frequent occurrences have brought discussions of dangers of network penetrations by external threats in both commercial and military environments to the forefront. Current access control approaches are principally based on either static passwords, or are authentication based using passwords and smart badge credentials based on Public Key Infrastructure (PKI). As system attacks are often conducted by impersonating the end user, there has been a tendency for organizations to focus on user authentication methods to curtail network data interception network vulnerabilities. These approaches continue to be vulnerable to sophisticated attacks and, thus, a need has developed for a new paradigm of access control leveraging additional dimension/information beyond the normal three dimensions (what you know, what you have, and who you are) of authentication by adding the geospatial location/context, such as user location and user context, to provide an additional and orthogonal layer of protection, which provides an enhanced correlation between location and context awareness from integrated physical geolocation mapping to logical network and information management views.

Furthermore, the fact that existing cyber attacks are often shrouded in anonymity has created additional concerning problems. Larger attacks are often precluded by attempts of the originator to make small intrusions/attacks to better understand the system's vulnerabilities for future exploitation and laying the groundwork for a later, more destructive attack. To date, many large scale cyber attacks have not only left the recipients of the attacks still recovering from the damage left behind, but the recipients are also unable to deter any further damage through retaliation, or otherwise, as without having a clear traceability to the attack's originator and, thus, often lack the authority to respond. If attack motives are unclear, it is further unlikely that the recipient could tell if the attack was a mere act of vandalism, a purposeful theft, or a more sinister approach to threaten national security. As such, any system that would aid in denying network access to rogue users and/or provide traceable data to aid in identifying the originator would have great utility to reduce and mitigate denial of service (DoS) and network data interception attacks.

The present disclosure relates generally to networked systems that benefit from cyber and/or network security. More specifically, the system of the present disclosure improves information and system/network management and security through the use of smart agents downloaded through an authenticated spot beam transmission.

The present disclosure has two primary features. The first feature is the use of smart agent software, which may be downloaded through the disclosed system architecture (i.e., via a LEO satellite downlink, which provides a stronger signal and improved signal structure). Unlike the LEO satellite downlink, existing methods for downlinking are not robust enough to allow a network device indoors to receive such a software update reliably. Furthermore, spot beam based authentication methods are used to identify the exact spot beam in which to send the specific smart agent software in order to get it to the correct enabled receiving device. Unlike other devices in the vicinity, the targeted device can open and extract the executable software using these authentication methods. The targeted user can further verify the download's integrity.

The second feature of the present disclosure is the use of geolocating devices to physically map network devices against a typical IP framework, which identifies where a specific device is accessing a given network from in terms of physical location (e.g., using the device's phone number and/or internet protocol (IP) number to locate the specific location/region of the device). Additionally, the downloaded smart agents can be used to monitor and manage individual users and the network. Captured data and trends can be used to create a network behavioral model. The model and existing/potential threats can be used to develop defensive and offensive measures that may be managed through use of the smart agents or other available system node software and/or hardware to improve the security of the network. This feature provides a new information management perspective for the improving, tracking, and monitoring of users and/or devices within a system.

A. Smart Agent Related Embodiments

In one or more embodiments, smart agents may use various types of authentication methods to authenticate adjacent network nodes, data packets, etc. These various different types of authentication methods will be described in detail below in the Spot Beam Based Authentication Section of the present disclosure.

In at least one embodiment, smart agents may manage traffic within or entering the network. For example, a smart agent may be used to slow down traffic nearest to a potential problem area, such as if a network device appeared to be compromised or if malware had been identified. The smart agent may be set-up to take specific actions for each potential threat and, for instance, may be configured to stop or re-route traffic in order to either minimize the impact to the overall system or to stop the threat altogether. Smart agents may be configured to monitor key metrics that may identify possible threats. For example, a man-in-the-middle attack may be identified through a spike in a data latency metric. Once identified, smart agents within the system may reroute data as needed. Important data and/or users can be coordinated with an increased priority so that a DoS attack will have a lesser affect to those critical users. For these cases, critical data/users would be pushed to the front of the queue to minimize the attacks effects.

In some embodiments, smart agents can enforce user access privileges using spot beam authentication methods or enforce other policies that have been implemented to improve the security of the network.

In one or more embodiments, smart agents allow for agile network and system management as additional software, modifications, or updates may be loaded as necessary to the router or other types of system nodes. This could include routine updates to the software or more targeted updates to deal with a new threat. Software modifications/updates, etc. could be completed to systems that are accessible; while the present disclosure is primarily focused on cyber and network management and security, it should be obvious that software could be loaded as needed for a variety of reasons. For example, using a system tailored for a vehicle such as automobile, train, or airplane, this system could be used to complete needed software updates, which could not previously be completed under existing architectures.

In at least one embodiment, smart agents can be used to better improve the accuracy of the system as technology advances. For example, the smart agents could be updated to aid the system in accepting additional differential corrections associated with a newly launched infrastructure. Updates to smart agents via constellation downlinks/downloads can allow the system to be updated for the most up-to-date/best available technologies.

B. Network Topology Mapping Related Embodiments

In one or more embodiments, smart agents are used to capture data and trends that are used to create and/or improve the network behavioral model. The model and existing/potential threats can be used to develop defensive and offensive measures that may be managed through use of the smart agents or other available system node software and/or hardware to improve the security of the network.

Figure 14:
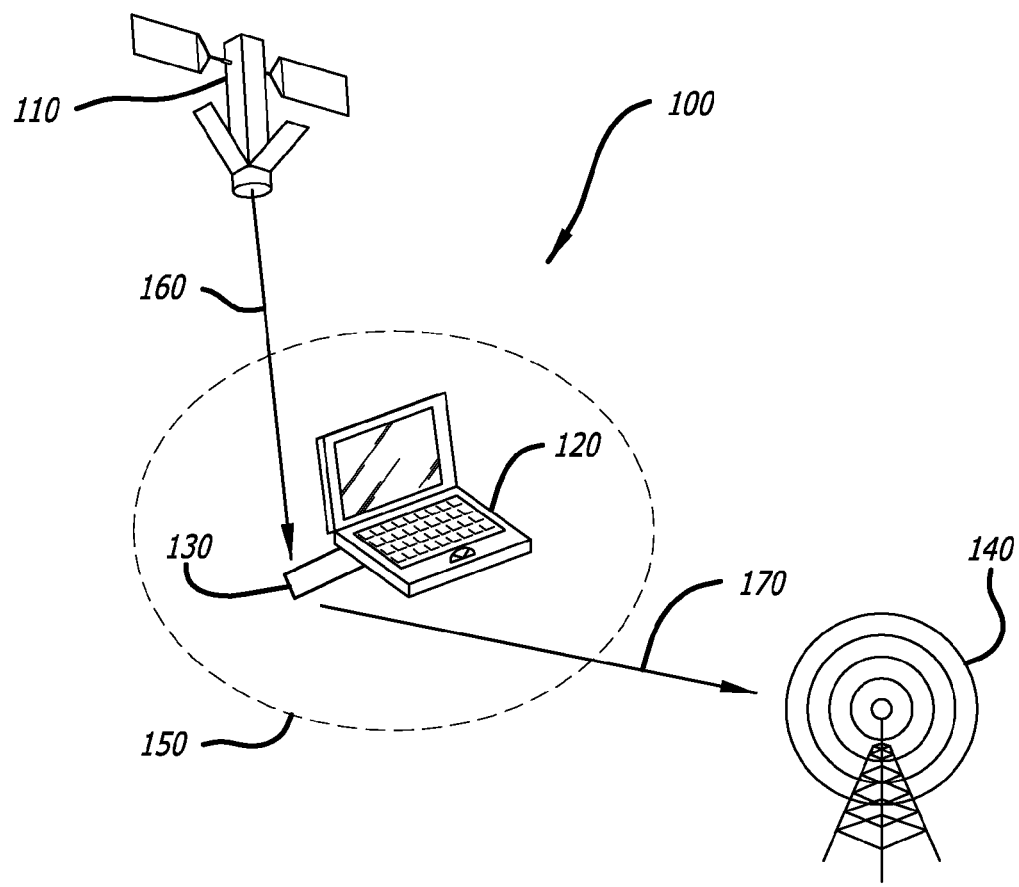
FIGS. 14 through 18 are directed towards the disclosed system and method for a network topology aided by a smart agent download, in accordance with at least one embodiment of the present disclosure.

FIG. 14 is a schematic diagram of the disclosed system 100 for a network topology aided by a smart agent download, in accordance with at least one embodiment of the present disclosure. In this figure, a satellite 110 is shown to be transmitting a signal 160 in a satellite spot beam 150 to geolocation hardware 130, which has geolocation functionality as well as authentication functionality. The spot beam 150 may have a circular footprint as is shown in this figure, or in other embodiments may be a shaped spot beam that has a footprint of an irregular shape. Various types of satellites and/or pseudo-satellites may be employed for the satellite 110 of the system 100. Types of satellites that may be employed for the satellite 110 include, but are not limited to, lower Earth orbiting (LEO) satellites, medium Earth orbiting (MEO), and geosynchronous Earth orbiting (GEO) satellites. In one or more embodiments, a LEO Iridium satellite is employed by the system 100 for the satellite 110. Employing this type of satellite is advantageous because its transmission signal is strong enough to propagate through attenuated environments, including being propagated indoors.

The geolocation hardware 130 may be employed in a device 120 associated with a claimant (e.g., a cell phone, a personal digital assistant (PDA), and/or a personal computer); may be implemented in an authenticator device (not shown) associated with one or more claimants; and/or may be employed in a network component associated with a claimant (e.g., a computer node, an internet protocol (IP) node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node). The geolocation hardware 130 contains an enabled chipset, and has processing, receiving, transmitting (in some embodiments), and memory functions so that it is able to receive a smart agent download and store it into memory. The geolocation hardware 130 is connected to a network 170, which may be wired and/or wireless. In this figure, the geolocation hardware 130 is shown to be connected to a wireless network 170 that employs a cell tower 140 as a relay. It should be noted that a claimant may be a user and/or an entity and may be stationary and/or mobile.

Prior to the satellite 110 transmitting a smart agent download to the geolocation hardware 130, the claimant is authenticated by the system 100. Various different types of authentication systems and methods may be used by the system 100 to authenticate the claimant. In one or more embodiments, a spot beam based authentication system and method is used by the system 100 to authenticate the claimant. For these embodiments, a LEO Iridium satellite is employed for the satellite 110 to transmit at least one authentication signal that is used to authenticate the claimant. A detailed discussion regarding the spot beam based authentication system and method is presented below in the Spot Beam Based Authentication Section of the present disclosure. In addition, it should be noted that an authenticator device (not shown) may be employed by the disclosed system 100 for authenticating the claimant by evaluating at least one authentication signal transmitted from the satellite 110.

After the claimant has been authenticated, the satellite 110 transmits 160 a smart agent download to the geolocation hardware 130. In one or more embodiments, the smart agent download and at least one authentication signal are both transmitted from the satellite 110. In alternative embodiments, the smart agent download and at least one authentication signal are transmitted from different satellites 110 or transmission sources. In addition, in one or more embodiments, the smart agent download and at least one authentication signal are transmitted on the same frequency. In other embodiments, the smart agent download and at least one authentication signal are transmitted on different frequencies.

After the geolocation hardware 130 receives the smart agent download, the geolocation hardware 130 stores the smart agent download into its memory. After the smart agent download is stored into memory, a processor in the geolocation hardware 130 executes the smart agent download. It should be noted that in alternative embodiments, instead of a processor in the geolocation hardware 130 executing the smart agent download, a different processor may be used to execute the smart agent download. This different processor may be implemented in various devices or components associated with the claimant including, but not limited to, a cell phone, a personal digital assistant (PDA), a personal computer, a computer node, an IP node, a server, a router, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and a fourth generation (4G) wireless node.

In addition, it should also be noted that in order for the processor to execute the smart agent download, in one or more embodiments, the processor may need to utilize a specific key, code, and/or other security means to unlock the smart agent download software and to execute it. The use of specific keys, codes, and/or other security means allows nearby "listeners" of the signal containing the smart agent download to not be able to receive and decipher the smart agent download that is being supplied to the targeted device 120.

Upon execution of the smart agent download, the smart agent download software monitors various types of network activity for any possible anomalies in the activity. Types of network activity monitored by the smart agent download may include, but is not limited to, monitoring the usage of the device 120 or component associated with the claimant (e.g., monitoring the usage of a particular node), monitoring the location of the device or component associated with the claimant, monitoring the users operating on the network 170, monitoring the actual data passing through the network 170 (e.g., monitoring the actual data passing through a particular node), and monitoring the quantity of the data passing through the network 170. The smart agent download evaluates the monitored network behavior in order to determine whether an anomaly has occurred. In order to determine whether an anomaly has occurred, a certain predefined and/or programmable activity threshold may be used as a guideline for the smart agent download. Once the smart agent download has determined that the activity threshold has been crossed and, thus, a network behavior anomaly has occurred, the smart agent download will trigger a specific task to be executed. The specific task may be to send a network behavior anomaly message to a network operations center (NOC) (not shown), and/or to shut down the geolocation hardware 130 and/or the component or device 120 associated with the claimant from operating completely or from operating on the network 170.

In alternative embodiments, instead of the smart agent download evaluating the monitored network behavior to determine whether an anomaly has occurred, after the smart agent download has acquired the monitored network activity, the monitored network activity is sent by a transmission source to a NOC for the NOC to evaluate the network behavior to determine whether an anomaly in the activity has occurred. A processor in the NOC is used to evaluate the monitored network activity and to determine whether an anomaly has occurred. Once the processor at the NOC determines that an anomaly in the activity has occurred, the NOC sends a message to the smart agent download alerting the smart agent download software of the anomaly. After the smart agent download receives the message, the smart agent download triggers a specific task to be executed, where the specific task may be to shut down the geolocation hardware 130 and/or the component or device 120 associated with the claimant from operating completely or from operating on the network 170. In other embodiments, once the processor at the NOC determines that an anomaly in the activity has occurred, the NOC does not send an alert message to the smart agent download, but rather the NOC triggers a specific task to be executed, where the specific task may be to shut down the geolocation hardware 130 and/or the component or device 120 associated with the claimant from operating completely or from operating on the network 170.

In other embodiments, instead of the NOC sending a message to the smart agent download notifying the smart agent download software of the anomaly, the NOC triggers a specific task to be executed. The specific task may be to log the anomaly in an anomaly listing stored in memory, to send a message to an operator of the NOC to remove the component or device 120 associated with the claimant from the network 170, and/or to shut down the geolocation hardware 130 and/or the component or device 120 associated with the claimant from operating completely or from operating on the network 170.

Figure 15:
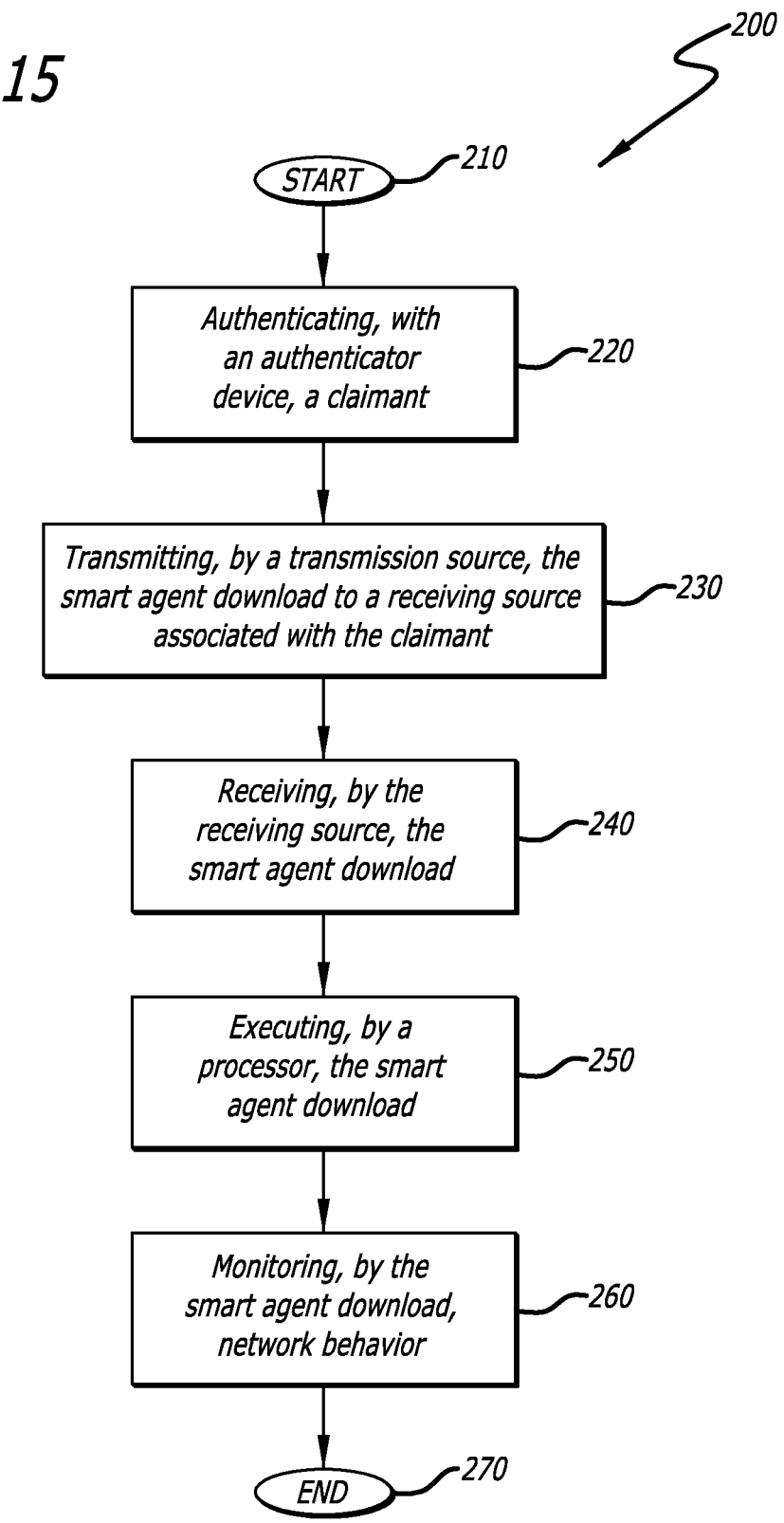

FIG. 15 is a flow diagram 200 of the disclosed method for a network topology aided by a smart agent download, in accordance with at least one embodiment of the present disclosure. At the start 210 of the method, an authenticator device is used to authenticate the claimant 220. After the claimant is authenticated, a transmission source transmits a smart agent download to a receiving source associated with the claimant 230. The receiving source then receives the smart agent download 240. After the receiving source receives the smart agent download, a processor executes the smart agent download 250. Once the smart agent download is executed, the smart agent download software monitors network behavior 260, and then the method ends 270.

Figure 16:
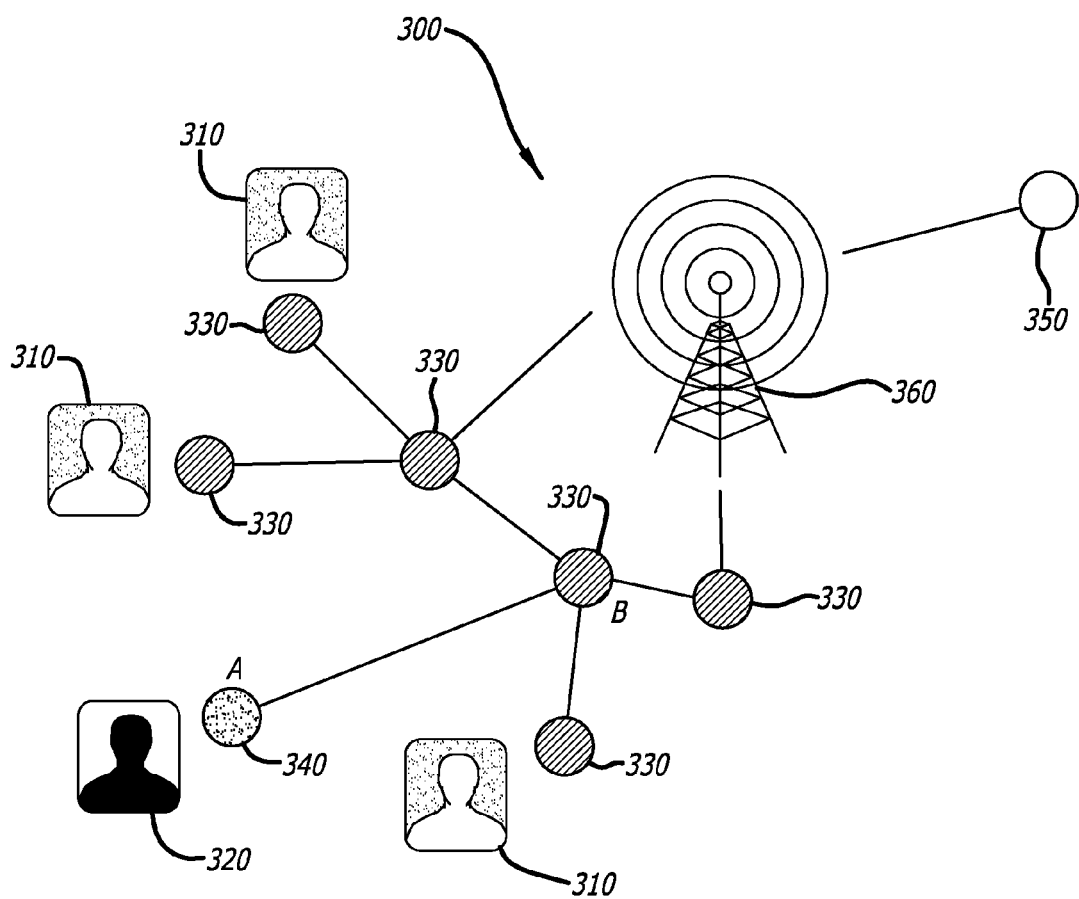

FIG. 16 is a schematic diagram 300 showing a network operations center (NOC) 350 monitoring network behavior, in accordance with at least one embodiment of the present disclosure. In this figure, multiple network nodes 330, 340 are shown to be connected via a wired and/or wireless network. Some of the network nodes 330 act as hubs (e.g., Node B) for routing data over the network. Also, some of the network nodes 330 are shown to have associated authorized and/or legitimate claimants 310, and one node 340 is shown to have an unauthorized and/or non-legitimate claimant 320. Smart agent downloads are downloaded to the network nodes 330, 340, and are executed to monitor network activity. In one or more embodiments, the monitored network activity is wirelessly transmitted to the NOC 350 for evaluation via a cell tower 360.

In accordance with at least one embodiment, smart agent download software may be used to develop individual user (or claimant) behavioral profiles in order to establish user baseline parameters and trends. By understanding the acceptable normal conditions of a user, parameters falling outside appropriate thresholds, which are likely caused by compromised hardware and or malware occurrence, can be more quickly identified and resolved. A collection of individual user behavioral profiles and their interconnections can be reviewed similarly for developing a profile of acceptable network behavioral norms, which can be used to better react to man-in-the-middle attacks, etc. In accordance with at least one embodiment, smart agents may be used to manage traffic within or entering the network.

As shown in FIG. 16, a spoofer 320 by means of a compromised node 340 attempts to access the network at node A 340. Through various means (e.g., the spot beam based authentication system and method as well as the smart agent download monitoring software) the compromised node 340 can be identified. Once identified, the geolocation enabled hardware (not shown in FIG. 16) associated with the node 340 may be used to perform a number of tasks, such as slowing down traffic nearest to the potential problem area in order to minimize the risk to the network, rerouting network traffic, or stopping network traffic at node B 330 in order to quarantine the spoofer 320 so they are incapable of further harming the network or to stop the threat all together. Smart agent download software may be configured to monitor key metrics that may identify these possible threats as well as other threats, such as man in the middle attacks. For example, a man in the middle attack may be identified through a spike in a data latency metric. Once identified, smart agents within the system may reroute data as needed. Important data and/or users can be coordinated with an increased priority so that a denial of service (DoS) attack will have a lesser affect to those critical users. Critical data/users would be pushed to the front of the queue to minimize the attack's effects.

It should be noted that by using smart agent download software, the software can monitor and track the critical Internet backbone/trunk routes for the network traffic. Internet routers perform aggregated network traffic forwarding and routing throughout the network. These forwarding and routing paths are susceptible to manipulation from rogue users that are attempting to gain access to the network. The network traffic can be analyzed by the smart agent download software, both in real-time and offline at a later time, in order to identify possible denial of service (DoS) attacks.

In order to aid in mitigating this potential risk, in one or more embodiments, the disclosed system may leverage adjacent routers (i.e., peer-to-peer routers) in order to classify the network traffic they are forwarding to each other, and to estimate the data latency characteristics for each of the network traffic classifications. These routers may authenticate one another through exchanging and verifying each other's supplied geolocation data. They may obtain their geolocation data through various means including, but not limited to, utilizing global positioning system (GPS) signals and using the spot beam based authentication system and method. Note that while all network traffic would not experience the same data latency characteristics due to factors such as varying the Quality of Service (QoS) provisioning policies and the actual amount of bandwidth associated with each network traffic classification, the data latency characterization may be computed based on a dynamic sliding window that takes into account and adapts to the changing traffic profile based on factors, such as, diurnal patterns and potential failures in the backbone/trunk networking infrastructure.

When a router is added or removed from the Internet networking infrastructure, it causes an update in the network topology and a change to packet forwarding paths driven by the link state protocols, such as OSPF and BGP. The transition in the network traffic profiles caused by diurnal traffic patterns gradually updates the network topology, and changes in the packet forwarding paths more rapidly update the network topology. Changes in the network topology and packet forwarding paths are propagated across the Internet networking infrastructure via network management events and link state protocols and, hence, each router is aware of the discrete event when such a change occurs and can accordingly take it into account for the various estimation processes such as data latency, etc. Under circumstances when the Internet network infrastructure is operating normally, one would not expect drastic changes in the forwarding and routing paths between the routers. As such, if the smart agent download for adjacent peer-to-peer routers detects a deviation in the network traffic characteristics between the two routers for one or more of the network traffic classes that is beyond the baseline acceptable range, the smart agent download can trigger an alert to the network management entities and also enact autonomous mechanisms to limit the potential adverse impact by either policing the rate of the particular class of network traffic, or in an extreme scenario, completely stop or reroute the traffic via an alternate path.

This coordinated mechanism of monitoring and managing the network traffic flow between adjacent peer-to-peer routers can also be employed to ensure that critical network traffic can be allowed to traverse the network using QoS prioritization during DoS attacks. In such scenarios, classes of network traffic that are deemed to be out of the norm from expected traffic shape characteristics can be rate policed at the egress router. The rate policing includes the rate of network traffic being monitored and forced to remain below a certain threshold rate by allowing the most important network traffic through and not allowing through the network traffic that is deemed to be out of the norm. This policing can be used to ensure that the DoS attacks do not propagate further through the network, while allowing critical network traffic through the network. The alerting and notification mechanism to monitor, detect, and arrive at the decision can employ complex event processing (CEP) and analytics, such as causal chain analysis for detection of anomalies and correlations to identify data traffic stream characteristics and policy driven autonomous network management decisions and/or actions. This approach can leverage the use of downloaded targeted smart agent software within each of the routers, which in-turn, can interface with the backed NOC 350 or Network Management entity to extract additional executables as needed.

Figure 17:
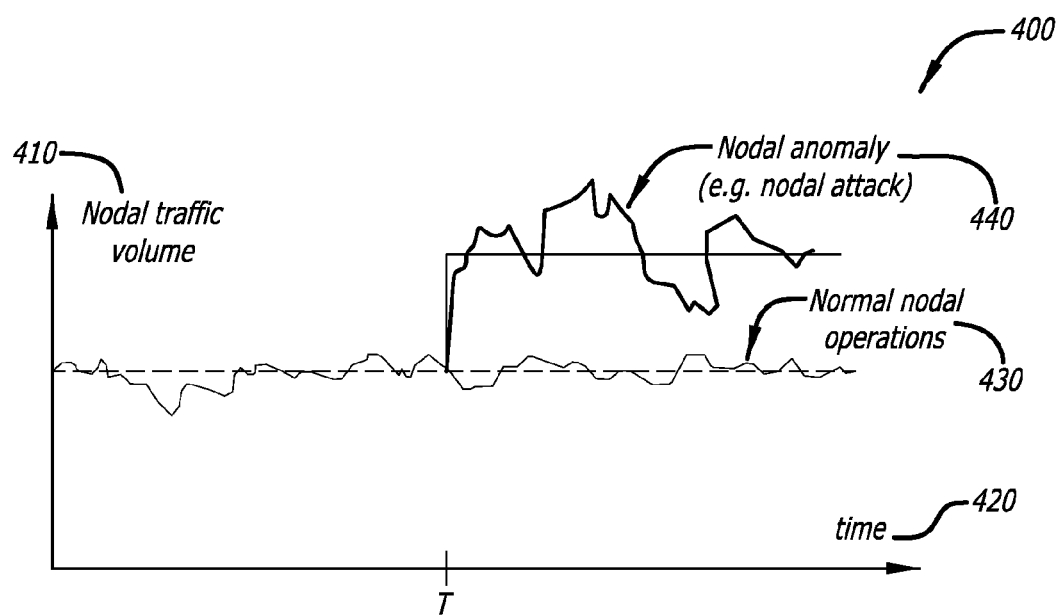

FIG. 17 is a graph 400 illustrating the detection of an anomaly 440 in network behavior, in accordance with at least one embodiment of the present disclosure. In particular, an example graph of data gathered from a smart agent download monitoring the network traffic through a specific node is shown. In this figure, the x-axis depicts the amount of volume of network traffic travelling through a specific node 410, and the y-axis illustrates the passage of time 420. At time zero (0) up until time T, the traffic activity levels of the node stay closely about a normal traffic activity level for the node 430. However, at time T, the traffic activity of the node spikes up to a significantly higher level. From time T and on, the nodal traffic activity levels for the node are shown to be much higher than the normal nodal traffic activity level, and thus, by analyzing this data, the smart agent download will determine that a nodal anomaly 440 has occurred for the node (e.g., a nodal attack is occurring).

Figure 18:
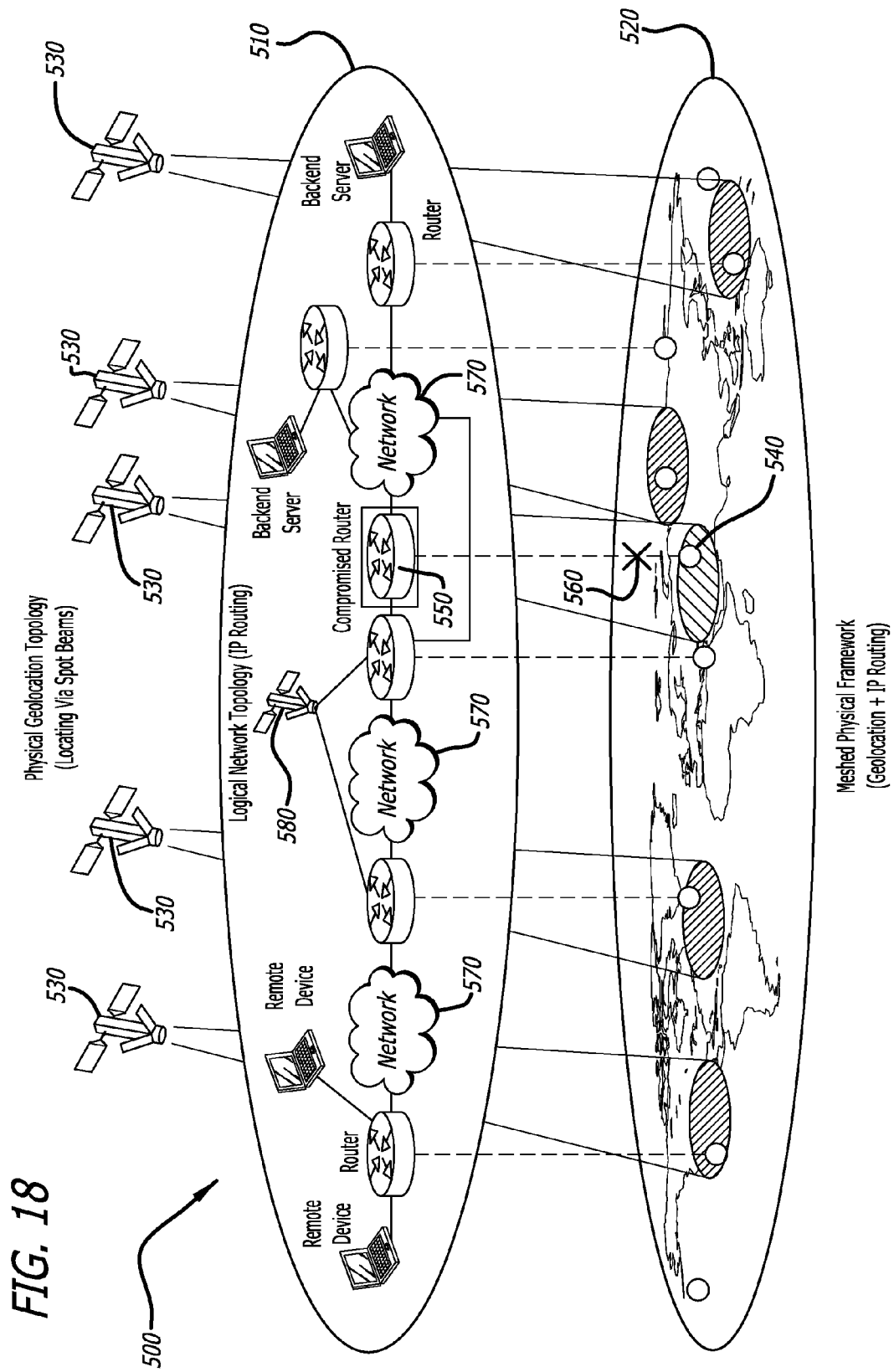

FIG. 18 is schematic diagram showing an example meshed physical framework 500 that correlates a logical topology 510 to a physical topology 520 of a network, in accordance with at least one embodiment of the present disclosure. The binding of the physical and logical views and visibility into the network behavior model from both views enables the smart agent download to more accurately and robustly track and trace specific events and behaviors, and further ascertain the source or sources of anomalous events under observation. The backend NOC or Network Management entity may use the monitoring information relayed by the cooperating enabled computing devices and routers to construct a behavioral model, which can allow for tailored communication and computing for cyber defense and offense purposes.

In this figure, the logical topology 510 relates to the way data is transferred within the network. In this case, data is transferred throughout the network 570 via IP routing and through the use of a relay satellite 580. The physical topology 520 relates to the physical network design and in this application is based on the node locations on or near the Earth's surface. The disclosed system uses satellites 530 and receivers to allow the network nodes to geolocate themselves. Their physical locations can then be mapped against an IP protocol logical mapping in order to help improve network security. For example, a compromised network node 540, such as a router 550, can be identified and blocked 560, for instance by the NOC by sending a notification either directly to the compromised node's chipset or to a gateway node in an affect of quarantining the area of concern.

III. Spot Beam Based Authentication

Entity or user authentication techniques enable a third party verifier to validate the identity of a user, asset, or a device (e.g., a claimant) for a remote resource through a one-way authentication method. However, it should be noted that this one-way method may also be used directly by a host system to validate a claimant. An entity may be a device (e.g., a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This hinders a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1(\text{initial-security key, liveness}) = SHA\text{-}1(\text{initial-security key}, A(1) + \text{liveness}) + SHA\text{-}1(\text{initial-security key}, A(2) + \text{liveness}) + SHA\text{-}1(\text{initial-security key}, A(3) + \text{liveness}) + \ldots \quad \text{EQ 1}$$

where $A(0) = $ liveness;
$A(i) = SHA\text{-}1(\text{initial-security key}, A(i-1))$;
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$PRF(\text{expanded initial-security key, label, liveness}) = P\_MD5(S1, \text{label+liveness}) \: XOR \: P\_SHA\text{-}1(S2, \text{label+liveness}) \quad \text{EQ: 2}$$

where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective $((g^{\wedge}(\text{secret integer})) \bmod p)$. This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is appropriate that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

Figure 19:
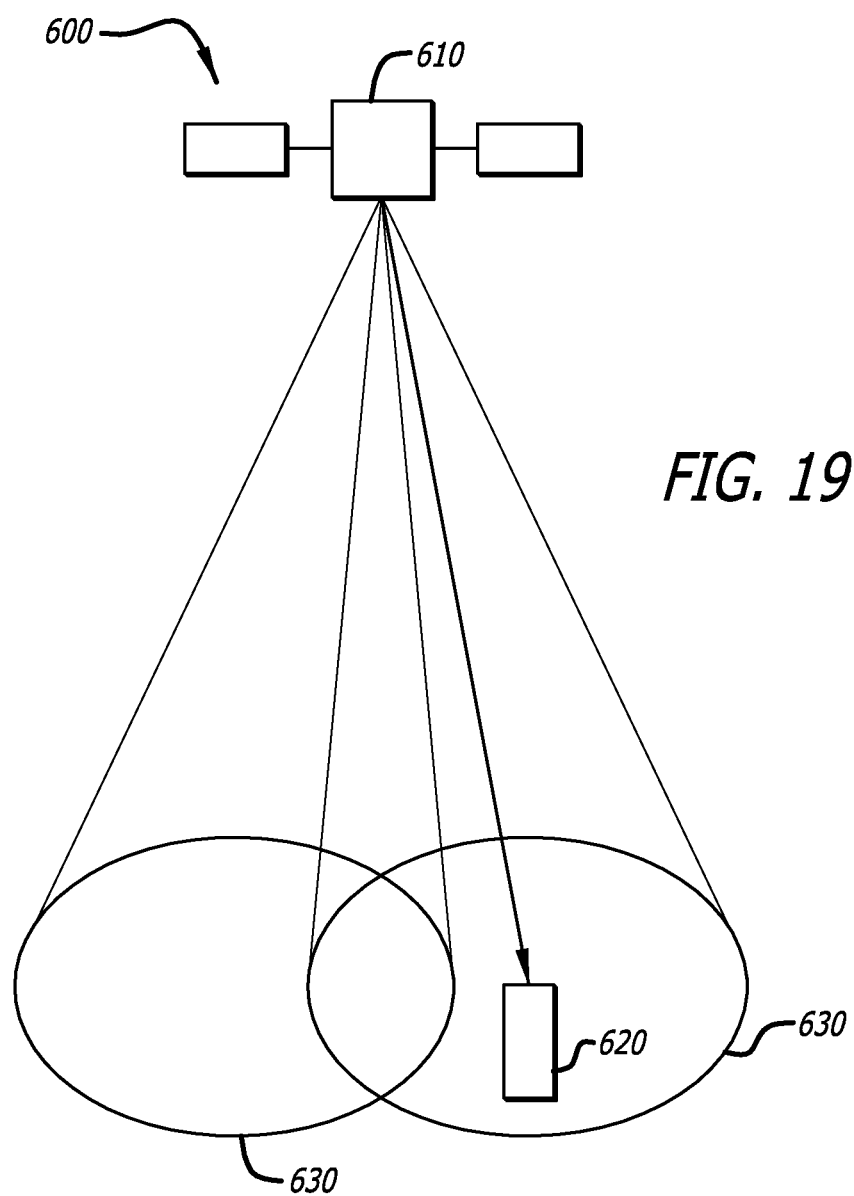
FIGS. 19 through 22 are directed towards the disclosed system and method for spot beam based authentication of claimants, in accordance with at least one embodiment of the present disclosure.

FIG. 19 is a schematic illustration of a satellite-based communication system 600, according to embodiments. In practice, a satellite based communication system 600 may comprise of at least one satellite 610 in orbit. In the interest of brevity, a single satellite is illustrated in FIG. 19. Referring to FIG. 19, in some embodiments a system 600 comprises one or more satellites 610 in communication with one or more receiving devices 620. In some embodiments the satellites 610 may be embodied as LEO satellites such as those within the Iridium satellite constellation. Satellite(s) 610 orbit the earth in a known orbit and may transmit one or more spot beams 630 onto the surface of the earth in a known pattern. Each spot beam 630 may include information such as pseudorandom (PRN) data and one or more distinctive beam parameters (e.g., time, satellite ID, time bias, satellite orbit data, etc.).

Receiving device(s) 620 may be implemented as communication devices such as satellite or cellular phones or as components of a communication or computing device, e.g., a personal computer, laptop computer, personal digital assistant or the like. In some embodiments, a receiving device (620) may comprise one or more locating or navigation devices or modules analogous to devices used in connection with the global positioning system (GPS).

FIGS. 20A, 20B, and 20C are schematic illustrations of satellite-based authentication systems 700, according to embodiments. Referring first to FIG. 20A, in some embodiments a satellite 610 in orbit transmits one or more spot beams 630 onto the earth's surface. A receiving device 620 may be configured to receive a signal from the spot beam. In the embodiment depicted in FIG. 20A the receiving device is ground-based and may be operating in attenuated environment. By way of example, an object 710 such as a roof, building, or the like may obstruct a portion of the communication path between satellite 610 and the receiving device.

A transmitter 720 transmits data received by the receiving device 620 and/or data generated by the receiving device 620 to a verifier 730. The transmitter 720 depicted in FIG. 20A is a wireless transmitter that relays the data from the receiving device to the verifier. However, one skilled in the art will recognize that data from receiving device 620 may be transmitted via a wired communication system, wireless communication system, or a combination of wired and wireless systems. The verifier 730 uses data captured via a spot beam by the receiving device 620 to prove to the verifier 730 that it is an authorized user via a one-way authentication approach which is also the case in FIG. 20B.

Furthermore, FIG. 20B depicts an arrangement in which the receiving device 620 may be airborne, e.g., in an aircraft 625. In the embodiment depicted in FIG. 20B the aircraft 625 may maintain an uplink with the satellite 610, e.g., an L-Band Uplink, and data captured by the receiving device 620 in the aircraft may be transmitted back to the satellite 610 via the uplink. The satellite 610 may transmit the data to a second cross-linked satellite 610, which in turn may transmit the data to a verifier 730.

The system depicted in FIG. 20C illustrates an embodiment in which two (or more) peer devices 620 may implement a two-way authentication technique to authentication each other. Referring briefly to FIG. 20C as described above a satellite 610 in orbit transmits one or more spot beams 630 onto the earth's surface. A first receiving device 620A may be configured to receive a signal from the spot beam. The first receiving device 620A may be configured to derive a security key, e.g., using a Diffie-Helman approach as described above, which incorporates PRN data from the spot beam.

The PRN data is also transmitted to a second device 620B. In some embodiments the second device 620B may be outside the spot beam 630, in which case the PRN data may be transmitted by a computing device 740 coupled to the second device 620B via a communication network. The computing device 740 may be communicatively coupled to the satellite 610. By way of example, and not limitation, the computing device 740 may be a server that is separately coupled to the satellite 610 via a communication link. The computer 740 may be associated with a control network for satellite 610 and may thereby possess PRN data associated with the spot beam 630.

In operation, the first receiving device 620A initiates a request for authentication data, which is transmitted to the second receiving device 620B. The communication link between the first receiving device 620B may be direct or may be implemented through a transmit network 720. The second receiving device 620B responds to the request and issues a near-simultaneous request for authentication data from the first receiving device 620A. The first receiving device 620A authenticates the second receiving device 620B and issues a near-simultaneous response to for authentication data to the second receiving device 620B, which may then authenticate the first receiving device 620A.

As described above, the authentication process implemented between the first receiving device 620A and the second receiving device 620B may be a Diffie-Hellman exchange in which the shared secret comprises at least a portion of the PRN data transmitted by the spot beam 630. Thus, the system depicted in FIG. 20C enables peer-to-peer authentication of receiving device 620A, 620B. One skilled in the art will recognize that this two-way authentication approach could be extended to a receiving device and a server as well as other hardware architectures, or to more than two devices.

FIG. 21A is a schematic illustration of a computing system which may be adapted to implement a satellite based authentication system, according to embodiments. For example, in the embodiments depicted in FIGS. 20A and 20B the verifier 730 may be implemented by a computing system as depicted in FIG. 21A. Referring to FIG. 21A, in one embodiment, system 800 may include a computing device 808 and one or more accompanying input/output devices including a display 802 having a screen 804, one or more speakers 806, a keyboard 810, one or more other I/O device(s) 812, and a mouse 814. The other I/O device(s) 812 may include a touch screen, a voice-activated input device, a track ball, and any other device that allows the system 800 to receive input from a user.

The computing device 808 includes system hardware 820 and memory 830, which may be implemented as random access memory and/or read-only memory. A file store 880 may be communicatively coupled to computing device 808. File store 880 may be internal to computing device 808 such as, e.g., one or more hard drives, CD-ROM drives, DVD- ROM drives, or other types of storage devices. File store 880 may also be external to computer 808 such as, e.g., one or more external hard drives, network attached storage, or a separate storage network.

System hardware 820 may include one or more processors 822, at least two graphics processors 824, network interfaces 826, and bus structures 828. In one embodiment, processor 822 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 824 may function as adjunct processors that manage graphics and/or video operations. Graphics processors 824 may be integrated onto the motherboard of computing system 800 or may be coupled via an expansion slot on the motherboard.

In one embodiment, network interface 826 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 828 connect various components of system hardware 820. In one embodiment, bus structures 828 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 830 may include an operating system 840 for managing operations of computing device 808. In one embodiment, operating system 840 includes a hardware interface module 854 that provides an interface to system hardware 820. In addition, operating system 840 may include a file system 850 that manages files used in the operation of computing device 808 and a process control subsystem 852 that manages processes executing on computing device 808.

Operating system 840 may include (or manage) one or more communication interfaces that may operate in conjunction with system hardware 820 to transceive data packets and/or data streams from a remote source. Operating system 840 may further include a system call interface module 842 that provides an interface between the operating system 840 and one or more application modules resident in memory 830. Operating system 840 may be embodied as a UNIX operating system or any derivative thereof (e.g., Linux, Solaris, Berkeley Software Distribution (BSD), Android, etc.) or as a Windows® brand operating system, or other operating systems.

In various embodiments, the computing device 808 may be embodied as a personal computer, a laptop computer, a personal digital assistant, a mobile telephone, an entertainment device, or another computing device.

In one embodiment, memory 830 includes an authentication module 862 to authenticate a claimant based on data received from the claimant. In one embodiment, an authentication module 862 may include logic instructions encoded in a non-transitory computer-readable medium which, when executed by processor 822, cause the processor 822 to authenticate a claimant based on data received from the claimant. In addition, memory 830 may comprise a satellite orbit database 864 which includes orbit information for satellites 610 in a predetermined orbit around the earth. Additional details about the authentication process and operations implemented by authentication module 862 are described below.

In some embodiments the receiving device 620 may be implemented as a satellite communication module adapted to couple with a conventional computing device 622 (e.g., a laptop, a PDA, or a smartphone device). The receiving device 620 may be coupled to the computing device 622 by a suitable communication connection, e.g., by a Universal Serial Bus (USB) interface, an RS-232 interface, an optical interface, or the like. In the embodiment depicted in FIG. 21B the receiving device 620 may be a "thin" device in the sense that it may include a receiver and limited processing capability, e.g., an application specific integrated circuit (ASIC) or a field programmable gate array (FPGA) configured to implement an authentication routine.

In operation, a user of the computing device 622 may utilize the receiving device 620 to authenticate the computing device 622 with a host network 890. As described above, the receiving device 620 depicted in FIG. 21B may receive a spot beam transmission 630 from the satellite 610 which includes a distinctive beam signature and a pseudo-random number (PRN). The computing device 622 may initiate an access request to the host network 890. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 610.

The host network 890 may transmit a user access request to the verifier 730 as an authentication request. In some embodiments the host network may add additional information to the request en enable the verifier 730 to authenticate the computer 622. By way of example, the host network 630 may provide limitations regarding where (i.e., from what geographic locations) the claimant may be authenticated). The verifier 730 may verify the claimant and provide an authentication response to the host network 890. The host network 890, in turn, may forward an access response to the computing device 622.

FIG. 22 is a flowchart illustrating operations in a method to authenticate a claimant, according to embodiments. Referring to FIG. 22, at operation 910 a claimant device determines a physical location of the claimant device. In some embodiments a claimant device 620 may comprise one or more location modules to determine a location of the claimant device 620. By way of example and not limitation, claimant device 620 may include, or be communicatively coupled to, a global positioning system (GPS) module to determine a location based on signals from the global positioning system. Alternatively, or in addition, claimant device 620 may include logic to determine a location based on signals from one or more LEO or MEO satellites 610 as described in one or more of U.S. Pat. Nos. 7,489,926, 7,372,400, 7,579,987, and 7,468,696, the disclosures of which are incorporated herein by reference in their respective entireties. In some embodiments the location of the claimant device 620 may be expressed in latitude/longitude coordinates or another earth-based coordinate system.

At operation 915 the claimant device 620 receives a spot beam transmission from a satellite 610. In some embodiments the claimant device 620 extracts one or more distinctive beam parameters (e.g., time, satellite ID, beam ID, time bias, satellite orbit data, etc.) including a pseudo random code segment from the satellite spot beam. In some embodiments the claimant device 620 may store the beam parameters in a memory module in, or communicatively coupled to, the claimant device 620. In one or more embodiments operation 915 may occur near simultaneously to its preceding operation 910.

At operation 920 the claimant device 620 may continue to generate one or more waypoint data snapshots which may include the location information for the claimant device 620 from operation 910, and one or more of the distinctive beam parameters transmitted via the satellite spot beam as noted in operation 920. In some embodiments the waypoint data snapshots may be stored in a memory module in, or communicatively coupled to, the claimant device 620.

In some embodiments the claimant device 620 may collect an array of waypoint data snapshots over time. For example, an array of waypoint data snapshots may be constructed by receiving spot beams from a plurality of satellites 610 passing over the claimant device 620 over time. Alternatively, or in addition, an array of waypoint data snapshots may be constructed by moving the claimant device 620 in relation to the satellites 610, for example, by placing the claimant device 620 in an aircraft 625 as depicted in FIG. 20B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 920 the waypoint data snapshot(s) are transferred from the claimant device 620 to a verifier device 730. By way of example, in the embodiment depicted in FIG. 20A the waypoint data snapshot(s) may be transmitted via a transmitter 720 or by another communication network. In the embodiment depicted in FIG. 20B the waypoint data snapshot(s) may be transmitted from the aircraft 625 to a satellite 610, then may be transmitted via a satellite network to a verifier device 730.

At operation 925 the verifier device 730 receives location data and waypoint data from the claimant device 620. At operation 930 the verifier device 730 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 730 may include a satellite orbit database 864, or be communicatively coupled to a satellite orbit database 864, which includes orbit information about satellites 610 in a known orbit about the earth.

In some embodiments the location data and waypoint data received from the claimant device is compared (operation 930) with location and waypoint data from the known data set to determine whether the claimant device 620 is, in fact, within a reasonable threshold distance of an expected geographic location at an expected time. By way of example and not limitation, the satellite orbit database 864 may be searched for a data record corresponding to the distinctive beam parameters transmitted from the claimant device 620. When a matching record is located, the orbit data from the record retrieved from the orbit database 864 may be compared to the data received from the claimant device 620. For example, the known data may comprise a coordinate for the center of the spot beam 630 and an indication of the radius of the spot beam 630 on the surface of the earth. The coordinates received from the claimant device 620 may be compared to the location of the spot beam to determine whether the received data indicates that the claimant device 620 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 935, the data received from the claimant device 620 indicates that the claimant device 620 is within a geographic region encompassed by the spot beam from the satellite 610 at the time associated with the data from the claimant device, then the claimant device 620 may be considered authenticated. In an authentication system, control then passes to operation 940 and the claimant is allowed to access a resource. By way of example and not limitation, the verifier device 730 may grant a token to an authenticated claimant device 620. The token may be used by a remote system to grant access to a resource.

By contrast, if the data received from the claimant device 620 indicates that the claimant device 620 is not within a geographic region encompassed by the spot beam from the satellite 610 at the time associated with the data from the claimant device 620, then the claimant device 620 may not be considered authenticated. In an authentication system, control then passes to operation 945 and the claimant is denied access to a resource. By way of example and not limitation, the verifier device 730 may deny a token to an authenticated claimant device 620. In the absence of a token the claimant device may be denied access to a resource managed by a remote system.

Thus, the system architecture depicted in FIGS. 19-21 and the method depicted in FIG. 22 enable satellite-based authentication of one or more claimant device(s) 620. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 620 are authenticated to use a resource for an entire session. In other embodiments the system may implement message-based authentication in which the claimant device(s) 620 must be authenticated separately for each message transmitted from the claimant device(s) 620 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 620. During the course of a scheduled mission a logistics system may periodically poll the claimant device(s) 620, which may respond with authentication data obtained from the satellite 610. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e., the claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 610 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 610). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for context aware network security monitoring for threat detection, the method comprising:
    monitoring, by at least one processor, behavior of each of at least one node, associated with at least one user, in a network to generate a behavior profile for each of the at least one user,
    wherein the behavior of each of the at least one node is based on traffic flow through each of the at least one node,
    wherein the traffic flow is monitored by analyzing an Internet Protocol (IP) packet header of at least one data packet that has traveled through each of the at least one node, and
    wherein the IP packet header contains a security signature portion, the security signature portion includes geolocation information for at least one of the nodes that the data packet has passed or routed;
    comparing, by the at least one processor, the behavior profile for the at least one user with a baseline behavior profile for the at least one user;
    determining, by the at least one processor, when there is a difference between the behavior profile for the at least one user and the baseline behavior profile for the at least one user;
    flagging an event associated with the difference, by the at least one processor, when the difference at least one of exceeds a baseline threshold level, does not exceed a baseline threshold level, meets at least one criterion, and does not meet at least one criterion; and
    classifying the event, by the at least one processor, to an event classification.

2. The method of claim 1, wherein the method further comprises transmitting, by at least one transmitter associated with the at least one node associated with the at least one user, the event to at least one of at least one other node in the network and a network operations center.

3. The method of claim 1, wherein the method further comprises initially monitoring, by the at least one processor, the behavior of the at least one node, associated with the at least one user, in the network to generate the baseline behavior profile for the at least one user.

4. The method of claim 1, wherein the method further comprises transmitting, by at least one transmission source, the baseline behavior profile for the at least one user to the at least one node associated with the at least one user; and
    receiving, by at least one receiver associated with the at least one node associated with the at least one user, the baseline behavior profile for the at least one user.

5. The method of claim 4, wherein the at least one transmission source is employed in at least one of at least one satellite and at least one pseudo-satellite.

6. The method of claim 5, wherein the at least one satellite is at least one of a Lower Earth Orbiting (LEO) satellite, a Medium Earth Orbiting (MEO) satellite, and a Geosynchronous Earth Orbiting (GEO) satellite.

7. The method of claim 4, wherein the at least one transmission source is associated with at least one of at least one other node in the network and the network operations center.

8. The method of claim 1, wherein the at least one processor is associated with at least one of the at least one node associated with the at least one user, at least one other node in the network, and the network operations center.

9. The method of claim 1, wherein the method further comprises transmitting, by at least one transmission source, an event update to the at least one network node associated with the at least one user; and
    updating, by the at least one processor, the baseline behavior profile for the at least one user by using the event update.

10. The method of claim 9, wherein the at least one transmission source is employed in at least one of at least one satellite and at least one pseudo-satellite.

11. The method of claim 10, wherein the at least one satellite is at least one of a Lower Earth Orbiting (LEO) satellite, a Medium Earth Orbiting (MEO) satellite, and a Geosynchronous Earth Orbiting (GEO) satellite.

12. The method of claim 9, wherein the at least one transmission source is associated with at least one of at least one other node in the network and the network operations center.

13. The method of claim 1, wherein the monitoring of the behavior of the at least one node associated with the at least one user further includes at least one of:

monitoring usage of the at least one node associated with the at least one user;

monitoring a location of the at least one node associated with the at least one user;

monitoring data passing through the at least one node associated with the at least one user;

monitoring a quantity of the data passing through the at least one node associated with the at least one user;

monitoring a time of the data passing through the at least one node associated with the at least one user;

monitoring a date of the data passing through the at least one node associated with the at least one user;

monitoring an origination source the data is being transmitted from originally; and monitoring a final destination the data is being transmitted.

14. The method of claim 1, wherein the method further comprises authenticating, with at least one authenticator device, a location of the at least one node associated with the at least one user.

15. The method of claim 14, wherein the at least one authenticator device authenticates the location of the at least one node associated with the at least one user by evaluating at least one authentication signal.

16. The method of claim 15, wherein the at least one authentication signal is transmitted by at least one transmission source, and is received by at least one receiving source associated with the at least one node associated with the at least one user.

17. The method of claim 16, wherein the at least one transmission source is employed in at least one of at least one satellite and at least one pseudo-satellite.

18. The method of claim 17, wherein the at least one satellite is at least one of a Lower Earth Orbiting (LEO) satellite, a Medium Earth Orbiting (MEO) satellite, and a Geosynchronous Earth Orbiting (GEO) satellite.

19. The method of claim 1, wherein the at least one criterion is related to at least one of:

a location of the at least one network node associated with the at least one user;

a type of data passing through the at least one network node associated with the at least one user;

a time the at least one network node associated with the at least one user receives data;

a day the at least one network node associated with the at least one user receives the data;

a time the at least one network node associated with the at least one user transmits the data;

a day the at least one network node associated with the at least one user transmits the data;

a location of an origination source the data is transmitted from originally; and a location of a final destination source the data is being transmitted.

20. A system for context aware network security monitoring for threat detection, the system comprising:

at least one processor to monitor behavior of each of at least one node associated with at least one user in a network to generate a behavior profile for each of the at least one user, wherein the behavior of each of the at least one node is based on traffic flow through each of the at least one node, and wherein the traffic flow is monitored by analyzing an Internet Protocol (IP) packet header of at least one data packet that has traveled through each of the at least one node, wherein the IP packet header contains a security signature portion, the security signature portion includes geolocation information for at least one of the nodes that the data packet has passed or routed;

compare the behavior profile for the at least one user with a baseline behavior profile for the at least one user;

determine when there is a difference between the behavior profile for the at least one user and the baseline behavior profile for the at least one user;

flag an event associated with the difference, when the difference at least one of exceeds a baseline threshold level, does not exceed a baseline threshold level, meets at least one criterion, and does not meet at least one criterion; and classify the event to an event classification; and at least one transmitter, associated with the at least one node associated with the at least one user, to transmit the event to at least one of at least one other node in the network and a network operations center.

21. The system of claim 20, wherein the processor is further to initially monitor the behavior of the at least one node associated with the at least one user in the network to generate the baseline behavior profile for the at least one user.

22. The system of claim 20, wherein the system further comprises:

at least one transmission source to transmit the baseline behavior profile for the at least one user to the at least one node associated with the at least one user; and at least one receiver, associated with the at least one node associated with the at least one user, to receive the baseline behavior profile for the at least one user.

23. The system of claim 22, wherein the at least one transmission source is employed in at least one of at least one satellite and at least one pseudo-satellite.

24. The system of claim 23, wherein the at least one satellite is at least one of a Lower Earth Orbiting (LEO) satellite, a Medium Earth Orbiting (MEO) satellite, and a Geosynchronous Earth Orbiting (GEO) satellite.

25. The system of claim 22, wherein the at least one transmission source is associated with at least one of at least one other node in the network and the network operations center.

26. The system of claim 20, wherein the at least one processor is associated with at least one of the at least one node associated with the at least one user, at least one other node in the network, and the network operations center.

27. The system of claim 20, wherein the system further comprises at least one transmission source to transmit an event update to the at least one network node associated with the at least one user; and the at least one processor is to further update the baseline behavior profile for the at least one user by using the event update.

28. The system of claim 27, wherein the at least one transmission source is employed in at least one of at least one satellite and at least one pseudo-satellite.

29. The system of claim 28, wherein the at least one satellite is at least one of a Lower Earth Orbiting (LEO) satellite, a Medium Earth Orbiting (MEO) satellite, and a Geosynchronous Earth Orbiting (GEO) satellite.

30. The system of claim 27, wherein the at least one transmission source is associated with at least one of at least one other node in the network and the network operations center.

31. The system of claim 20, wherein the monitoring of the behavior of the at least one node associated with the at least one user further includes at least one of:

monitoring usage of the at least one node associated with the at least one user;

monitoring a location of the at least one node associated with the at least one user;

monitoring data passing through the at least one node associated with the at least one user;

monitoring a quantity of the data passing through the at least one node associated with the at least one user;

monitoring a time of the data passing through the at least one node associated with the at least one user;

monitoring a date of the data passing through the at least one node associated with the at least one user;

monitoring an origination source the data is being transmitted from originally; and monitoring a final destination the data is being transmitted.

32. The system of claim 20, wherein the system further comprises at least one authenticator device to authenticate a location of the at least one node associated with the at least one user.

33. The system of claim 32, wherein the at least one authenticator device authenticates the location of the at least one node, associated with the at least one user, by evaluating at least one authentication signal.

34. The system of claim 33, wherein the at least one authentication signal is transmitted by at least one transmission source, and is received by at least one receiving source associated with the at least one node associated with the at least one user.

35. The system of claim 34, wherein the at least one transmission source is employed in at least one of at least one satellite and at least one pseudo-satellite.

36. The system of claim 35, wherein the at least one satellite is at least one of a Lower Earth Orbiting (LEO) satellite, a Medium Earth Orbiting (MEO) satellite, and a Geosynchronous Earth Orbiting (GEO) satellite.

37. The system of claim 20, wherein the at least one criterion is related to at least one of:

a location of the at least one network node associated with the at least one user;

a type of data passing through the at least one network node associated with the at least one user;

a time the at least one network node associated with the at least one user receives data;

a day the at least one network node associated with the at least one user receives the data;

a time the at least one network node associated with the at least one user transmits the data;

a day the at least one network node associated with the at least one user transmits the data;

a location of an origination source the data is transmitted from originally; and a location of a final destination source the data is being transmitted.

* * * * *